US012539832B2

(12) United States Patent
Fukuda et al.

(10) Patent No.: US 12,539,832 B2
(45) Date of Patent: Feb. 3, 2026

(54) PEDAL DEVICE

(71) Applicant: DENSO CORPORATION, Kariya (JP)

(72) Inventors: Yasuhisa Fukuda, Kariya (JP); Masashi Arao, Kariya (JP); Daisuke Hokuto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/955,590

(22) Filed: Nov. 21, 2024

(65) Prior Publication Data

US 2025/0074370 A1    Mar. 6, 2025

Related U.S. Application Data

(63) Continuation of application No. PCT/JP2023/016315, filed on Apr. 25, 2023.

(30) Foreign Application Priority Data

May 25, 2022 (JP) .................. 2022-085295

(51) Int. Cl.
*B60T 7/06* (2006.01)
*B60T 7/04* (2006.01)

(52) U.S. Cl.
CPC ............. *B60T 7/06* (2013.01); *B60T 7/042* (2013.01)

(58) Field of Classification Search
None
See application file for complete search history.

(56) References Cited

U.S. PATENT DOCUMENTS

| 10,919,507 | B2* | 2/2021 | Anderson | B60T 8/3255 |
| 2014/0117602 | A1* | 5/2014 | Jeon | B60T 11/18 |
| | | | | 267/170 |
| 2020/0001711 | A1 | 1/2020 | Burke et al. | |

FOREIGN PATENT DOCUMENTS

| JP | 2001-247020 | 9/2001 |
| JP | 2021-98439 | 7/2021 |

* cited by examiner

*Primary Examiner* — Vicky A Johnson
(74) *Attorney, Agent, or Firm* — Nixon & Vanderhye P.C.

(57) ABSTRACT

A pedal device includes a pedal and a reaction force generation mechanism. The reaction force generation mechanism includes a resilient device and a first holder. The first holder contacts the resilient device from one side, which is a side where the pedal is placed. The first holder has a primary disengagement stopper. The reaction force generation mechanism includes a second holder that contacts the resilient device from another side, which is opposite to the one side. The second holder has a secondary disengagement stopper. In a non-depressed state of the pedal, the pedal limits movement of the first holder toward the one side. When the pedal no longer limits and thus releases the movement of the first holder, the secondary disengagement stopper limits the movement of the first holder relative to the second holder beyond a predetermined limit toward the one side.

15 Claims, 33 Drawing Sheets

PEDAL DEVICE

CROSS REFERENCE TO RELATED APPLICATIONS

This application is a continuation application of International Patent Application No. PCT/JP2023/016315 filed on Apr. 25, 2023, which designated the U.S. and claims the benefit of priority from Japanese Patent Application No. 2022-85295 filed on May 25, 2022. The entire disclosures of all of the above applications are incorporated herein by reference.

TECHNICAL FIELD

The present disclosure relates to a pedal device for a vehicle.

BACKGROUND

As a pedal device for the vehicle, there has been proposed a pedal simulator. The pedal simulator includes: a brake pedal; an operation rod which is coupled to the brake pedal; a cylinder; a piston which receives a force of the operation rod at an inside of the cylinder; a plurality of coil springs; and a plurality of spring seats.

The coil springs are received in the cylinder in a resiliently compressed and deformed state, thereby resiliently supporting the piston and generating an urging force against a force of the operation rod. Furthermore, the spring seats are received in the cylinder and support the coil springs in a state where each of the spring seats is interposed between corresponding two of the coil springs. The piston is moved in the axial direction of the cylinder, which is a moving direction of the piston in the cylinder, when the piston is urged by the operation rod in response to depression of the brake pedal by a human driver.

Additionally, the cylinder has a stopper wall on a side of the piston, which is opposite to the coil springs in the axial direction of the cylinder. In a non-depressed state of the brake pedal where the driver does not depress the brake pedal, the piston is moved toward the operation rod side by the urging force of the coil springs, but the piston stops when the piston abuts against the stopper wall.

SUMMARY

This section provides a general summary of the disclosure, and is not a comprehensive disclosure of its full scope or all of its features.

According to the present disclosure, there is provided a pedal device for a vehicle, including a support body, a pedal and a reaction force generation mechanism. The pedal is configured to swing relative to the support body and is configured to be depressed by a human driver of the vehicle from an operating side of the pedal. The reaction force generation mechanism is supported by the support body and is placed on a counter-operating side of the pedal that is opposite to the operating side of the pedal. The reaction force generation mechanism is configured to generate a reaction force against a depression force that is applied from the human driver to the pedal. The reaction force generation mechanism includes a resilient device, a first holder and a second holder. The resilient device includes at least one resilient member which is resiliently deformable in one direction. The first holder contacts the resilient device from one side, which is a side where the pedal is placed, in the one direction. The first holder has a primary disengagement stopper. The second holder contacts the resilient device from another side, which is a side opposite to the one side, in the one direction. The second holder has a secondary disengagement stopper. The pedal is configured to limit movement of the first holder toward the one side in the one direction to maintain a compressed and deformed state of the resilient device in the one direction when the pedal is in a non-depressed state where the pedal is not depressed by the human driver. When the pedal no longer limits and thus releases the movement of the first holder toward the one side in the one direction, the secondary disengagement stopper abuts against the primary disengagement stopper in the one direction to limit the movement of the first holder relative to the second holder beyond a predetermined limit toward the one side in the one direction.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
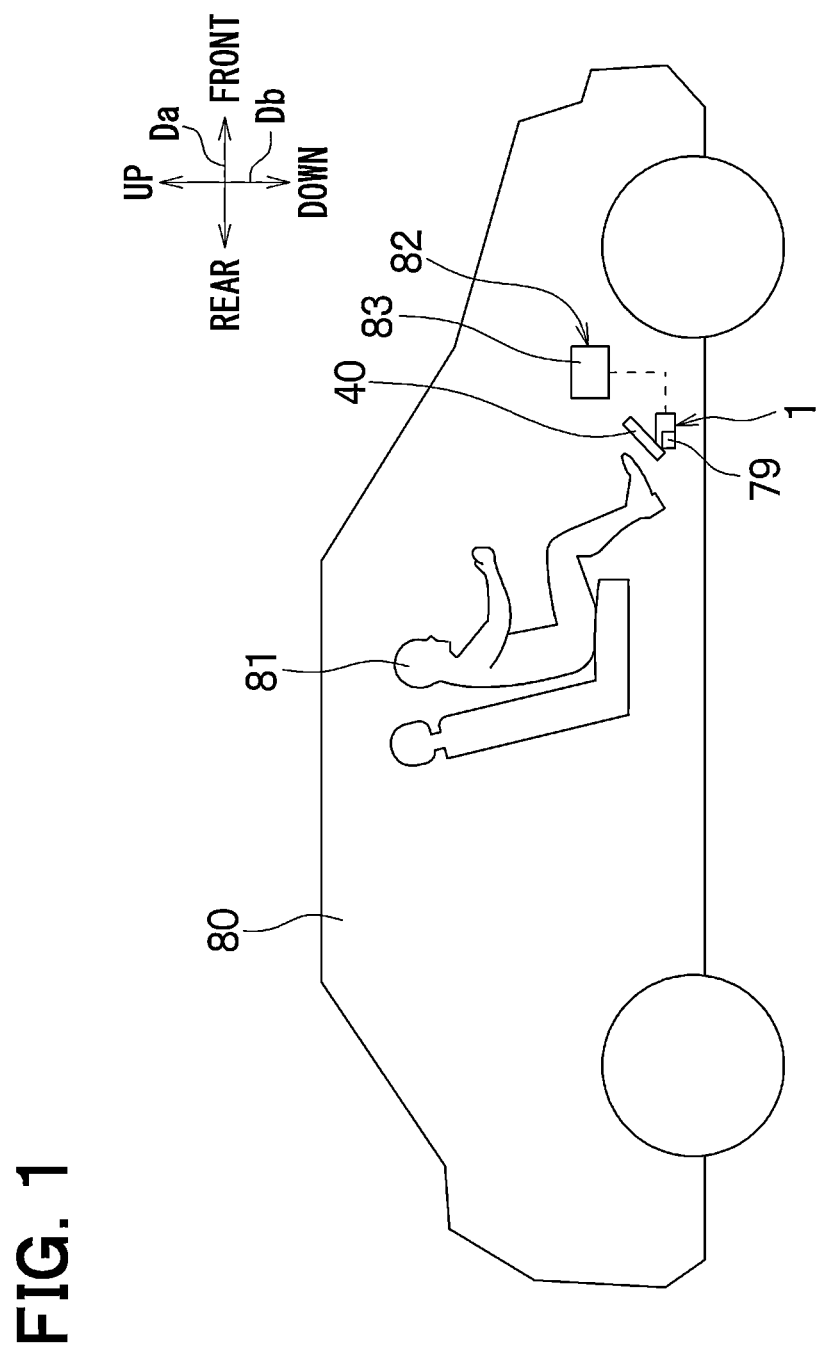
FIG. 1 is a schematic diagram of a vehicle in which a pedal device of a first embodiment is installed.

As a pedal device for a vehicle, there has been proposed a pedal simulator. The pedal simulator includes: a brake pedal; an operation rod which is coupled to the brake pedal; a cylinder; a piston which receives a force of the operation rod at an inside of the cylinder; a plurality of coil springs; and a plurality of spring seats.

The coil springs are received in the cylinder in a resiliently compressed and deformed state, thereby resiliently supporting the piston and generating an urging force against a force of the operation rod. Furthermore, the spring seats are received in the cylinder and support the coil springs in a state where each of the spring seats is interposed between corresponding two of the coil springs. The piston is moved in the axial direction of the cylinder, which is a moving direction of the piston in the cylinder, when the piston is urged by the operation rod in response to depression of the brake pedal by a human driver.

Additionally, the cylinder has a stopper wall on a side of the piston, which is opposite to the coil springs in the axial direction of the cylinder. In a non-depressed state of the brake pedal where the driver does not depress the brake pedal, the piston is moved toward the operation rod side by the urging force of the coil springs, but the piston stops when the piston abuts against the stopper wall. That is, the stopper wall of the cylinder has a stopper function for the non-depressed time (hereinafter, referred to as a non-depressed time stopper function) that limits the piston from moving toward the operation rod side when the brake pedal is in the non-depressed state. This non-depressed time stopper function keeps a state where the piston, the coil springs and the spring seats are received in the cylinder.

In the pedal simulator described above, it is conceivable that the stopper wall of the cylinder is damaged for some reason, thereby losing the non-depressed time stopper function. In such a case where the non-depressed time stopper function is lost, the piston may be ejected from the cylinder due to the urging force of the coil springs, potentially flying out towards the driver. As a result of the detailed investigation by the inventors of the present application, the above finding is made.

According to the present disclosure, there is provided a pedal device for a vehicle, including:
- a support body that is configured to be installed to a vehicle body of the vehicle;
- a pedal that is configured to swing relative to the support body and is configured to be depressed by a human driver of the vehicle from an operating side of the pedal which is predetermined; and
- a reaction force generation mechanism that is supported by the support body and is placed on a counter-operating side of the pedal that is opposite to the operating side of the pedal, wherein the reaction force generation mechanism is configured to generate a reaction force against a depression force that is applied from the human driver to the pedal, wherein:
- the reaction force generation mechanism includes:
  - a resilient device that includes at least one resilient member which is resiliently deformable in one direction;
  - a first holder that contacts the resilient device from one side, which is a side where the pedal is placed, in the one direction, wherein the first holder has a primary disengagement stopper; and
  - a second holder that contacts the resilient device from another side, which is a side opposite to the one side, in the one direction, wherein the second holder has a secondary disengagement stopper;
- the pedal is configured to limit movement of the first holder toward the one side in the one direction to maintain a compressed and deformed state of the resilient device in the one direction when the pedal is in a non-depressed state where the pedal is not depressed by the human driver; and
- when the pedal no longer limits and thus releases the movement of the first holder toward the one side in the one direction, the secondary disengagement stopper abuts against the primary disengagement stopper in the one direction to limit the movement of the first holder relative to the second holder beyond a predetermined limit toward the one side in the one direction.

Here, it is conceivable that the non-depressed time stopper function, which limits the movement of the first holder toward the one side in the one direction in the non-depressed state of the pedal, is damaged for some reason. For example, one possible cause of damage to the undepressed time stopper function is the breakage of the stopper, which limits the pedal from swinging toward the operating side in the non-depressed state of the pedal.

According to the pedal device described above, when the pedal no longer limits and thus releases the movement of the first holder toward the one side in the one direction, the secondary disengagement stopper abuts against the primary disengagement stopper in the one direction. When the secondary disengagement stopper abuts against the primary disengagement stopper in this way, the secondary disengagement stopper limits the first holder from moving relative to the second holder beyond the predetermined limit toward the one side in the one direction.

Therefore, even in the case where the non-depressed time stopper function is damaged, the first holder is held relative to the second holder. That is, it is avoided that the first holder, the second holder and the resilient device are disassembled by the urging force of the resilient device. Therefore, for example, the first holder can be limited from detaching from the second holder and popping out toward the driver due to the urging force of the resilient device when the non-depressed time stopper function is damaged. This results in enhanced safety for the vehicle equipped with the pedal device.

Hereinafter, each of embodiments of the present disclosure will be described with reference to the drawings. In the following respective embodiments, portions, which are the same or equivalent to each other, will be indicated by the same reference signs.

First Embodiment

As shown in FIG. 1, a pedal device 1 of the present embodiment is a device installed in a vehicle 80 and is depressed by a depression force of a human driver 81 of the vehicle 80 (an occupant of the vehicle 80). This pedal device 1 is installed in the vehicle 80 as a brake pedal device for performing a braking operation of the vehicle 80.

Specifically, in the vehicle 80 of FIG. 1, a brake-by-wire system 82 is installed, and the pedal device 1 is a brake pedal device used in the brake-by-wire system 82. The brake-by-wire system 82 is a system that drives a brake pad of each wheel of the vehicle 80 through a brake circuit with a fluid pressure generated by a master cylinder controlled by an electronic controller device 83 installed in the vehicle 80 based on an electrical signal outputted from the pedal device 1.

Double-sided arrows shown in FIG. 1 indicate corresponding directions of the vehicle 80 in which the pedal device 1 is installed. Specifically, in FIG. 1, a vehicle front-rear direction Da, which is a front-rear direction of the vehicle 80, and a vehicle up-down direction Db, which is an up-down direction of the vehicle 80 (in other words, a vertical direction of the vehicle 80), are respective indicated by the double-sided arrows. Furthermore, in the description of the present embodiment, a front side in the vehicle front-rear direction Da is also referred to as a vehicle front side, and a rear side in the vehicle front-rear direction Da is also referred to as a vehicle rear side. Also, an upper side in the vehicle up-down direction Db is also referred to as a vehicle upper side, and a lower side in the vehicle up-down direction Db is also referred to as a vehicle lower side.

Figure 2:
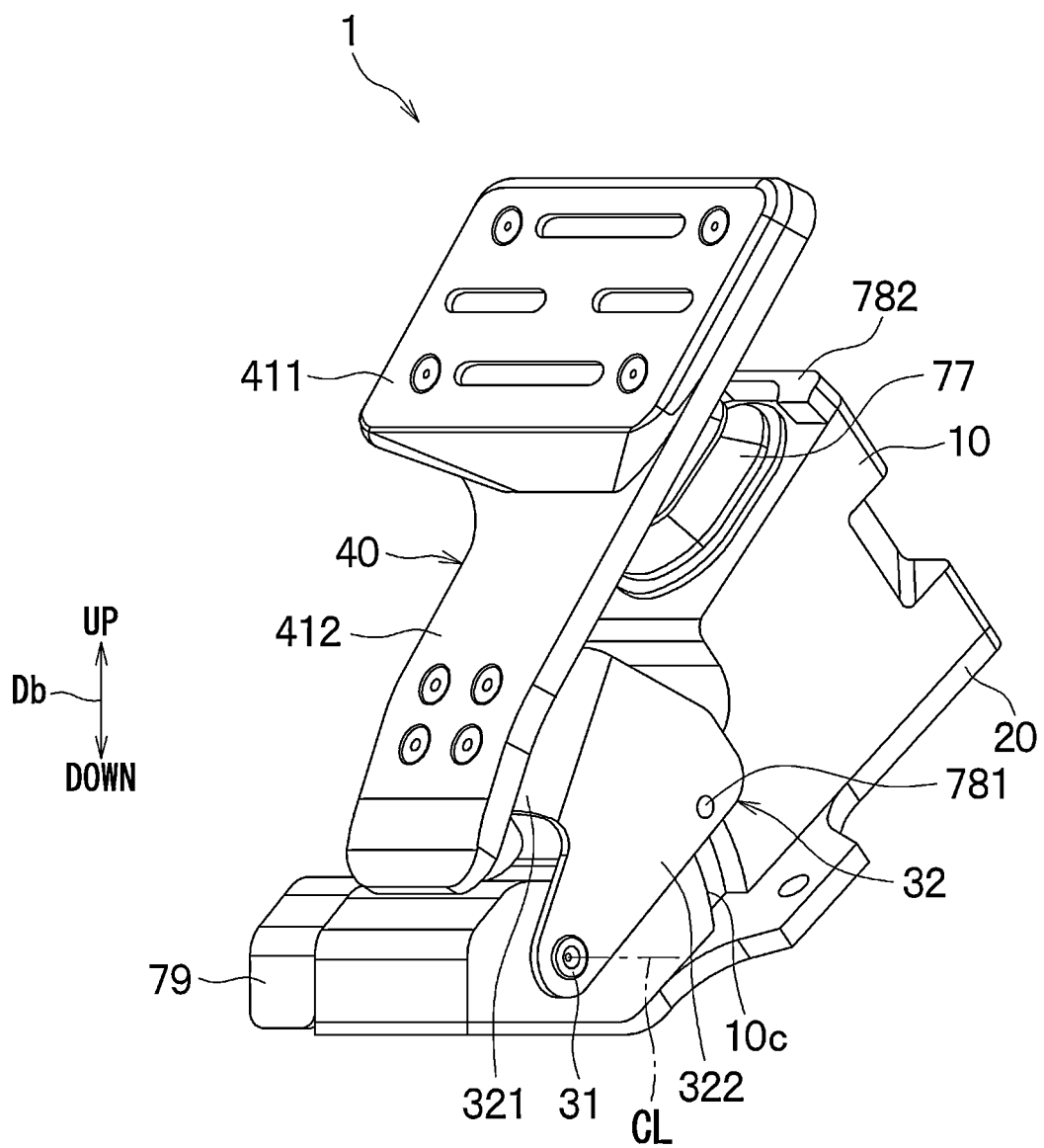
FIG. 2 is a perspective view of the pedal device of the first embodiment.
Figure 3:
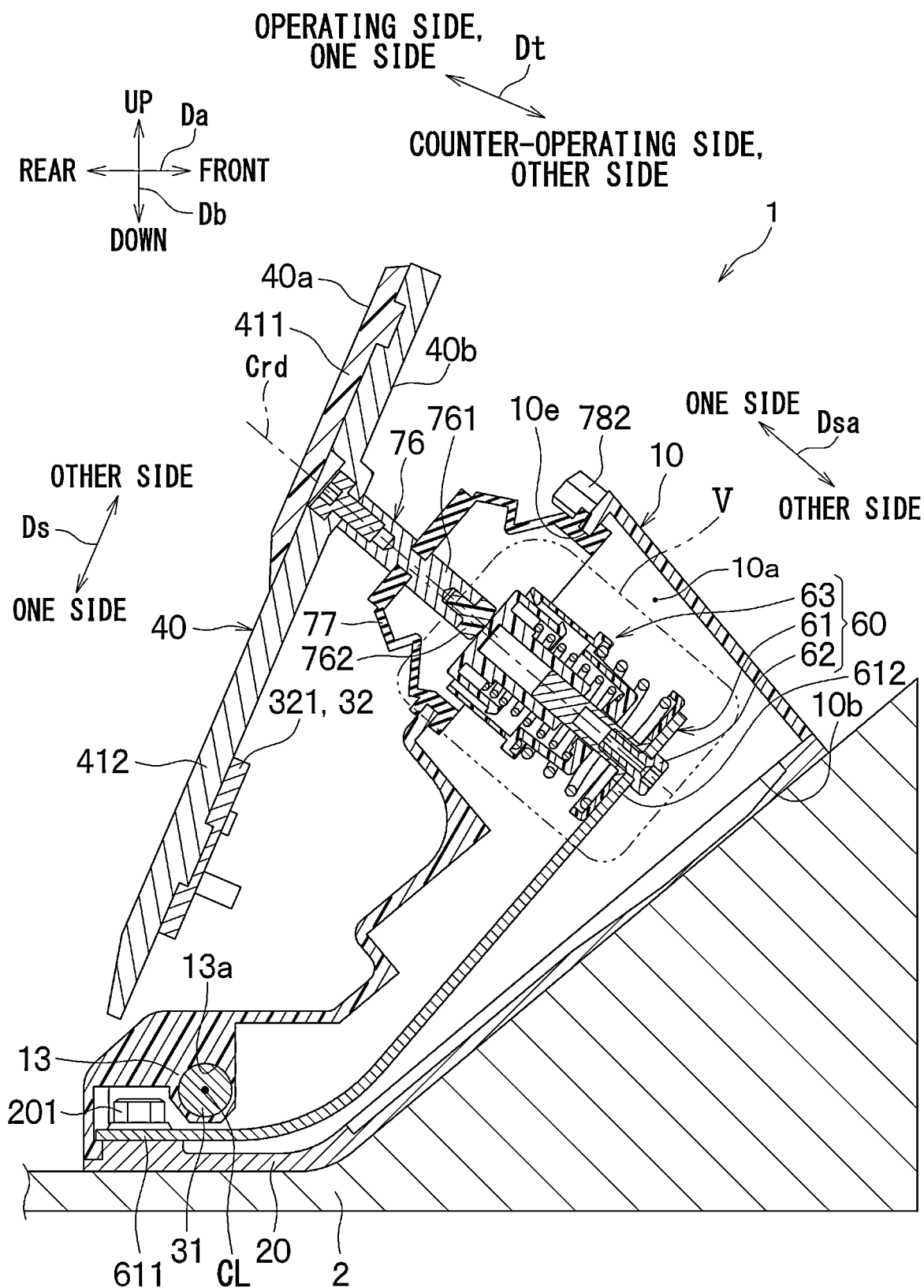
FIG. 3 is a cross-sectional view showing a cross-section of the pedal device of the first embodiment which is perpendicular to a pedal central axis.

As shown in FIGS. 1 to 3, the pedal device 1 includes a housing 10, a base plate 20, a rotatable shaft 31, a coupling plate 32, a pedal 40, a reaction force generation mechanism 60, a coupling rod 76, a cover member 77 and a rotational angle sensor 79. The pedal device 1 is an organ-type pedal device (or simply referred to as an organ pedal device).

As shown in FIGS. 2 and 3, the organ-type pedal device 1 refers to a pedal device in which a portion of the pedal 40, which is depressed by the driver 81, is placed on the vehicle upper side (in other words, the upper side in the vertical direction in a state where the pedal device is installed to the vehicle) of a swing center CL of the pedal 40. In the organ-type pedal device 1, the pedal 40 is swung such that the portion of the pedal 40, which is located on the vehicle upper side of the swing center CL, is brought toward a floor 2 or a dash panel in a vehicle cabin when the depression force of the driver 81 applied to the pedal 40 is increased. The swing center CL of the pedal 40 is a rotational center of the pedal 40 at the time of executing the swing motion of the pedal 40. Furthermore, in the description of the present embodiment, the swing center CL of the pedal 40 is also referred to as a pedal central axis CL.

The housing 10 is installed to the floor 2 or the dash panel, which is a portion of a vehicle body, through the base plate 20. That is, each of the housing 10 and the base plate 20 is a non-rotatable member that is fixed to the vehicle body and does not rotate.

The housing 10 and the base plate 20 are integrally fixed together and are fixed to the floor 2. For example, the housing 10 is fixed to the base plate 20 by, for example, bolts, and the base plate 20 is fixed to the floor 2 by, for example, bolts. The housing 10 and the base plate 20 are installed to the floor 2 in the above-described manner. The housing 10 and the base plate 20 function as a support body that supports the pedal 40 and the reaction force generation mechanism 60. The floor 2 constitutes a floor of the vehicle cabin. Furthermore, the dash panel is a partition wall which partitions between an outside (e.g., an engine compartment of the vehicle 80) and an inside of the vehicle cabin, and the dash panel is also sometimes referred to as a bulkhead.

A housing space 10a, which serves as an inside space, is formed at an inside of the housing 10. The housing space 10a opens toward the floor 2 side in a state where the housing 10 is still an unassembled single component. An opening 10b, which is an opening of the housing space 10a, is closed by the base plate 20 when the base plate 20 is installed to the housing 10. The reaction force generation mechanism 60 is installed in the housing space 10a.

The base plate 20 is, for example, a plate member and is installed to an opposite side of the housing 10 which is opposite to the pedal 40. Specifically, the base plate 20 is placed on the floor 2 side of the housing 10 and is clamped between the housing 10 and the floor 2 in a vehicle installed state where the pedal device 1 is installed to the floor 2.

The base plate 20 continuously extends from a front side portion of the housing 10, which is located on the vehicle front side, to a rear side portion of the housing 10, which is located on the vehicle rear side, and the base plate 20 is fixed to the floor 2 of the vehicle 80 by the bolts as discussed above. The base plate 20 is made of, for example, metal.

The rotatable shaft 31 is rotatably supported by a rotatable shaft support portion 13 that forms a portion of the housing 10. Specifically, a rotatable shaft hole 13a, which is centered on the pedal central axis CL and extends in an axial direction of the pedal central axis CL, is formed at an inside of the rotatable shaft support portion 13, and the rotatable shaft 31 is inserted into the rotatable shaft hole 13a.

Furthermore, the rotational angle sensor 79 is installed at the rotatable shaft support portion 13. A contactless-type sensor, which uses, for example, a Hall IC or a magnetoresistive element, may be used as the rotational angle sensor 79, or a contact-type sensor may be used as the rotational angle sensor 79.

The rotational angle sensor 79, which is installed to the rotatable shaft support portion 13, senses a rotational angle of the rotatable shaft 31 and outputs an electrical signal indicating the rotational angle of the rotatable shaft 31 to the electronic controller device 83 (see FIG. 1). The pedal 40 and the rotatable shaft 31 are fixed together and are rotated together. Therefore, the rotational angle of the rotatable shaft 31 is the same as a rotational angle of the pedal 40.

Figure 4:
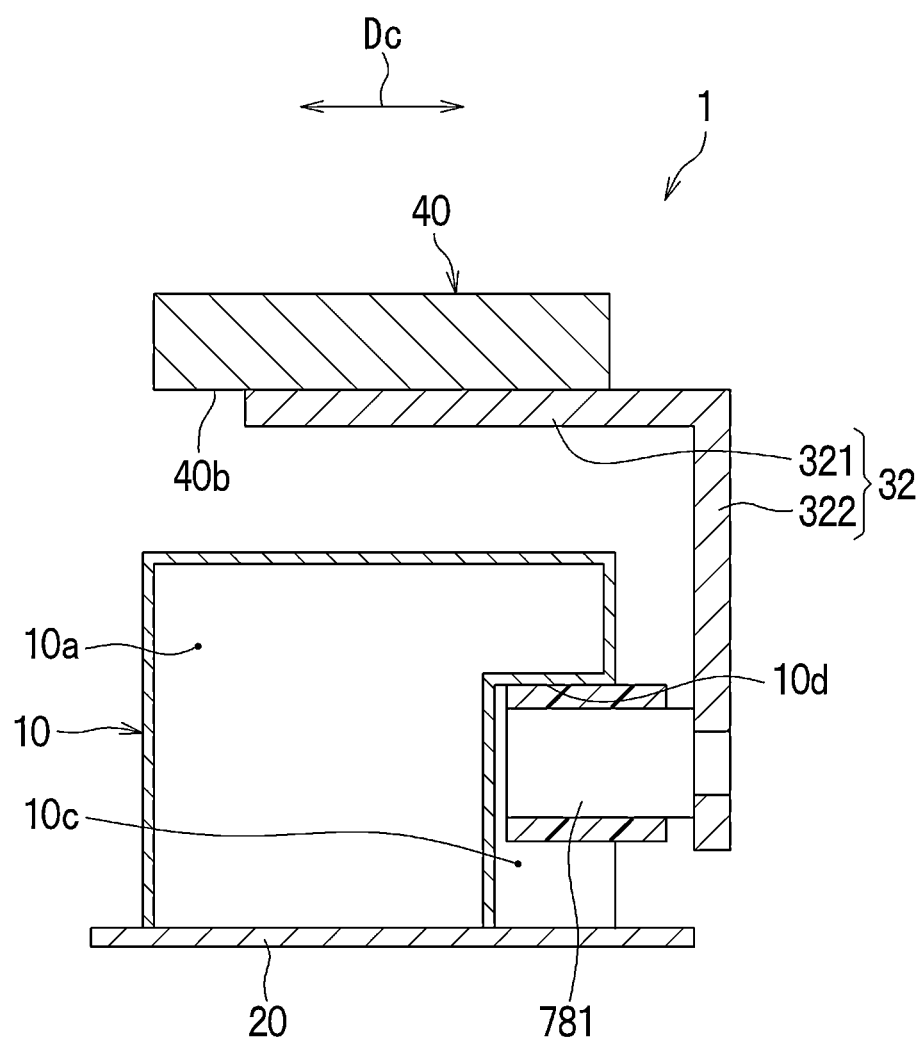
FIG. 4 is a cross-sectional view schematically showing a cross-section of the pedal device of the first embodiment which includes a central axis of a release-time stopper of a pedal.

The coupling plate 32 is installed to a pedal back surface 40b of the pedal 40 that is an opposite surface of the pedal 40 which is opposite to a receiving surface of the pedal 40 for receiving the depression force from the driver 81. The coupling plate 32 couples between the pedal 40 and the rotatable shaft 31 to rotate the pedal 40 and the rotatable shaft 31 together. As shown in FIGS. 2 to 4, the coupling plate 32 includes: a back plate portion 321 which is fixed to the pedal back surface 40b of the pedal 40; and a lateral plate portion 322 which is arranged perpendicular or generally perpendicular to the back plate portion 321. The back plate portion 321 of the coupling plate 32 is fixed to the pedal 40 by, for example, screwing.

As shown in FIGS. 2 and 3, the lateral plate portion 322 of the coupling plate 32 is arranged at a lateral side of the housing 10, and one end of the rotatable shaft 31 is fixed to the lateral plate portion 322. As described above, the pedal 40 and the rotatable shaft 31 are fixed to the coupling plate 32, so that the coupling plate 32, the pedal 40 and the rotatable shaft 31 are rotated integrally about the pedal central axis CL.

Furthermore, the rotatable shaft 31 is coupled to the pedal 40 through the coupling plate 32. Therefore, the pedal 40 is spaced from the rotatable shaft support portion 13 of the housing 10 without contacting the rotatable shaft support portion 13 at any rotational angle of the pedal 40 within a movable range of the pedal 40.

In the present embodiment, the pedal device 1 is the brake pedal device, and thereby the pedal 40 is a brake pedal. The pedal 40 is shaped in a plate form that has a thickness in a plate thickness direction Dt and extends in an extending direction Ds, and the pedal 40 is made of, for example, metal or resin. When the pedal 40 is depressed by a foot of the driver 81 from one side in the plate thickness direction Dt, the pedal 40 is swung about the pedal central axis CL. Therefore, the one side of the pedal 40 in the plate thickness direction Dt is an operating side of the pedal 40, at which the pedal 40 is depressed by the foot of the driver 81. Furthermore, the other side of the pedal 40, which is opposite to the one side in the plate thickness direction Dt, is a counter-operating side of the pedal 40 that is opposite to the operating side of the pedal 40.

Specifically, the housing 10 supports the pedal 40 through the rotatable shaft 31 such that the pedal 40 can be swung about the pedal central axis CL. Furthermore, since the pedal 40 is fixed to the rotatable shaft 31 through the coupling plate 32, the pedal 40 is swung integrally with the rotatable shaft 31 about the pedal central axis CL when the pedal 40 is depressed by the driver 81 during the depressing operation of the pedal 40.

In the present embodiment, the axial direction of the pedal central axis CL, the plate thickness direction Dt of the pedal 40 and the extending direction Ds of the pedal 40 are directions, which intersect with each other, more specifically are perpendicular to each other. Furthermore, in the description of the present embodiment, the plate thickness direction Dt of the pedal 40 is also referred to as a pedal plate thickness direction Dt, and the extending direction Ds of the pedal 40 is also referred to as a pedal extending direction Ds.

In the non-depressed state (in other words, a released state) where the pedal 40 is not depressed by the foot of the driver 81, the pedal 40 is arranged oblique to the vehicle front-rear direction Da. Specifically, the pedal 40 is arranged oblique such that an upper end portion of the pedal 40 is placed at a position which is on the vehicle front side and also the vehicle upper side of a lower end portion of the pedal 40. Specifically, the plate form of the pedal 40 is elongated such that in the non-depressed state of the pedal 40, one side of the pedal 40, which is located on one side in the pedal extending direction Ds, is placed on the vehicle lower side of the other side of the pedal 40, which is located on the other side in the pedal extending direction Ds. In the present embodiment, even in a most depressed state of the pedal 40 described later, the one side of the pedal 40, which is located on the one side in the pedal extending direction Ds, is placed on the vehicle lower side of the other side of the pedal 40, which is located on the other side in the pedal extending direction Ds.

Furthermore, the thickness of the pedal 40 is not constant. That is, the pedal 40 has a thick-wall portion 411 and a thin-wall portion 412, while the thin-wall portion 412 is located on the one side of the thick-wall portion 411 in the pedal extending direction Ds. The thickness of the thick-wall portion 411 is larger than the thickness of the thin-wall portion 412. For example, the thick-wall portion 411 is configured such that a plate portion, which extends from the thin-wall portion 412 and has the same thickness as that of the thin-wall portion 412, is provided with another plate component which is stacked on this plate portion on one side in the plate thickness direction Dt. In the present embodiment, a surface of the thick-wall portion 411, which faces the one side in the pedal plate thickness direction Dt, functions as a tread surface 40a of the pedal 40 which is depressed by the foot of the driver 81 during the depressing operation.

Furthermore, the pedal 40 has the pedal back surface 40b which is located on the other side of the pedal 40 in the pedal plate thickness direction Dt. The pedal back surface 40b is an outside surface that faces the other side in the pedal plate thickness direction Dt. The pedal back surface 40b extends along an entire extent of the pedal 40 in the pedal extending direction Ds.

Here, with respect to a positional relationship between the pedal 40 and the rotatable shaft 31, the rotatable shaft 31 is placed on the other side of the pedal back surface 40b in the pedal plate thickness direction Dt. Furthermore, the housing 10 and the reaction force generation mechanism 60 are placed on the other side of the pedal 40 in the pedal plate thickness direction Dt.

As shown in FIGS. 2 and 3, in response to the depressing operation by the driver 81, the pedal 40 is swung about the pedal central axis CL within a predetermined rotational angle range (in other words, a movable range) which is less than one full rotation. The above-discussed rotational angle range at the time of the swing motion of the pedal 40 is specifically a range that is from a smallest rotational angle position to a largest rotational angle position of the pedal 40. That is, in the non-depressed state of the pedal 40, the rotational angle of the pedal 40 is set to the smallest rotational angle position. Furthermore, in the most depressed state of the pedal 40 where the pedal 40 is most depressed by the driver 81, the rotational angle of the pedal 40 is set to the largest rotational angle position.

FIGS. 2 to 4 show the pedal device 1 in the case where the pedal 40 is placed in the non-depressed state, i.e., the released state where the depression force of the driver 81 is not applied to the pedal 40. Similarly, FIG. 5, which will be described later, indicates the reaction force generation mechanism 60 and the coupling rod 76 in the case where the pedal 40 is in the non-depressed state.

For example, when the depression force of the driver 81, which is applied to the pedal 40 from the one side in the pedal plate thickness direction Dt, is increased, the upper end portion of the pedal 40 is swung toward the vehicle front side and the vehicle lower side within the rotational angle range described above. That is, when the depression force of the driver 81 is increased, the pedal 40 is progressively swung downward from the position of the pedal 40 shown in FIG. 3. In contrast, when the depression force of the driver 81, which is applied to the pedal 40 from the one side in the pedal plate thickness direction Dt, is decreased, the upper end portion of the pedal 40 is swung by the action of the reaction force generation mechanism 60 toward the vehicle rear side and the vehicle upper side. That is, when the depression force of the driver 81 is decreased, the pedal 40 is swung toward the upright position of the pedal 40, although the pedal 40 is still tilted.

In the present embodiment, as shown in FIGS. 2 to 4, the smallest rotational angle position of the pedal 40 is defined by a release-time stopper 781, which serves as a first stopper, and the largest rotational angle position of the pedal 40 is defined by a depression-time stopper 782, which serves as a second stopper.

The release-time stopper 781 is a shaft fixed to the lateral plate portion 322 of the coupling plate 32. The release-time stopper 781 is shaped in, for example, a cylindrical columnar form and projects from the lateral plate portion 322 toward the housing 10 in the axial direction Dc of the pedal central axis CL.

The release-time stopper 781 is inserted in a stopper groove 10c which is formed at a lateral surface of the housing 10 and arcuately extends, and the release-time stopper 781 is moved in the stopper groove 10c in response to the swing motion of the pedal 40. In the non-depressed state of the pedal 40, the release-time stopper 781 contacts a groove end portion wall surface 10d, which forms an end portion of the stopper groove 10c of the housing 10 in a circumferential direction of the pedal central axis CL and thereby, the pedal 40 is held in the smallest rotational angle position. This release-time stopper 781 is also referred to as an initial stopper.

In the description of the present embodiment, it will be discussed later a case where the release-time stopper 781 is damaged due to some cause. However, unless otherwise specified, the non-depressed state of the pedal 40 refers to a state where the release-time stopper 781 is assumed to be undamaged.

The depression-time stopper 782 is formed at the housing 10 at a location that is on the vehicle front side of the pedal central axis CL. Specifically, the depression-time stopper 782 is formed at an upper end portion of a wall surface of the housing 10 placed on the vehicle front side. In the most depressed state of the pedal 40, the depression-time stopper 782 contacts an upper end portion or an area adjacent to thereof of the pedal back surface 40b and holds the pedal 40 at the largest rotational angle position.

The reaction force generation mechanism 60 generates a reaction force against the depression force which is applied from the driver 81 to the pedal 40. Since the reaction force generation mechanism 60 is received in the housing 10, the reaction force generation mechanism 60 is placed on the counter-operating side of the pedal 40. Furthermore, the reaction force generation mechanism 60 is supported by the base plate 20 at the inside of the housing 10. Specifically, a plate spring 61 of the reaction force generation mechanism 60 is fixed to the base plate 20 by a bolt 201, so that the reaction force generation mechanism 60 is supported by the base plate 20.

Figure 5:
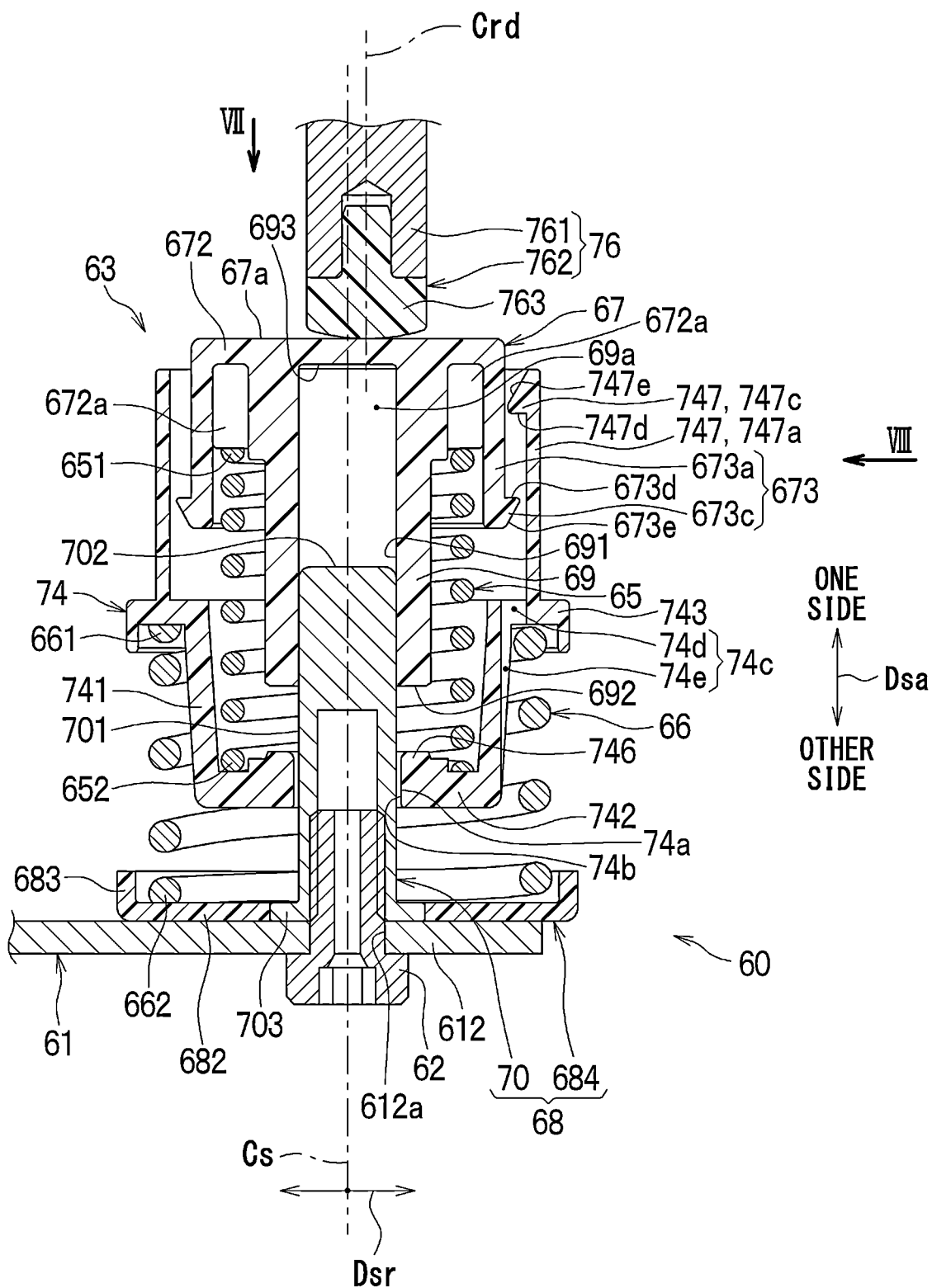
FIG. 5 is a partial enlarged view of a portion V of FIG. 3 in the first embodiment.

As shown in FIGS. 3 and 5, the reaction force generation mechanism 60 includes the plate spring 61, a fastening member 62 and a resilient unit 63. The plate spring 61 has: one end portion 611, which serves as a fixed end of the plate spring 61; and the other end portion 612, which serves as a free end of the plate spring 61. The one end portion 611 of the plate spring 61 is screwed and is fixed to the base plate 20 by the bolt 201. Furthermore, the resilient unit 63 is installed to the other end portion 612 of the plate spring 61 by the fastening member 62.

The plate spring 61 can be flexed to move the other end portion 612 relative to the one end portion 611 along an imaginary plane which is perpendicular to the pedal central axis CL. Therefore, in the case where the depression force of the driver 81 is applied to the other end portion 612 of the plate spring 61 through the depressing operation of the pedal 40 by the driver 81, when the depression force of the driver 81 is increased, the plate spring 61 is flexed to move the other end portion 612 toward the base plate 20.

The resilient unit 63 includes a plurality of constituent members (e.g., coil springs 65, 66 and holders 67, 68, 74), and a unit central axis Cs, which extends in one direction, serves as a central axis of these constituent members. In the description of the present embodiment, an axial direction Dsa of the unit central axis Cs is also referred to as a unit axial direction Dsa, and a radial direction Dsr of the unit central axis Cs is also referred to as a unit radial direction Dsr. The unit axial direction Dsa serves as one direction of the present disclosure.

The unit axial direction Dsa is an intersecting direction, which intersects the axial direction Dc of the pedal central axis CL (see FIG. 4), more specifically a perpendicular direction, which is perpendicular to the axial direction Dc of the pedal central axis CL. Furthermore, the unit radial direction Dsr is a perpendicular direction that is perpendicular to the unit axial direction Dsa. Furthermore, in the description of the present embodiment, one side in the unit axial direction Dsa refers to the pedal 40 side of the resilient unit 63 in a case where the resilient unit 63 is used as a reference. Furthermore, the other side in the unit axial direction Dsa refers to the opposite side (e.g., the base plate 20 side) of the resilient unit 63, which is opposite to the pedal 40, in the case where the resilient unit 63 is used as the reference.

Furthermore, although the unit axial direction Dsa can be tilted relative to the pedal plate thickness direction Dt depending on the rotational angle of the pedal 40, the one side in the unit axial direction Dsa is one of the one side and the other side in the pedal plate thickness direction Dt. Also, the other side in the unit axial direction Dsa is the other one of the one side and the other side in the pedal plate thickness direction Dt.

Specifically, the resilient unit 63 includes: a plurality of resilient members 65, 66 which can be resiliently deformed in the unit axial direction Dsa; a one-side holder 67; an other-side holder 68; and an intermediate holder 74. In the present embodiment, the plurality of resilient members 65, 66 are a plurality of coil springs 65, 66. These coil springs 65, 66 include a first coil spring 65 and a second coil spring 66.

In the present embodiment, the one-side holder 67 serves as a first holder of the present disclosure, and the intermediate holder 74 serves as a second holder of the present disclosure. Furthermore, a resilient device of the present disclosure, which is clamped between and is compressed and deformed by the first holder and the second holder, includes the first coil spring 65 that is one resilient member.

The plurality of holders 67, 68, 74 of the resilient unit 63 are relatively movable with respect to each other in the unit axial direction Dsa. The plurality of holders 67, 68, 74 are coupled in series through the plurality of coil springs 65, 66 in the transmission path of the depression force applied to the pedal 40 from the driver 81. The transmission path of the depression force is a path that transmits the depression force from the pedal 40 to the base plate 20. Specifically, in the transmission path of the depression force, the one-side holder 67, the first coil spring 65, the intermediate holder 74, the second coil spring 66, the other-side holder 68 and the plate spring 61 are arranged in this order and are coupled in series.

Each of the first coil spring 65 and the second coil spring 66 is a compression coil spring. For example, in the non-depressed state of the pedal 40, although the amount of resilient compression of each of the first coil spring 65 and the second coil spring 66 becomes the smallest, the resiliently compressed state of each of the first coil spring 65 and the second coil spring 66 is maintained.

Since a central axis of the first coil spring 65 is the unit central axis Cs, an axial direction of the first coil spring 65 is the unit axial direction Dsa, and a radial direction of the first coil spring 65 is the unit radial direction Dsr. Likewise, since a central axis of the second coil spring 66 is the unit central axis Cs, an axial direction of the second coil spring 66 is the unit axial direction Dsa, and a radial direction of the second coil spring 66 is the unit radial direction Dsr.

The first coil spring 65 has: one end portion 651, which is located on the one side in the unit axial direction Dsa; and the other end portion 652, which is located on the other side in the unit axial direction Dsa. The second coil spring 66 has: one end portion 661, which is located on the one side in the unit axial direction Dsa; and the other end portion 662, which is located on the other side in the unit axial direction Dsa.

Furthermore, an outer diameter of the first coil spring 65 is smaller than an inner diameter of the second coil spring 66. In the non-depressed state of the pedal 40, a portion of the first coil spring 65 is placed on an inner side of the second coil spring 66 in the unit radial direction Dsr and overlaps with the second coil spring 66 in the unit radial direction Dsr.

Specifically, in the non-depressed state of the pedal 40, the first coil spring 65 is displaced from the second coil spring 66 toward the one side in the unit axial direction Dsa. Furthermore, one portion of the first coil spring 65, which is located on the other side in the unit axial direction Dsa, is radially placed on an inner side of one portion of the second coil spring 66, which is located on the one side in the unit axial direction Dsa, in the unit radial direction Dsr, and this one portion of the first coil spring 65 overlaps with this one portion of the second coil spring 66, and a radial gap is formed between this one portion of the first coil spring 65 and this one portion of the second coil spring 66.

Therefore, the other end portion 652 of the first coil spring 65 is placed on the inner side of the second coil spring 66 in the unit radial direction Dsr and thereby overlaps with the second coil spring 66. Furthermore, the one end portion 661 of the second coil spring 66 is placed on the outer side of the first coil spring 65 in the unit radial direction Dsr and thereby overlaps with the first coil spring 65.

The one-side holder 67 is positioned closest to the one side in the unit axial direction Dsa among the plurality of holders 67, 68, 74 of the reaction force generation mechanism 60. In other words, the one-side holder 67 is positioned closest to the pedal 40 in the transmission path of the depression force applied from the driver 81 among the plurality of holders 67, 68, 74 of the reaction force generation mechanism 60.

Furthermore, the one-side holder 67 has a portion placed on the one side relative to the first coil spring 65 in the unit axial direction Dsa, and this portion of the one-side holder 67 contacts the first coil spring 65 in the unit axial direction Dsa from the one side, i.e., the pedal 40 side.

Furthermore, the one-side holder 67 is placed on the other side relative to the coupling rod 76 coupled to the pedal 40 in the unit axial direction Dsa and contacts the coupling rod 76. Therefore, the one-side holder 67 is configured to be urged by the pedal 40 through the coupling rod 76 toward the other side in the unit axial direction Dsa. Furthermore, the one-side holder 67 transmits the depression force of the driver 81, which is applied through the pedal 40, to the first and second coil springs 65, 66 and the plate spring 61.

For example, in the non-depressed state of the pedal 40, the pedal 40 limits movement of the one-side holder 67 toward the one side in the unit axial direction Dsa and thereby maintains the first coil spring 65 and the second coil spring 66 in a compressed and deformed state in the unit axial direction Dsa. In short, in the non-depressed state of the pedal 40, the release-time stopper 781 abuts against the groove end portion wall surface 10d (see FIG. 4) of the housing 10, and thereby the pedal 40 maintains each of the first coil spring 65 and the second coil spring 66 as a compression coil spring.

The housing 10 has an opening hole 10e which opens toward the pedal 40. Therefore, the coupling rod 76 can contact the one-side holder 67.

Figure 6:
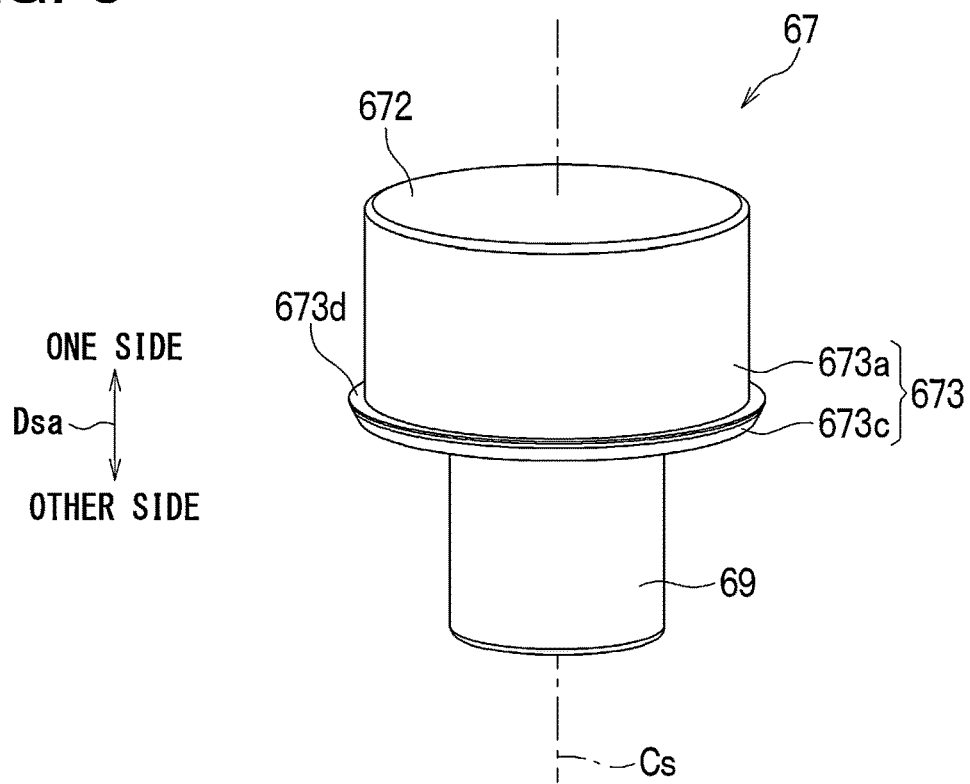
FIG. 6 is a perspective view of a one-side holder of a reaction force generation mechanism of the pedal device according to the first embodiment.
Figure 7:
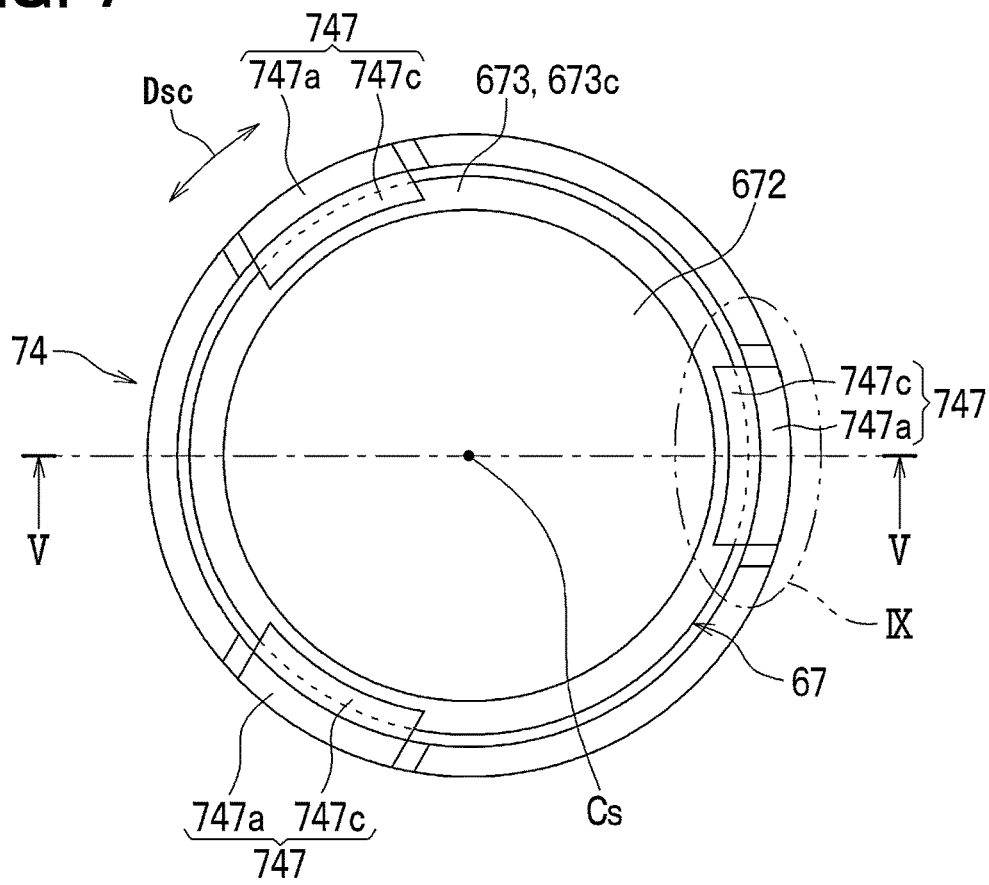
FIG. 7 is a view taken in a direction of arrow VII in FIG. 5, showing the one-side holder and an intermediate holder of the reaction force generation mechanism in an excerpt.

As shown in FIGS. 5 to 7, the one-side holder 67 includes: an outer guide portion 69, which is shaped in a tubular form and extends in the unit axial direction Dsa; a one-side contact portion 672, which extends around the outer guide portion 69; and a one-side disengagement stopper 673 which serves as a primary disengagement stopper of the present disclosure. The outer guide portion 69, the one-side contact portion 672 and the one-side disengagement stopper 673 are formed integrally in one-piece. For example, the one-side holder 67 is made of resin. FIG. 5 shows a cross-section taken along line V-V in FIG. 7.

The outer guide portion 69 is inserted into a spring inside space which is formed on a radially inner side of the first coil spring 65. In short, the outer guide portion 69 is placed on the radially inner side of the first coil spring 65.

Furthermore, an inside space is formed on an inner side of the outer guide portion 69 shaped in the tubular form, and this inside space, which is shaped in a tubular form, is closed on the one side in the unit axial direction Dsa and opens on the other side in the unit axial direction Dsa. Specifically, the tubular form of the outer guide portion 69 is a bottomed tubular form that has the bottom on the one side in the unit axial direction Dsa.

The outer guide portion 69 has an inner peripheral surface 691 that faces an inner side of the outer guide portion 69 shaped in the tubular form. Furthermore, the tubular form of the outer guide portion 69 is specifically a cylindrical tubular form that has a central axis which coincides with the unit central axis Cs. Therefore, in a cross-section that is perpendicular to the unit axial direction Dsa, the inner peripheral surface 691 of the outer guide portion 69 has a circular shape that is centered on the unit central axis Cs.

Furthermore, the outer guide portion 69 has: a distal end surface 692, which is formed at a distal end of the outer guide portion 69 located on the other side in the unit axial direction Dsa; and a tube bottom surface 693, which forms an end of the inside space of the outer guide portion 69 and faces the inside space from the one side in the unit axial direction Dsa. The distal end surface 692 and the tube bottom surface 693 of the outer guide portion 69 face the other side in the unit axial direction Dsa.

The one-side contact portion 672 is placed on the one side relative to the first coil spring 65 in the unit axial direction Dsa. The one-side contact portion 672 extends all around the outer guide portion 69 and expands outward relative to the outer guide portion 69 in the unit radial direction Dsr.

The one-side contact portion 672 does not contact the second coil spring 66 among the first and second coil springs 65, 66 and contacts the one end portion 651 of the first coil spring 65 from the one side in the unit axial direction Dsa. Specifically, the one-side contact portion 672 has a plurality of ribs 672a which are placed on the outer side relative to the outer guide portion 69 in the unit radial direction Dsr, and these ribs 672a are arranged in a radiated form centered on the unit central axis Cs. A distal end portion of each of the ribs 672a, which faces the other side in the unit axial direction Dsa, contacts the one end portion 651 of the first coil spring 65.

Furthermore, the one-side holder 67 has a depressible surface 67a which faces the one side in the unit axial direction Dsa. The depressible surface 67a is shaped in a circular planar surface that does not have a projection, a recess and a hole and a normal direction, which is normal to the depressible surface 67a, coincides with the unit axial direction Dsa. The depressible surface 67a of the one-side holder 67 expands all the way to the outer periphery of the one-side contact portion 672.

As shown in FIGS. 3 and 5, the other-side holder 68 is positioned closest to the other side in the unit axial direction Dsa among the plurality of holders 67, 68, 74 of the reaction force generation mechanism 60. In other words, the other-side holder 68 is positioned furthest from the pedal 40 in the transmission path of the depression force applied from the driver 81 among the plurality of holders 67, 68, 74 of the reaction force generation mechanism 60.

Furthermore, the other-side holder 68 has a portion placed on the other side relative to the second coil spring 66 in the unit axial direction Dsa, and this portion of the other-side holder 68 contacts the second coil spring 66 in the unit axial direction Dsa from the other side. The other-side holder 68 is configured to receive the depression force of the driver 81, which is transmitted to the second coil spring 66. The other-side holder 68 is placed on the one side relative to the other end portion 612 of the plate spring 61 in the unit axial direction Dsa and is fixed to the other end portion 612 of the plate spring 61.

The other-side holder 68 includes: an inner guide portion 70 which is shaped in a rod form and extends in the unit axial direction Dsa; an other-side contact portion 682, which extends around the inner guide portion 70; and a spring guide portion 683. The other-side contact portion 682 and the spring guide portion 683 are formed integrally in one-piece and form a spring seat member 684 that is a one-piece component formed integrally in one-piece. The inner guide portion 70 is a component that is formed separately from the spring seat member 684. For example, the spring seat member 684 is made of resin, and the inner guide portion 70 is made of metal.

The inner guide portion 70 is formed as a projection that extends from the other-side contact portion 682 toward the one side in the unit axial direction Dsa. The inner guide portion 70 is inserted into the outer guide portion 69 from the other side in the unit axial direction Dsa. Specifically, the inner guide portion 70 is fitted into the outer guide portion 69 such that the inner guide portion 70 is movable relative to the outer guide portion 69 in the unit axial direction Dsa. Therefore, the inner guide portion 70 is inserted into the radially inner side of the first coil spring 65 and is also inserted into the radially inner inside of the second coil spring 66. In the pedal device 1, the outer guide portion 69 is reciprocated relative to the inner guide portion 70 in the unit axial direction Dsa in response to the swing motion of the pedal 40.

The inner guide portion 70 has an outer peripheral surface 701 that is opposed to and contacts the inner peripheral surface 691 of the outer guide portion 69 in the unit radial direction Dsr. Like the inner peripheral surface 691 of the outer guide portion 69, the outer peripheral surface 701 extends in the unit axial direction Dsa.

The outer peripheral surface 701 of the inner guide portion 70 contacts the inner peripheral surface 691 of the outer guide portion 69 along an entire circumferential extent of the inner guide portion 70 in the circumferential direction. Therefore, in the cross-section that is perpendicular to the unit axial direction Dsa, the outer peripheral surface 701 of the inner guide portion 70 has a circular shape that is centered on the unit central axis Cs like the inner peripheral surface 691 of the outer guide portion 69. The outer guide portion 69 and the inner guide portion 70 enable relative movement between the one-side holder 67 and the other-side holder 68 in the unit axial direction Dsa and limits relative movement between the one-side holder 67 and the other-side holder 68 in the unit radial direction Dsr by slidably contacting the inner peripheral surface 691 and the outer peripheral surface 701 with each other.

The inner guide portion 70 has: a distal end surface 702, which is formed at a distal end of the inner guide portion 70 located on the one side in the unit axial direction Dsa; and a proximal end portion 703, which is formed at the other end of the inner guide portion 70 located on the other side in the unit axial direction Dsa. Since the inner guide portion 70 is inserted into the outer guide portion 69, the distal end surface 702 of the inner guide portion 70 is placed at the inside of the outer guide portion 69.

The other-side contact portion 682 is placed on the other side of the second coil spring 66 in the unit axial direction Dsa and extends outward in the unit radial direction Dsr from the proximal end portion 703 of the inner guide portion 70, while the other-side contact portion 682 is shaped in a form of a flange. The other-side contact portion 682 does not contact the first coil spring 65 among the first and second coil springs 65, 66 and contacts the other end portion 662 of the second coil spring 66 from the other side in the unit axial direction Dsa.

The other-side contact portion 682 and the proximal end portion 703 of the inner guide portion 70 are placed on the one side of the plate spring 61 in the unit axial direction Dsa and contacts the other end portion 612 of the plate spring 61.

The fastening member 62 is a bolt, which fixes the inner guide portion 70 to the other end portion 612 of the plate spring 61. The fastening member 62 is inserted into a through-hole 612a of the other end portion 612 of the plate spring 61 from the other side in the unit axial direction Dsa. In the inserted state where the fastening member 62 is inserted through the through-hole 612a of the plate spring 61, the fastening member 62 is threadably fasted to a female thread formed at the inner guide portion 70. In this way, the fastening member 62 extends through the other end portion 612 of the plate spring 61 and fixes the inner guide portion 70 to the other end portion 612 of the plate spring 61.

Furthermore, since the proximal end portion 703 of the inner guide portion 70 is fitted into a hole of the spring seat member 684, the spring seat member 684 is not movable relative to the inner guide portion 70 in the unit radial direction Dsr. Furthermore, the spring seat member 684 is urged against the other end portion 612 of the plate spring 61 by the second coil spring 66. Therefore, when the inner guide portion 70 is screw-fixed to the other end portion 612 of the plate spring 61 by the fastening member 62, the spring seat member 684 is also fixed to the other end portion 612 of the plate spring 61.

As discussed above, the other-side holder 68 is coupled to the other end portion 612 of the plate spring 61, which is the member placed between the base plate 20 and the other-side holder 68, by screwing with the fastening member 62 such that the other-side holder 68 is not movable relative to the other end portion 612 of the plate spring 61. The other-side holder 68 is coupled to the base plate 20 through the plate spring 61.

As shown in FIG. 5, the tube inside space 69a, into which the distal end surface 702 of the inner guide portion 70 is exposed, is formed at the inside of the outer guide portion 69. This tube inside space 69a expands or contracts in response to relative movement between the one-side holder 67 and the other-side holder 68 in the unit axial direction Dsa. For this reason, for example, a communication passage (not shown), which communicates the tube inside space 69a to the outside of the tube inside space 69a, is formed at the one-side holder 67 or the other-side holder 68. The tube inside space 69a is formed such that the tube inside space 69a does not become an airtight space.

The intermediate holder 74 is placed on the outer side of the inner guide portion 70 in the unit radial direction Dsr. The first coil spring 65 and the second coil spring 66 are coupled with each other through the intermediate holder 74. The first coil spring 65 and the second coil spring 66 urge against each other through the intermediate holder 74 when the first coil spring 65 and the second coil spring 66 are respectively compressed and deformed.

That is, in the transmission path of the depression force, which transmits the depression force between the pedal 40 and the base plate 20, the intermediate holder 74 is placed between the first coil spring 65 and the second coil spring 66. Furthermore, in the transmission path of the depression force, the first coil spring 65, the second coil spring 66 and the plate spring 61 are arranged in this order in series.

The intermediate holder 74 has: a spring intervening portion 741; an inner contact portion 742; an outer contact portion 743; a hole forming portion 746; and a plurality of intermediate disengagement stoppers 747 each of which serves as a secondary disengagement stopper of the present disclosure. The spring intervening portion 741, the inner contact portion 742, the outer contact portion 743, the hole forming portion 746 and the intermediate disengagement stoppers 747 are formed integrally in one-piece. The intermediate holder 74 of the present embodiment is made of resin.

The spring intervening portion 741 is shaped in a cylindrical tubular form being coaxial with the unit central axis Cs and extends in the unit axial direction Dsa. The spring intervening portion 741 is placed between the first coil spring 65 and the second coil spring 66 in the unit radial direction Dsr.

The inner contact portion 742 extends inward from the spring intervening portion 741 in the unit radial direction Dsr and is placed on the outer side of the inner guide portion 70 in the unit radial direction Dsr. For example, the inner contact portion 742 extends from an end portion of the spring intervening portion 741 which faces the other side in the unit axial direction Dsa. The inner contact portion 742 contacts the other end portion 652 of the first coil spring 65 from the other side in the unit axial direction Dsa and is opposed to the other end portion 652 of the first coil spring 65 in the unit axial direction Dsa.

The hole forming portion 746 is placed on the inner side of the inner contact portion 742 in the unit radial direction Dsr and joined to the inner contact portion 742. Furthermore, the hole forming portion 746 is placed on the inner side of the other end portion 652 of the first coil spring 65 in the unit radial direction Dsr and projects relative to the inner contact portion 742 toward the one side in the unit axial direction Dsa. A projected portion of the hole forming portion 746, which projects from the inner contact portion 742, is shaped in a tubular form.

An insertion hole 74a, which has a circular cross-section centered on the unit central axis Cs, is formed at the inside of the hole forming portion 746. The insertion hole 74a is a through-hole that extends through the hole forming portion 746 in the unit axial direction Dsa. That is, the insertion hole 74a extends through the intermediate holder 74 in the unit axial direction Dsa.

In both of the non-depressed state and the most depressed state of the pedal 40, the inner guide portion 70 is inserted through the insertion hole 74a of the intermediate holder 74. That is, the hole forming portion 746, which has the insertion hole 74a, has an insertion hole inner peripheral surface 74b shaped in a circular ring form. The insertion hole inner peripheral surface 74b faces inward in the unit radial direction Dsr and is exposed to the insertion hole 74a. The insertion hole inner peripheral surface 74b is opposed to the outer peripheral surface 701 of the inner guide portion 70. In other words, in a state where the inner guide portion 70 is inserted through the insertion hole 74a, the inner guide portion 70 is fitted in the insertion hole 74a such that the inner guide portion 70 is movable relative to the insertion hole 74a in the unit axial direction Dsa.

Here, in the middle of the swing motion of the pedal 40 in response to the depressing operation of the pedal 40 by the driver 81, the intermediate holder 74 abuts against one or both of the one-side holder 67 and the other-side holder 68 in the unit axial direction Dsa upon the compression of the first coil spring 65 and the second coil spring 66. A size of the insertion hole 74a is set such that the insertion hole inner peripheral surface 74b does not arrest the inner guide portion 70 in the unit radial direction Dsr in the case where the intermediate holder 74 abuts against the one or both of the one-side holder 67 and the other-side holder 68 in the unit axial direction Dsa.

That is, when the intermediate holder 74 abuts against the one or both of the one-side holder 67 and the other-side holder 68 in the unit axial direction Dsa, the intermediate holder 74 may possibly be tilted relative to the inner guide portion 70. Furthermore, the size of the insertion hole 74a is set such that even when the intermediate holder 74 is tilted relative to the inner guide portion 70, the insertion hole inner peripheral surface 74b and the inner guide portion 70 do not rub against each other in response to the tilting of the intermediate holder 74 relative to the inner guide portion 70. In short, the diameter of the insertion hole 74a is set such that a radial gap, which has a sufficient size to avoid the rubbing between the insertion hole inner peripheral surface 74b and the inner guide portion 70, is formed between the insertion hole inner peripheral surface 74b and the inner guide portion 70.

For example, the fitting of the inner guide portion 70 relative to the insertion hole 74a is a looser fitting that is looser than the fitting of the inner guide portion 70 relative to the outer guide portion 69. A difference between a diameter of the insertion hole 74a (a diameter of the insertion hole inner peripheral surface 74b) and an outer diameter of the inner guide portion 70 is larger than a difference between an inner diameter of the outer guide portion 69 and the outer diameter of the inner guide portion 70. The outer diameter and the inner diameter discussed above is not a radius and is the diameter. Furthermore, the outer diameter of the inner guide portion 70 is, in other words, a diameter of the outer peripheral surface 701 of the inner guide portion 70, and the inner diameter of the outer guide portion 69 is, in other words, a diameter of the inner peripheral surface 691 of the outer guide portion 69.

The outer contact portion 743 is placed on the one side of the inner contact portion 742 in the unit axial direction Dsa. The outer contact portion 743 extends outward from the spring intervening portion 741 in the unit radial direction Dsr. For example, the outer contact portion 743 extends from an end portion of the spring intervening portion 741 which faces the one side in the unit axial direction Dsa. The outer contact portion 743 circumferentially extends all around the spring intervening portion 741 and surrounds an end portion of the spring intervening portion 741 which faces the one side in the unit axial direction Dsa.

The outer contact portion 743 contacts the one end portion 661 of the second coil spring 66 from the one side in the unit axial direction Dsa and is opposed to the one end portion 661 of the second coil spring 66 in the unit axial direction Dsa. That is, since the second coil spring 66 contacts the intermediate holder 74 from the other side in the unit axial direction Dsa, the second coil spring 66 serves as an other-side coil spring of the present disclosure.

As shown in FIGS. 5 to 7, the one-side disengagement stopper 673 of the one-side holder 67 and the intermediate disengagement stoppers 747 of the intermediate holder 74 form a snap-fit structure that limits relative movement between the one-side holder 67 and the intermediate holder 74 in the unit axial direction Dsa.

Specifically, the one-side disengagement stopper 673 of the one-side holder 67 has a one-side surface support portion 673a and a one-side surface forming portion 673c. The one-side surface support portion 673a is placed on the outer side of the first coil spring 65 in the unit radial direction Dsr. The one-side surface support portion 673a is shaped in a tubular form such that the one-side surface support portion 673a extends from the one-side contact portion 672 toward the other side in the unit axial direction Dsa and circumferentially surrounds the first coil spring 65.

The one-side surface forming portion 673c projects outward in the unit radial direction Dsr from an end portion of the one-side surface support portion 673a, which faces the other side in the unit axial direction Dsa. Therefore, the one-side surface forming portion 673c is also placed on the outer side of the first coil spring 65 in the unit radial direction Dsr.

Furthermore, the one-side surface forming portion 673c circumferentially surrounds the one-side surface support portion 673a. A one-side surface 673d, which faces the one side in the unit axial direction Dsa, is formed at a side of the one-side surface forming portion 673c which faces the one side in the unit axial direction Dsa. An opposite side of the one-side surface forming portion 673c, which is opposite to the one-side surface 673d, forms a sloped surface 673e. The sloped surface 673e is tilted relative to the unit central axis Cs such that the sloped surface 673e progressively approaches the one side in the unit axial direction Dsa as the sloped surface 673e extends outward in the unit radial direction Dsr.

Figure 8:
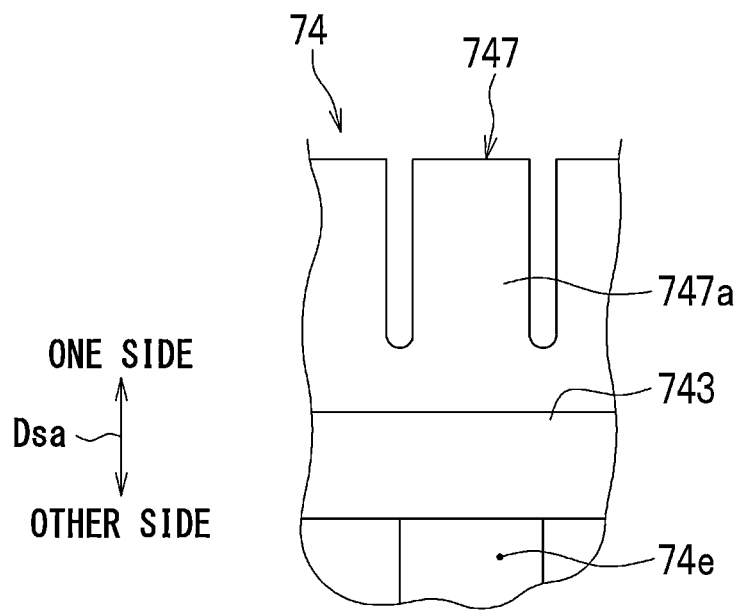
FIG. 8 is a view taken in a direction of arrow VIII in FIG. 5, showing a side view of an intermediate disengagement stopper of the intermediate holder.

As shown in FIGS. 5, 7 and 8, the plurality (specifically, three) of intermediate disengagement stoppers 747 of the intermediate holder 74 are provided. These intermediate disengagement stoppers 747 are arranged at equal intervals in a circumferential direction Dsc (i.e., a unit circumferential direction Dsc) centered on the unit central axis Cs. Each of the intermediate disengagement stoppers 747 has an other-side surface support portion 747a and an other-side surface forming portion 747c. That is, the plurality of other-side surface support portions 747a are arranged at equal intervals in the unit circumferential direction Dsc, and the plurality of other-side surface forming portions 747c are also arranged at equal intervals in the unit circumferential direction Dsc.

Since the plurality of intermediate disengagement stoppers 747 are arranged at the intervals, each of the plurality of other-side surface support portions 747a can be resiliently deformed to displace a corresponding one of the plurality of other-side surface forming portions 747c both inward and outward in the unit radial direction Dsr.

Each of the plurality of other-side surface support portions 747a is positioned on the outer side of the one-side surface forming portion 673c in the unit radial direction Dsr and extends from the outer contact portion 743 toward the one side in the unit axial direction Dsa. The plurality of other-side surface support portions 747a are arranged around the one-side surface forming portion 673c.

Each of the plurality of other-side surface forming portions 747c projects inward in the unit radial direction Dsr from an end portion of the corresponding other-side surface support portion 747a, which faces the one side in the unit axial direction Dsa. Furthermore, an other-side surface 747d, which faces the other side in the unit axial direction Dsa, is formed at a side of each other-side surface forming portion 747c which faces the other side in the unit axial direction Dsa. An opposite side of each other-side surface forming portion 747c, which is opposite to the other-side surface 747d, forms a sloped surface 747e. The sloped surface 747e is tilted relative to the unit central axis Cs such that the sloped surface 747e progressively approaches the one side in the unit axial direction Dsa as the sloped surface 747e extends outward in the unit radial direction Dsr.

In the non-depressed state of the pedal 40, each of the other-side surface support portions 747a is positioned to extend from the other side toward the one side in the unit axial direction Dsa relative to the one-side surface forming portion 673c. Each other-side surface forming portion 747c is positioned on the one side relative to the one-side surface forming portion 673c in the unit axial direction Dsa and overlaps with the one-side surface forming portion 673c in the unit axial direction Dsa. Therefore, the other-side surface 747d of each intermediate disengagement stopper 747 is positioned on the one side of the one-side surface 673d of the one-side disengagement stopper 673 to overlap with and opposed to the one-side surface 673d of the one-side disengagement stopper 673 in the unit axial direction Dsa.

In addition, in the non-depressed state of the pedal 40, the other-side surface 747d of each intermediate disengagement stopper 747 does not contact and is spaced from the one-side surface 673d of the one-side disengagement stopper 673 in the unit axial direction Dsa.

Furthermore, the intermediate holder 74 has a plurality of holder through-holes 74c each of which extends through the intermediate holder 74 in the unit axial direction Dsa. Each of the plurality of holder through-holes 74c is provided for each corresponding one of the plurality of other-side surface forming portions 747c.

Each holder through-hole 74c is positioned on the other side relative to the corresponding other-side surface support portion 747a in the unit axial direction Dsa and is positioned on the inner side of the corresponding other-side surface support portion 747a in the unit radial direction Dsr. For example, in the present embodiment, each holder through-hole 74c extends to reach both of the spring intervening portion 741 and the outer contact portion 743. That is, each holder through-hole 74c has: an axial hole part 74d, which extends through the outer contact portion 743 in the unit axial direction Dsa; and an axial extension part 74e, which is formed along the outer peripheral surface of the spring intervening portion 741 facing the outer side in the unit radial direction Dsr. The axial extension part 74e is in a form of a groove that extends from the axial hole part 74d in the unit axial direction Dsa.

Figure 9:
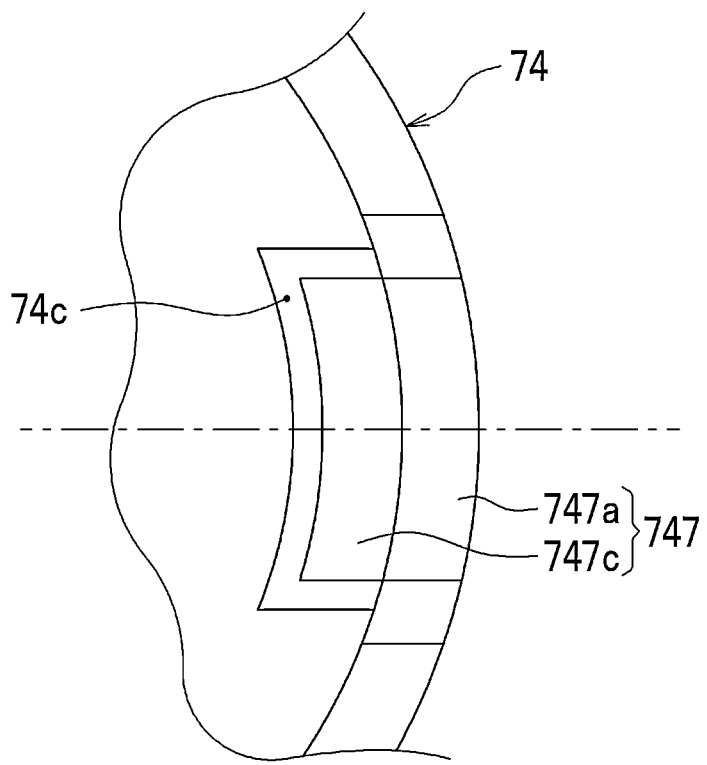
FIG. 9 is an enlarged view of a portion IX of FIG. 7, showing the intermediate holder alone.

As shown in FIGS. 5 and 9, at each of the three locations, at each of which the corresponding intermediate disengagement stopper 747 and the corresponding holder through-hole 74c are formed, the corresponding holder through-hole 74c is arranged such that the holder through-hole 74c is placed on the other side of the corresponding other-side surface forming portion 747c in the unit axial direction Dsa and overlaps with the entire corresponding other-side surface forming portion 747c in the unit axial direction Dsa. In other words, as shown in FIG. 9, in an axial view in the unit axial direction Dsa, the entire other-side surface forming portion 747c is located within a range occupied by the corresponding holder through-hole 74c.

As shown in FIGS. 3 and 5, the coupling rod 76 is placed between the pedal 40 and the one-side holder 67 and couples between the pedal 40 and the one-side holder 67. The one-side holder 67 is depressed by the pedal 40 through the coupling rod 76 in response to the application of the depression force of the driver 81 to the pedal 40.

Specifically, the coupling rod 76 projects from the pedal 40 on the counter-operating side of the pedal 40 and extends along a rod central axis Crd which is the central axis Crd of the coupling rod 76. For example, the coupling rod 76 projects from the pedal back surface 40b which intersects the rod central axis Crd. The coupling rod 76 has a rod distal end portion 763 located on the counter-operating side (i.e., the one-side holder 67 side). The rod distal end portion 763 contacts the depressible surface 67a of the one-side holder 67.

The coupling rod 76 is coupled to the pedal 40 such that the projecting direction of the coupling rod 76, which projects from the pedal 40, is fixed. The above expression, i.e., "the projecting direction of the coupling rod 76 is fixed", means that the rod central axis Crd, which is the central axis Crd of the coupling rod 76, is fixed and does not change relative to the pedal 40. In the present embodiment, the coupling rod 76 is fixed to the pedal 40 by the bolt, so that the coupling rod 76 is not rotated about the rod central axis Crd. For example, the coupling rod 76 is fixed to the pedal 40 in a state where the rod distal end portion 763 is tilted relative to the pedal plate thickness direction Dt such that the rod distal end portion 763 is displaced relative to a proximal end of the coupling rod 76 toward the one side in the pedal extending direction Ds.

As described above, the rod distal end portion 763 of the coupling rod 76 coupled to the pedal 40 urges the depressible surface 67a of the one-side holder 67 and slides relative to the depressible surface 67a of the one-side holder 67 in response to the depressing operation of the pedal 40 by the driver 81. In FIG. 5, although the unit central axis Cs and the rod central axis Crd are parallel to each other, the unit central axis Cs and the rod central axis Crd are not necessarily parallel to each other. When the pedal 40 is swung, the coupling rod 76 is swung integrally with the pedal 40. Therefore, an angle, which is defined between the unit central axis Cs and the rod central axis Crd, changes in response to the swing motion of the pedal 40.

For example, in the present embodiment, the coupling rod 76 includes two components. Specifically, the coupling rod 76 includes: an arm portion 761, which is coupled to the pedal 40, and an urging portion 762 that is located on the opposite side of the arm portion 761, which is opposite to the pedal 40, while the urging portion 762 is coupled to the arm portion 761 in series. The urging portion 762 includes the rod distal end portion 763.

For example, the arm portion 761 and the urging portion 762 are separately formed as separate components, respectively, and the arm portion 761 and the urging portion 762 are securely coupled together by, for example, press-fitting. In the present embodiment, a material of the urging portion 762 is different from a material of the arm portion 761. For example, the arm portion 761 is made of metal, and the urging portion 762 is made of resin. The resin material of the urging portion 762 may be, for example, PTFE. In the case where the urging portion 762 is made of the PTFE, an advantage can be obtained such that a sliding property of the urging portion 762 relative to the depressible surface 67a of the one-side holder 67 is improved by the lower friction in comparison to a case where the urging portion 762 is made of, for example, metal. Here, PTFE stands for polytetrafluoroethylene.

As shown in FIGS. 2 and 3, the cover member 77 is referred to as a dust boot and is shaped in a form of a tubular bellows, while the cover member 77 is made of, for example, rubber that is resiliently deformable (elastically deformable). The cover member 77 is expanded and contracted in the axial direction of the coupling rod 76 in response to the swing motion of the pedal 40. For example, the cover member 77 closes the opening hole 10e of the housing 10 in a state where the coupling rod 76 is inserted through the cover member 77. In this way, intrusion of a foreign object into the inside of the housing 10 through the opening hole 10e is limited.

Here, as shown in FIGS. 3 to 5, since the coupling rod 76 contacts the one-side holder 67, the pedal 40 limits the movement of the one-side holder 67 toward the one side in the unit axial direction Dsa in the non-depressed state of the pedal 40. At this time, it is assumed that the release-time stopper 781 is damaged for some reason, causing the pedal 40 to no longer limit and thus release the movement of the one-side holder 67 toward the one side in the unit axial direction Dsa.

In this case, the one-side holder 67 is moved relative to the intermediate holder 74 toward the one side in the unit axial direction Dsa by the urging force of the first coil spring 65, compared to before the time when the pedal 40 releases the movement of the one-side holder 67. Then, the intermediate disengagement stoppers 747 of the present embodiment abut against the one-side disengagement stopper 673 in the unit axial direction Dsa. The intermediate disengagement stoppers 747, by abutting against the one-side disengagement stopper 673, limit the one-side holder 67 from moving relative to the intermediate holder 74 beyond a predetermined limit toward the one side in the unit axial direction Dsa.

Figure 10:
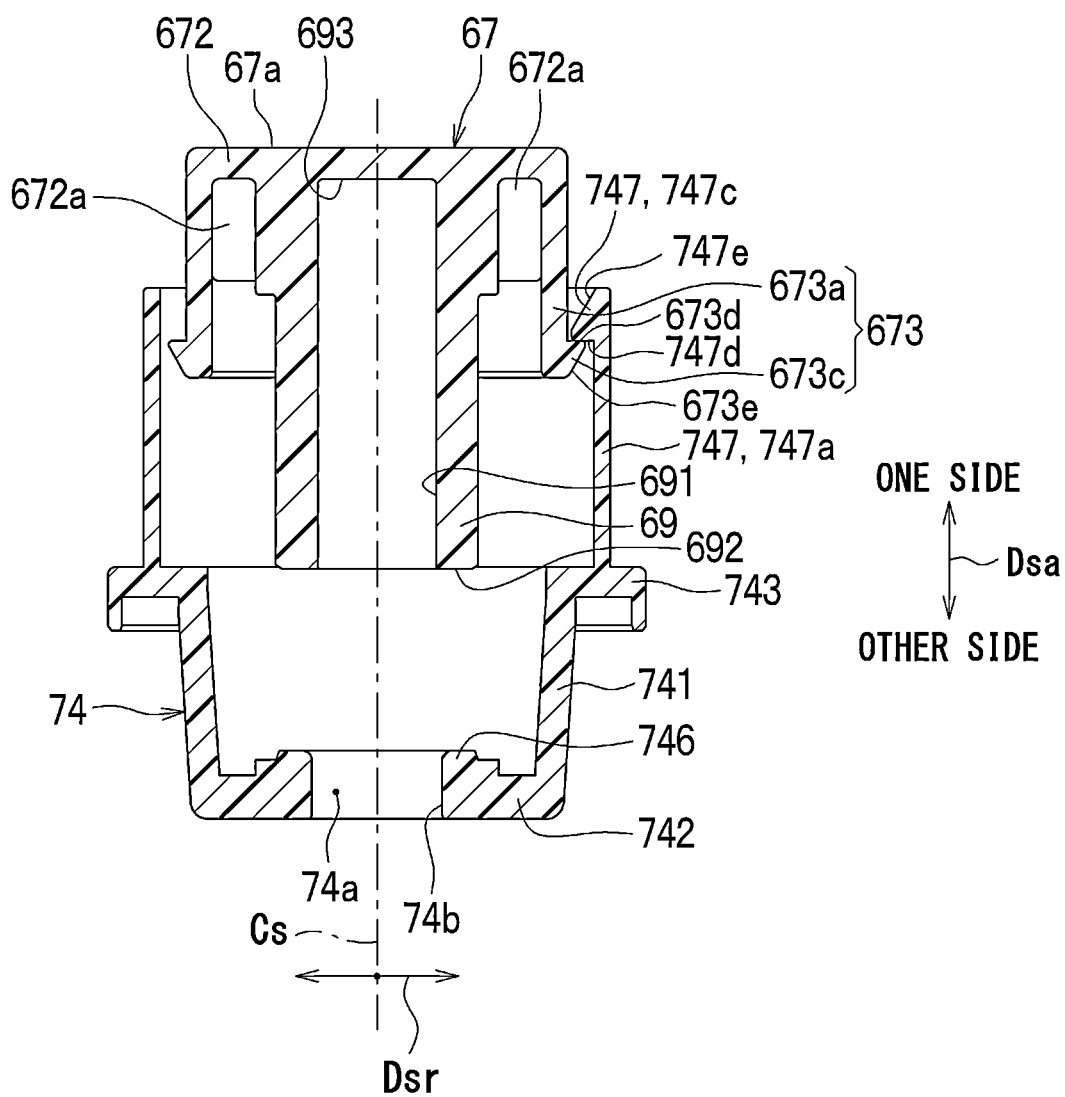
FIG. 10 is a cross-sectional view showing the one-side holder and the intermediate holder in an excerpt in the same cross-section as FIG. 5, illustrating a state where the release-time stopper is damaged for some reason, and an other-side surface of the intermediate disengagement stopper abuts against a one-side surface of a one-side disengagement stopper.

The abutting of the intermediate disengagement stoppers 747 against the one-side disengagement stopper 673 in the unit axial direction Dsa means, in detail, that the other-side surfaces 747d of the intermediate disengagement stoppers 747 abut against the one-side surface 673d of the one-side disengagement stopper 673, as shown in FIG. 10. Thus, the predetermined limit mentioned above is a relative position of the one-side holder 67 with respect to the intermediate holder 74 when the other-side surfaces 747d abut against the one-side surface 673d in the unit axial direction Dsa. In essence, the predetermined limit is the relative position of the one-side holder 67 relative to the intermediate holder 74, as shown in FIG. 10.

As mentioned above, the one-side disengagement stopper 673 of the one-side holder 67 and the intermediate disengagement stoppers 747 of the intermediate holder 74 form the snap-fit structure. Therefore, it can also be said that when the pedal 40 no longer limits and thus releases the movement of the one-side holder 67 toward the one side in the unit axial direction Dsa, the intermediate disengagement stoppers 747 act as follows. That is, when the pedal 40 no longer limits and thus releases the movement of the one-side holder 67, the intermediate disengagement stoppers 747 limit the one-side holder 67 from moving relative to the intermediate holder 74 beyond the predetermined limit toward the one side in the unit axial direction Dsa by means of the snap-fit structure.

Even when the intermediate disengagement stoppers 747 abut against the one-side disengagement stopper 673 in the unit axial direction Dsa, the first coil spring 65 clamped between the one-side contact portion 672 and the inner contact portion 742 of the intermediate holder 74 is maintained in the compressed and deformed state in the unit axial direction Dsa. In other words, the first coil spring 65 is not expanded to its free length, but is maintained in the resiliently compressed state. Therefore, the urging force (in other words, the resilient force) of the first coil spring 65 keeps the other-side surfaces 747d of the intermediate disengagement stoppers 747 urged against the one-side surface 673d of the one-side disengagement stopper 673.

Furthermore, as shown in FIGS. 5 and 10, when the pedal 40 no longer limits and thus releases the movement of the one-side holder 67 toward the one side in the unit axial direction Dsa, the second coil spring 66 will no longer remain in the resiliently compressed state, and therefore the second coil spring 66 will expand to its free length. Even in this case, the inner guide portion 70 will still remain inserted in the insertion hole 74a of the intermediate holder 74 without exiting the insertion hole 74a. In other words, the inner guide portion 70 has a sufficient length in the unit axial direction Dsa that is sufficient to allow the inner guide portion 70 to be inserted into the insertion hole 74a in the state where the outer contact portion 743 of the intermediate holder 74 and the other-side contact portion 682 are both in contact with the second coil spring 66 expanded to its free length.

In the pedal device 1 configured in the above-described manner, when the depression force of the driver 81 is applied to the pedal 40, the pedal 40, the rotatable shaft 31 and the coupling plate 32 are swung about the pedal central axis CL, as shown in FIGS. 3 and 5. Specifically, a portion of each of the pedal 40, the rotatable shaft 31 and the coupling plate 32 located on the vehicle upper side of the pedal central axis CL is swung about the pedal central axis CL toward the floor 2 and the dash panel. In other words, the pedal 40 is swung from the non-depressed state to the most depressed state.

At this time, the rotational angle sensor 79, which is installed to the pedal device 1, outputs the electrical signal indicating the rotational angle of the rotatable shaft 31 to the electronic controller device 83 (see FIG. 1). The electronic controller device 83 generates a hydraulic pressure (e.g., an oil pressure), which is required to brake the vehicle 80 by controlling the operation of the brake circuit of the brake-by-wire system 82 (see FIG. 1), and thereby the electronic controller device 83 actuates the brake pads with this hydraulic pressure to decelerate or stop the vehicle 80.

Furthermore, at the time of executing the swing motion of the pedal 40 from the non-depressed state to the most depressed state, the more the pedal 40 is swung from the non-depressed state toward the most depressed state, the more the first and second coil springs 65, 66 are compressed, and along with that, the plate spring 61 is greatly flexed.

For example, in the middle of the swing motion of the pedal 40 from the non-depressed state to the most depressed state, the one-side holder 67 and the other-side holder 68 abut against each other in the unit axial direction Dsa, and thereby the compression and deformation (hereinafter, referred to as the compression deformation) of each of the first and second coil springs 65, 66 is stopped. At this time, the one-side holder 67 and the other-side holder 68 may abut against each other while the intermediate holder 74 is interposed between the one-side holder 67 and the other-side holder 68, or the one-side holder 67 and the other-side holder 68 may directly abut against each other while the intermediate holder 74 is not interposed between the one-side holder 67 and the other-side holder 68.

When the pedal 40 is further swung from the state, in which the one-side holder 67 and the other-side holder 68 abut against each other, toward the most depressed state, the amount of deflection of the plate spring 61 is increased. When the pedal 40 is swung and abuts against the depression-time stopper 782, the pedal 40 is in the most depressed state, and thereby the deflection of the plate spring 61 is stopped.

The pedal device 1 of the present embodiment described above achieve the following advantages.

According to the present embodiment, as shown in FIGS. 3 to 5, in the non-depressed state of the pedal 40, the release-time stopper 781 abuts against the groove end portion wall surface 10d of the housing 10. Therefore, in the non-depressed state of the pedal 40, the pedal 40 limits the movement of the one-side holder 67 toward the one side in the unit axial direction Dsa and thereby maintains both the first coil spring 65 and the second coil spring 66 in the compressed and deformed state in the unit axial direction Dsa.

Here, it is conceivable that the non-depressed time stopper function (i.e., the stopper function for the non-depressed time), which limits the movement of the one-side holder 67 toward the one side in the unit axial direction Dsa in the non-depressed state of the pedal 40, is damaged for some reason. For example, one possible cause of damage to the non-depressed time stopper function is the breakage of the release-time stopper 781, which limits the pedal 40 from swinging toward the operating side in the non-depressed state of the pedal 40.

In contrast, as shown in FIGS. 5 and 10, in the present embodiment, when the movement of the one-side holder 67 toward the one side in the unit axial direction Dsa is no longer limited and thereby released, the intermediate disengagement stoppers 747 of the intermediate holder 74 abut against the one-side disengagement stopper 673 in the unit axial direction Dsa. The intermediate disengagement stoppers 747, by abutting against the one-side disengagement stopper 673, limit the one-side holder 67 from moving relative to the intermediate holder 74 beyond the predetermined limit toward the one side in the unit axial direction Dsa.

Therefore, even in the case where the non-depressed time stopper function is damaged, the one-side holder 67 is held relative to the intermediate holder 74. In other words, the disassembly of the one-side holder 67, the intermediate holder 74 and the first coil spring 65 by the urging force of the first coil spring 65 is avoided. Therefore, for example, the one-side holder 67 is limited from detaching from the intermediate holder 74 and popping out toward the driver 81 side due to the urging force of the first coil spring 65 when the non-depressed time stopper function is damaged. This results in enhanced safety for the vehicle 80 equipped with the pedal device 1.

(1) According to the present embodiment, even in the state where the intermediate disengagement stoppers 747 abut against the one-side disengagement stopper 673 in the unit axial direction Dsa, the first coil spring 65 is maintained in the compressed and deformed state in the unit axial direction Dsa. Thus, in such a state where the intermediate disengagement stoppers 747 abut against the one-side disengagement stopper 673, the one-side holder 67 is less likely to wobble relative to the intermediate holder 74. As a result, for example, in the state where the intermediate disengagement stoppers 747 abut against the one-side disengagement stopper 673 in the unit axial direction Dsa, it becomes difficult for the intermediate disengagement stoppers 747 to be disengaged from the one-side disengagement stopper 673. In other words, it is easy to maintain the intermediate disengagement stoppers 747 in contact with the one-side disengagement stopper 673 in the unit axial direction Dsa.

(2) According to the present embodiment, as shown in FIGS. 3 and 5, the reaction force generation mechanism 60 includes the first coil spring 65 and the second coil spring 66, which are resiliently deformable in the unit axial direction Dsa. The first coil spring 65 and the second coil spring 66 are coupled in series in the transmission path of the depression force applied from the driver 81. Therefore, the degree of freedom in setting the characteristics of the reaction force of the reaction force generation mechanism 60 against the depression force applied from the driver 81 can be increased compared to the case where the reaction force generation mechanism 60 has only one coil spring.

(3) According to the present embodiment, the reaction force generation mechanism 60 includes the intermediate holder 74, and the intermediate holder 74 is positioned between the first coil spring 65 and the second coil spring 66 in the transmission path of the depression force applied from the driver 81. Therefore, while holding the plurality of coil springs 65, 66, it is possible to couple the plurality of coil springs 65, 66 in series at the transmission path, which transmits the depression force between the pedal 40 and the base plate 20.

(4) According to the present embodiment, the one-side holder 67 and the intermediate holder 74 are made of the resin. Therefore, it is easy to reduce the weight of the reaction force generation mechanism 60. Also, it is easy to realize the snap-fit structure formed by the one-side disengagement stopper 673 of the one-side holder 67 and the intermediate disengagement stoppers 747 of the intermediate holder 74.

(5) According to the present embodiment, the one-side holder 67 includes the outer guide portion 69 which is shaped in the tubular form and extends in the unit axial direction Dsa, and the other-side holder 68 has the inner guide portion 70. The inner guide portion 70 has the outer peripheral surface 701 which extends in the unit axial direction Dsa, and the inner guide portion 70 is inserted into the outer guide portion 69 in such a manner that relative movement between the inner guide portion 70 and the outer guide portion 69 is possible.

Therefore, when the one-side holder 67 receives a load in a direction tilted relative to the unit central axis Cs from the pedal 40, the inner guide portion 70 can receive a radial load component in the unit radial direction Dsr among the load components of the load applied in the tilted direction. Therefore, it is possible to limit the radial load in the unit radial direction Dsr acting on the one-side disengagement stopper 673 and the intermediate disengagement stoppers 747. This helps limit damage to the one-side disengagement stopper 673 and the intermediate disengagement stoppers 747, and consequently, leads to improved safety.

(6) According to the present embodiment, as shown in FIG. 5, the outer guide portion 69 is placed on the radially inner side of the first coil spring 65. Therefore, for example, compared to the case where the outer guide portion 69 is not positioned on the radially inner side of the first coil spring 65, it is possible to limit an increase in the size of the resilient unit 63 that would be caused by the provision of the outer guide portion 69 and the inner guide portion 70.

(7) According to the present embodiment, as shown in FIGS. 3 and 5, the reaction force generation mechanism 60 includes the plate spring 61, and the one end portion 611 of the plate spring 61 is fixed to the base plate 20. The other-side holder 68 is coupled to the other end portion 612 of the plate spring 61 such that the other-side holder 68 is not movable relative to the other end portion 612 of the plate spring 61. Here, the plate spring 61 is more advantageous than the coil spring for obtaining a large reaction force. Therefore, for example, compared to a case where the reaction force generation mechanism 60 has only a coil spring having a large spring constant without the plate spring 61, a maximum value of the reaction force generated by the reaction force generation mechanism 60 can be increased while limiting an increase in the size of the pedal device 1.

(8) According to the present embodiment, the one-side disengagement stopper 673 of the one-side holder 67 and the intermediate disengagement stoppers 747 of the intermediate holder 74 form the snap-fit structure. Therefore, it is possible to easily assemble the one-side holder 67, the intermediate holder 74 and the first coil spring 65 while ensuring the function of limiting the one-side holder 67 from disengaging and departing from the intermediate holder 74.

(9) According to the present embodiment, the inner guide portion 70 is inserted through the insertion hole 74*a* of the intermediate holder 74 in the non-depressed state of the pedal 40. The inner guide portion 70 is still inserted through the insertion hole 74*a* of the intermediate holder 74 even in the case where the pedal 40 no longer limits and thus releases the movement of the one-side holder 67 toward the one side in the unit axial direction Dsa, and the second coil spring 66 is expanded to its free length.

Therefore, the assembly, which includes the one-side holder 67, the intermediate holder 74 and the first coil spring 65, can remain coupled to the other-side holder 68 in the case where the pedal 40 no longer limits and thus releases the movement of the one-side holder 67 toward the one side in the unit axial direction Dsa. This can limit, for example, the assembly, which includes the one-side holder 67, the intermediate holder 74 and the first coil spring 65, from popping out of the housing 10.

(10) According to the present embodiment, the portion of the first coil spring 65 is placed on the inner side of the second coil spring 66 in the unit radial direction Dsr and overlaps with the second coil spring 66 in the unit radial direction Dsr. The intermediate holder 74 includes the outer contact portion 743 that contacts the one end portion 661 of the second coil spring 66 from the one side in the unit axial direction Dsa. Furthermore, the other-side surface support portion 747*a* of each intermediate disengagement stopper 747 extends from the outer contact portion 743 toward the one side in the unit axial direction Dsa.

Therefore, the intermediate disengagement stoppers 747 can be placed by using the radial area in the unit radial direction Dsr occupied by the second coil spring 66 and the outer contact portion 743. Therefore, it is possible to limit an increase in the size of the resilient unit 63 in the unit radial direction Dsr caused by the provision of the one-side disengagement stopper 673 and the intermediate disengagement stoppers 747.

Furthermore, according to the present embodiment, as shown in FIG. 5, the other-side surface forming portion 747*c* projects inward in the unit radial direction Dsr from the end portion of the corresponding other-side surface support portion 747*a*, which faces the one side in the unit axial direction Dsa. Thus, the one-side surface forming portion 673*c*, which is the counterpart of the other-side surface forming portions 747*c*, is formed to project outward from the end portion of the one-side surface support portion 673*a* in the unit radial direction Dsr.

Therefore, it is possible to reduce the size of the one-side holder 67 having the one-side surface forming portion 673*c* in the unit radial direction Dsr compared to a configuration in which each other-side surface forming portion 747*c* projects outward from the end portion of the corresponding other-side surface support portion 747*a* in the unit radial direction Dsr.

Furthermore, according to the present embodiment, as shown in FIGS. 5 and 9, the intermediate holder 74 has the holder through-holes 74*c*. Therefore, it is possible to prevent undercuts in a mold at the time of forming (molding) the intermediate holder 74 made of the resin, thereby improving the mass production efficiency of the intermediate holder 74.

Second Embodiment

Next, the second embodiment will be described. In the present embodiment, points, which are different from the first embodiment, will be mainly described. Furthermore, the description of the same or equivalent portions as those in the aforementioned embodiment will be omitted or simplified. This is also true in the description of the later embodiments. In the drawings referred to in the second and subsequent embodiments, the various components of the pedal device 1 are shown simplified as appropriate.

Figure 11:
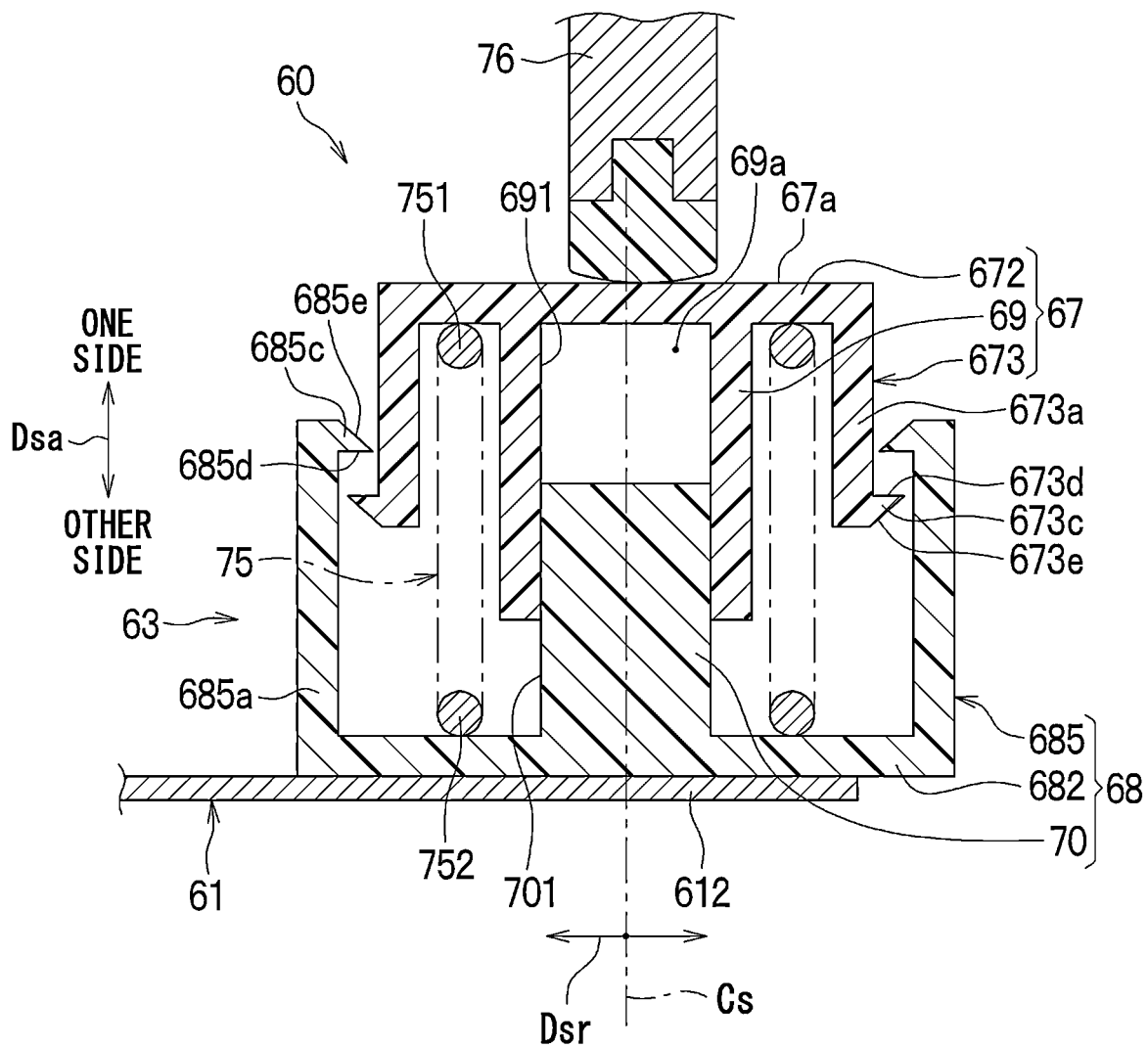
FIG. 11 is a schematic cross-sectional view showing a resilient unit in a non-depressed state of the pedal according to a second embodiment, indicating a portion corresponding to the portion V of FIG. 3.

As shown in FIG. 11, in the present embodiment, the resilient unit 63 includes a single coil spring (only one coil spring) 75 in place of the first coil spring 65 and the second coil spring 66 of the first embodiment. For example, the coil spring 75 has a configuration that is similar to the configuration of the first coil spring 65 of the first embodiment. Furthermore, the resilient unit 63 of the present embodiment does not include the intermediate holder 74 unlike the first embodiment.

In the present embodiment, the one-side holder 67 serves as the first holder of the present disclosure, and the other-side holder 68 serves as the second holder of the present disclosure. Furthermore, the resilient device of the present embodiment, which is clamped between and compressed and deformed by the first holder and the second holder, includes the coil spring 75 which is one resilient member. FIG. 11 is a schematic diagram corresponding to FIG. 5 of the first embodiment. FIG. 11 shows the resilient unit 63 and its periphery in the state where the pedal 40 is in the non-depressed state. This also applies to each diagram described later that is equivalent to FIG. 11.

The coil spring 75 has: one end portion 751, which is located on the one side in the unit axial direction Dsa; and the other end portion 752, which is located on the other side in the unit axial direction Dsa.

The one-side contact portion 672 of the one-side holder 67 contacts the one end portion 751 of the coil spring 75 from the one side in the unit axial direction Dsa. Furthermore, the other-side contact portion 682 of the other-side holder 68 contacts the other end portion 752 of the coil spring 75 from the other side in the unit axial direction Dsa. As described above, the coil spring 75 is clamped between the one-side contact portion 672 and the other-side contact portion 682 in the unit axial direction Dsa.

The outer guide portion 69 and the inner guide portion 70 are inserted into an inside of the coil spring 75 on the radially inner side of the coil spring 75.

In the present embodiment, since the intermediate holder 74 (see FIG. 5) is not provided, the intermediate disengagement stoppers 747 included in the intermediate holder 74 are also not provided. Therefore, the other-side holder 68 includes a plurality of other-side disengagement stoppers 685 which correspond to the intermediate disengagement stoppers 747. Each of the other-side disengagement stoppers 685 has the same configuration as that of the intermediate disengagement stopper 747 of the first embodiment except that the other-side disengagement stoppers 685 are included in the other-side holder 68.

Therefore, in the present embodiment, the other-side disengagement stoppers 685 serve as the secondary disengagement stoppers of the present disclosure, and the other-side disengagement stoppers 685 and the one-side disengagement stopper 673 of the one-side holder 67 form the same snap-fit structure as in the first embodiment. Furthermore, each of the other-side disengagement stoppers 685 has: an other-side surface support portion 685a, which is similar to the other-side surface support portion 747a of the first embodiment; and an other-side surface forming portion 685c, which is similar to the other-side surface forming portion 747c of the first embodiment. Each other-side surface forming portion 685c has: an other-side surface 685d, which is similar to the other-side surface 747d of the first embodiment; and a sloped surface 685e, which is similar to the sloped surface 747e of the first embodiment. The plurality of other-side disengagement stoppers 685 are provided like the plurality of intermediate disengagement stoppers 747 of the first embodiment and are arranged at equal intervals in the unit circumferential direction Dsc.

However, since the other-side surface support portions 685a form part of the other-side holder 68, the other-side surface support portions 685a are joined to the other-side contact portion 682 of the other-side holder 68. Furthermore, each of the other-side surface support portions 685a extends from the other-side contact portion 682 toward the one side in the unit axial direction Dsa.

For example, the other-side holder 68 of the present embodiment is made of resin, and the inner guide portion 70, the other-side contact portion 682 and the other-side disengagement stoppers 685 are formed integrally in one-piece as a single component.

Furthermore, even in the present embodiment, as in the first embodiment, when the release-time stopper 781 (see FIG. 4) is damaged for some reason, the pedal 40 no longer limits and thus releases the movement of the one-side holder 67 toward the one side in the unit axial direction Dsa.

In this case, the one-side holder 67 is relatively moved relative to the other-side holder 68 toward the one side in the unit axial direction Dsa until the other-side surfaces 685d of the other-side disengagement stoppers 685 abut against the one-side surface 673d of the one-side disengagement stopper 673. At this time, the inner guide portion 70 of the other-side holder 68 will remain inserted in the outer guide portion 69 without exiting the outer guide portion 69 of the one-side holder 67. That is, in the non-depressed state of the pedal 40 where the release-time stopper 781 is not damaged, a gap between the one-side surface 673d and each other-side surface 685d in the unit axial direction Dsa is smaller than an insertion length of the inserted portion of the inner guide portion 70, which is inserted in the outer guide portion 69.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Third Embodiment

Next, the third embodiment will be described. In the present embodiment, points, which are different from the second embodiment described above, will be mainly described.

Figure 12:
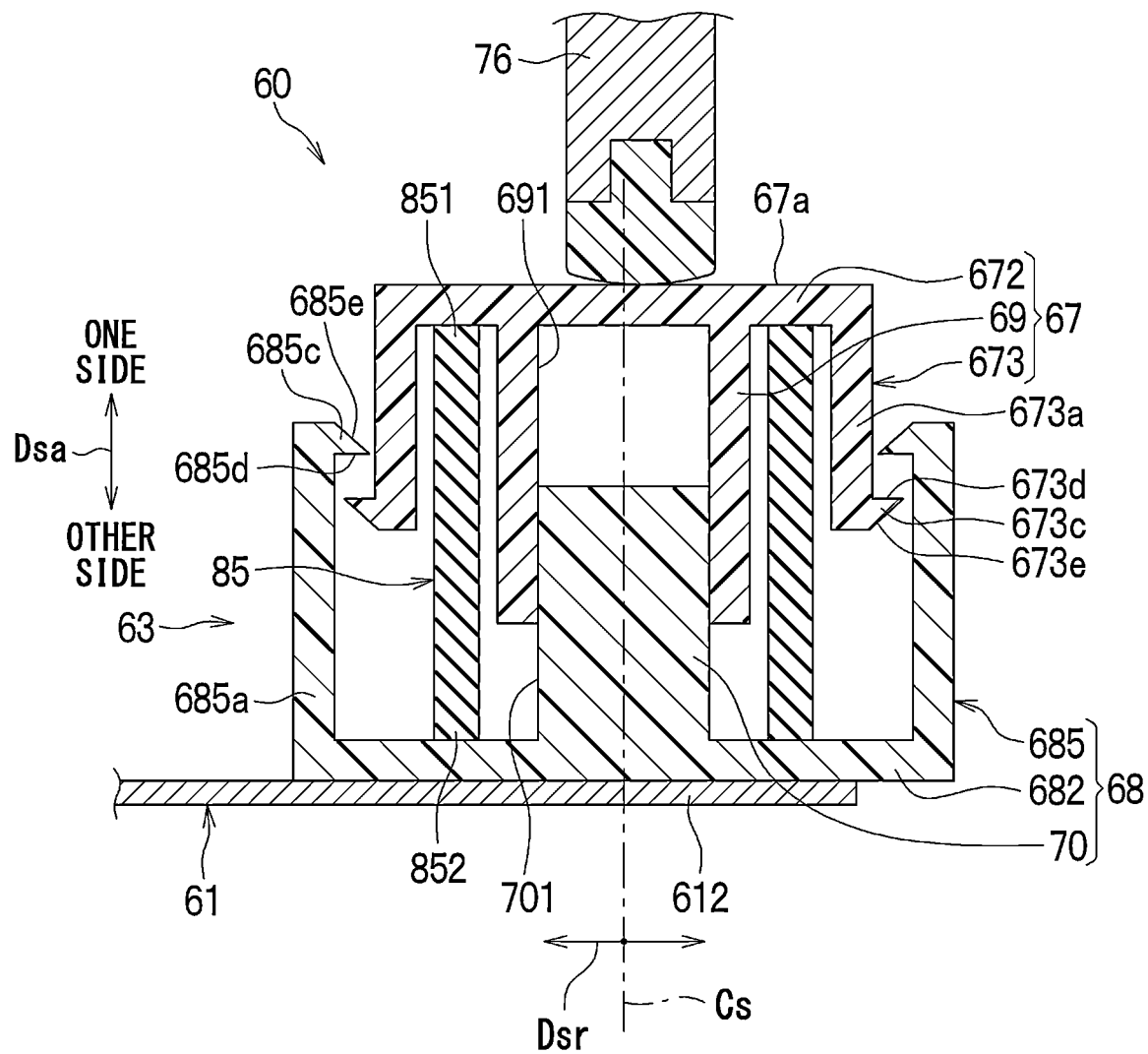
FIG. 12 is a schematic cross-sectional view showing the resilient unit in the non-depressed state of the pedal according to a third embodiment, corresponding to FIG. 11.

As shown in FIG. 12, the resilient unit 63 includes a resilient member 85 in place of the coil spring 75 (see FIG. 11). Since this resilient member 85 corresponds to the coil spring 75 of the second embodiment and replaces this coil spring 75, the resilient member 85 forms the resilient device of the present disclosure, which is clamped between and compressed and deformed by the first holder and the second holder.

For example, like the coil spring 75 of the second embodiment, the resilient member 85 of the present embodiment is resiliently compressed in the non-depressed state of the pedal 40. The resilient member 85 is made of a resilient material, such as rubber or urethane foam which is resiliently deformable.

Furthermore, the resilient member 85 of the present embodiment is shaped in a cylindrical tubular form being coaxial with the unit central axis Cs, and thereby the unit axial direction Dsa serves as an axial direction of the resilient member 85, and the unit radial direction Dsr serves as a radial direction of the resilient member 85. The resilient member 85 has: one end portion 851, which is located on the one side in the unit axial direction Dsa; and the other end portion 852, which is located on the other side in the unit axial direction Dsa.

The one-side contact portion 672 of the one-side holder 67 contacts the one end portion 851 of the resilient member 85 from the one side in the unit axial direction Dsa. Furthermore, the other-side contact portion 682 of the other-side holder 68 contacts the other end portion 852 of the resilient member 85 from the other side in the unit axial direction Dsa. As described above, like the coil spring 75 of the second embodiment, the resilient member 85 is clamped between the one-side contact portion 672 and the other-side contact portion 682 in the unit axial direction Dsa.

The outer guide portion 69 and the inner guide portion 70 are inserted into an inside of the resilient member 85 on a radially inner side of the resilient member 85.

The rest of the present embodiment, which is other than the above-described points, is the same as that of the second embodiment. Furthermore, according to the present embodiment, the advantages, which are achieved by the common configuration that is common to the second embodiment described above, can be obtained in the same manner as in the second embodiment.

Although the present embodiment is a modification based on the second embodiment, it is possible to combine the present embodiment with the first embodiment described above.

Fourth Embodiment

Next, the fourth embodiment will be described. In the present embodiment, points, which are different from the second embodiment described above, will be mainly described.

Figure 13:
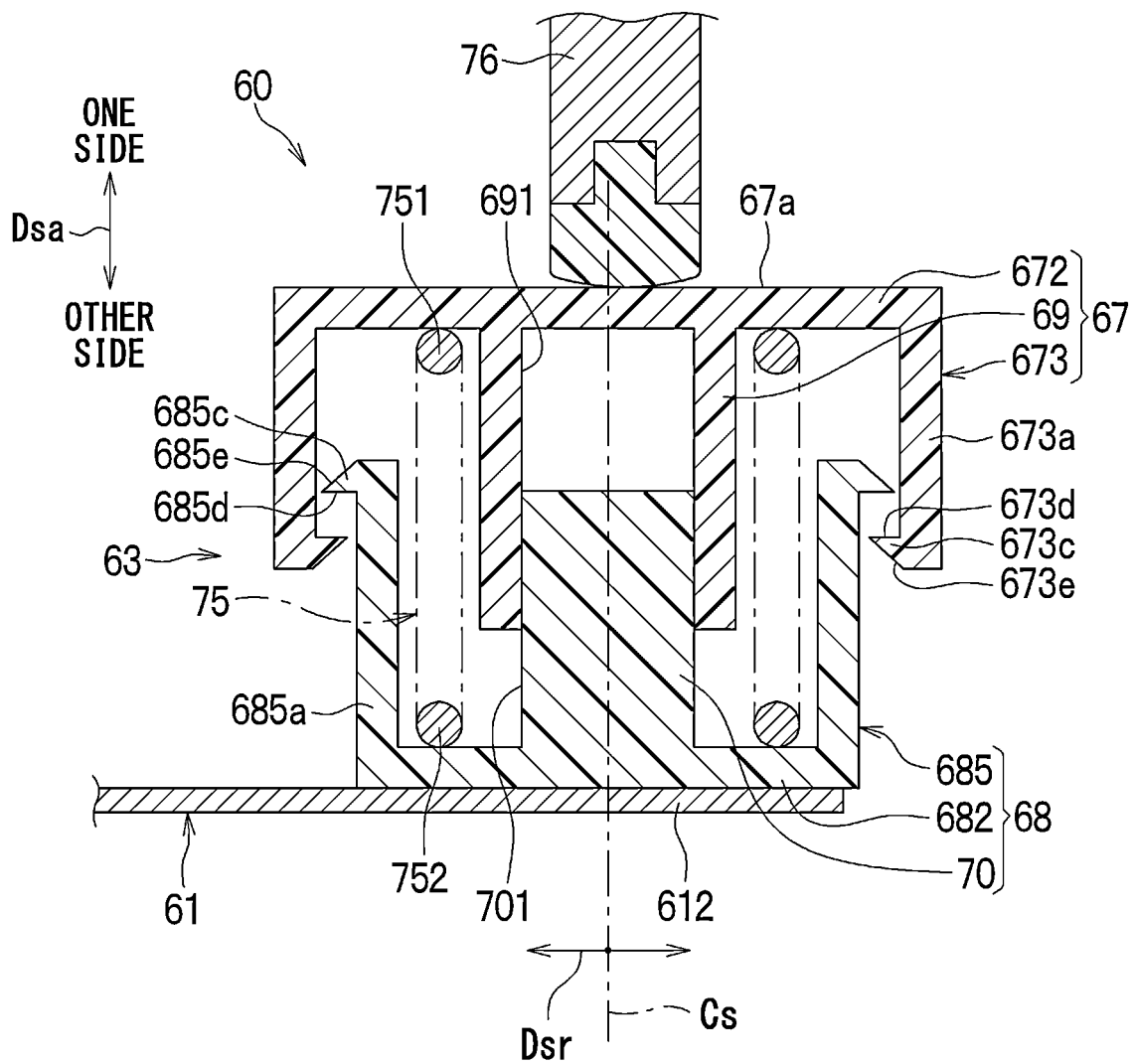
FIG. 13 is a schematic cross-sectional view showing the resilient unit in the non-depressed state of the pedal according to a fourth embodiment, corresponding to FIG. 11.

As shown in FIG. 13 even in the present embodiment, as in the second embodiment, the one-side disengagement stopper 673 of the one-side holder 67 and the other-side disengagement stoppers 685 of the other-side holder 68 form a snap-fit structure that limits relative movement between the one-side holder 67 and the other-side holder 68 in the unit axial direction Dsa. Furthermore, the one-side disengagement stopper 673 and the other-side disengagement stoppers 685 are placed on the outer side of the coil spring 75 in the unit radial direction Dsr.

However, in the present embodiment, a projecting direction of the one-side surface forming portion 673c, which forms this snap-fit structure, is opposite to that of the second embodiment. Furthermore, a projecting direction of each of the other-side surface forming portions 685c is opposite to that of the second embodiment.

Specifically, the one-side surface forming portion 673c of the present embodiment projects inward in the unit radial direction Dsr from the end portion of the one-side surface support portion 673a, which faces the other side in the unit axial direction Dsa. Although the one-side surface 673d of the one-side disengagement stopper 673 faces the one side in the unit axial direction Dsa like the second embodiment, the orientation of the sloped surface 673e is different from the second embodiment. Specifically, the sloped surface 673e is tilted relative to the unit central axis Cs such that the sloped surface 673e progressively approaches the other side in the unit axial direction Dsa as the sloped surface 673e extends outward in the unit radial direction Dsr.

Each of the other-side surface support portions 685a of the present embodiment is positioned on the inner side of the one-side surface forming portion 673c in the unit radial direction Dsr, while this positioning is opposite to the other-side surface support portion 685a of the second embodiment. Also, each of the other-side surface forming portions 685c projects outward in the unit radial direction Dsr from an end portion of the corresponding other-side surface support portion 685a, which faces the one side in the unit axial direction Dsa. Although the other-side surface 685d of each of the other-side disengagement stoppers 685 faces the other side in the unit axial direction Dsa like the second embodiment, the orientation of the sloped surface 685e is different from the second embodiment. Specifically, the sloped surface 685e is tilted relative to the unit central axis Cs such that the sloped surface 685e progressively approaches the other side in the unit axial direction Dsa as the sloped surface 685e extends outward in the unit radial direction Dsr.

The rest of the present embodiment, which is other than the above-described points, is the same as that of the second embodiment. Furthermore, according to the present embodiment, the advantages, which are achieved by the common configuration that is common to the second embodiment described above, can be obtained in the same manner as in the second embodiment.

Fifth Embodiment

Next, the fifth embodiment will be described. In the present embodiment, points, which are different from the fourth embodiment described above, will be mainly described.

Figure 14:
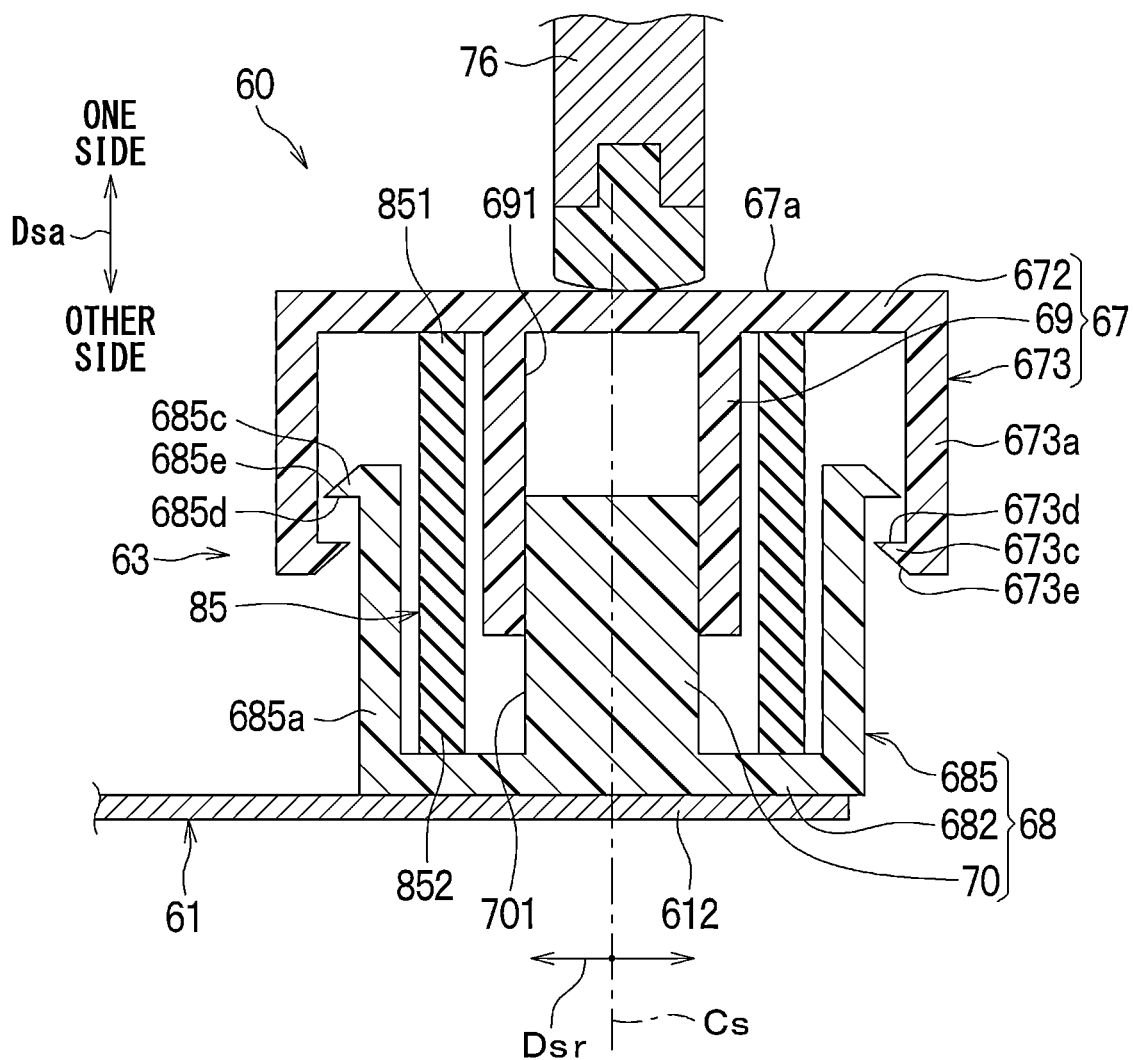
FIG. 14 is a schematic cross-sectional view showing the resilient unit in the non-depressed state of the pedal according to a fifth embodiment, corresponding to FIG. 11.

As shown in FIG. 14, the resilient unit 63 includes the resilient member 85 in place of the coil spring 75 (see FIG. 13). This resilient member 85 corresponds to and is used in place of the coil spring 75 of the fourth embodiment. The resilient member 85 of the present embodiment is the same as the resilient member 85 of the third embodiment.

The rest of the present embodiment, which is other than the above-described point, is the same as that of the fourth embodiment. Furthermore, in the present embodiment, the advantages, which are achieved by the common configuration that is common to the fourth embodiment described above, can be obtained in the same manner as in the fourth embodiment.

Sixth Embodiment

Next, the sixth embodiment will be described. In the present embodiment, points, which are different from the first embodiment, will be mainly described.

Figure 15:
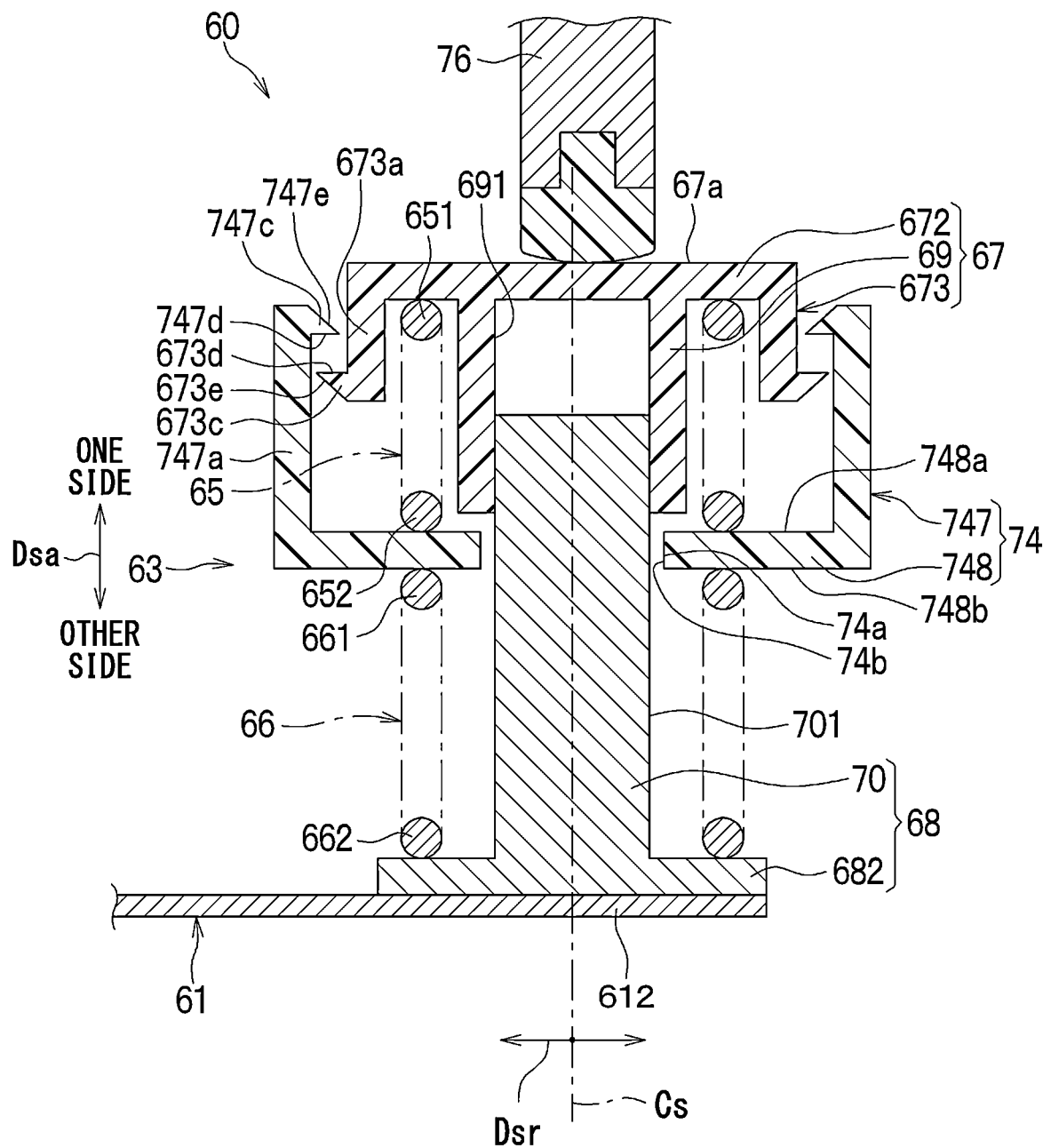
FIG. 15 is a schematic cross-sectional view showing the resilient unit in the non-depressed state of the pedal according to a sixth embodiment, corresponding to FIG. 11.

As shown in FIG. 15, in the present embodiment, the shape of the intermediate holder 74 is different from that of the first embodiment. Furthermore, in the present embodiment, unlike the first embodiment, the diameter of the first coil spring 65 and the diameter of the second coil spring 66 are equal to each other.

In the present embodiment, the one-side holder 67 serves as the first holder of the present disclosure, and the intermediate holder 74 serves as the second holder of the present disclosure. Furthermore, the resilient device of the present disclosure, which is clamped between and is compressed and deformed by the first holder and the second holder, includes the first coil spring 65 that is one resilient member.

Specifically, the intermediate holder 74 of the present embodiment includes a main body 748 and the plurality of intermediate disengagement stoppers 747. Even in the present embodiment, as in the first embodiment, the intermediate holder 74 is made of the resin. The main body 748 and the intermediate disengagement stoppers 747 of the intermediate holder 74 are formed integrally in one-piece. Furthermore, even in the present embodiment, like the first embodiment, the one-side disengagement stopper 673 of the one-side holder 67 and the intermediate disengagement stoppers 747 of the intermediate holder 74 form the snap-fit structure.

The main body 748 of the intermediate holder 74 is shaped in a planar plate form, and the insertion hole 74a extends through the inside of the main body 748. As in the first embodiment, the inner guide portion 70 is inserted through the insertion hole 74a.

Furthermore, the main body 748 has: a one-side surface 748a, which faces the one side in the unit axial direction Dsa; and an other-side surface 748b, which faces the other side in the unit axial direction Dsa.

The first coil spring 65 is placed on the one side relative to the main body 748 of the intermediate holder 74 in the unit axial direction Dsa, and the second coil spring 66 is placed on the other side relative to the main body 748 in the unit axial direction Dsa. Furthermore, the one-side surface 748a of the main body 748 contacts the other end portion 652 of the first coil spring 65 from the other side in the unit axial direction Dsa, and the other-side surface 748b of the main body 748 contacts the one end portion 661 of the second coil spring 66 from the one side in the unit axial direction Dsa. Therefore, the main body 748 of the intermediate holder 74 is clamped between the first coil spring 65 and the second coil spring 66 and is urged by the first coil spring 65 and the second coil spring 66 in the unit axial direction Dsa.

The intermediate holder 74 of the present embodiment does not have the spring intervening portion 741, the inner contact portion 742, the outer contact portion 743 and the hole forming portion 746 discussed in the first embodiment (see FIG. 5). Furthermore, each of the other-side surface support portions 747a of the intermediate holder 74 extends from an outer periphery of the main body 748 toward the one side in the unit axial direction Dsa. The intermediate holder 74 may have the holder through-hole 74c (FIG. 5) similar to that of the first embodiment, but in the present embodiment, the intermediate holder 74 does not have the holder through-hole 74c.

Furthermore, the inner guide portion 70 and the other-side contact portion 682 of the other-side holder 68 are not separately formed as the separate components but are formed integrally in one-piece as a one-piece component. The other-side holder 68 of the present embodiment may be made of resin or may be made of metal.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Seventh Embodiment

Next, the seventh embodiment will be described. In the present embodiment, points, which are different from the first embodiment, will be mainly described.

Figure 16:
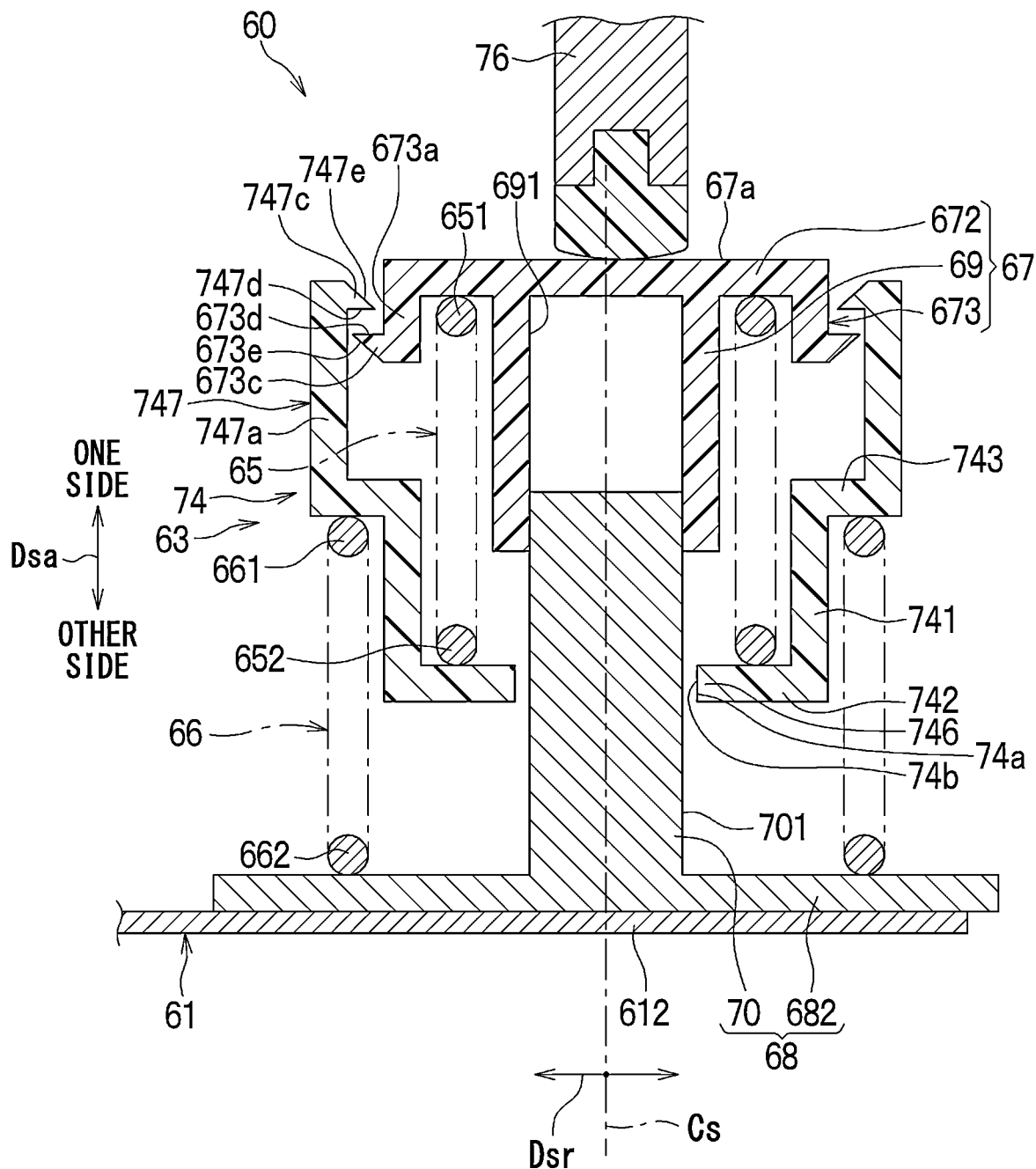
FIG. 16 is a schematic cross-sectional view showing the resilient unit in the non-depressed state of the pedal according to a seventh embodiment, corresponding to FIG. 11.

As shown in FIG. 16, the inner guide portion 70 and the other-side contact portion 682 of the other-side holder 68 are not separately formed as the separate components but are formed integrally in one-piece as a one-piece component. The other-side holder 68 of the present embodiment may be made of resin or may be made of metal. The intermediate holder 74 of the present embodiment may have the holder through-hole 74c (FIG. 5) similar to that of the first embodiment, but in this embodiment, the intermediate holder 74 does not have the holder through-hole 74c.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Eighth Embodiment

Next, the eighth embodiment will be described. In the present embodiment, points, which are different from the first embodiment, will be mainly described.

Figure 17:
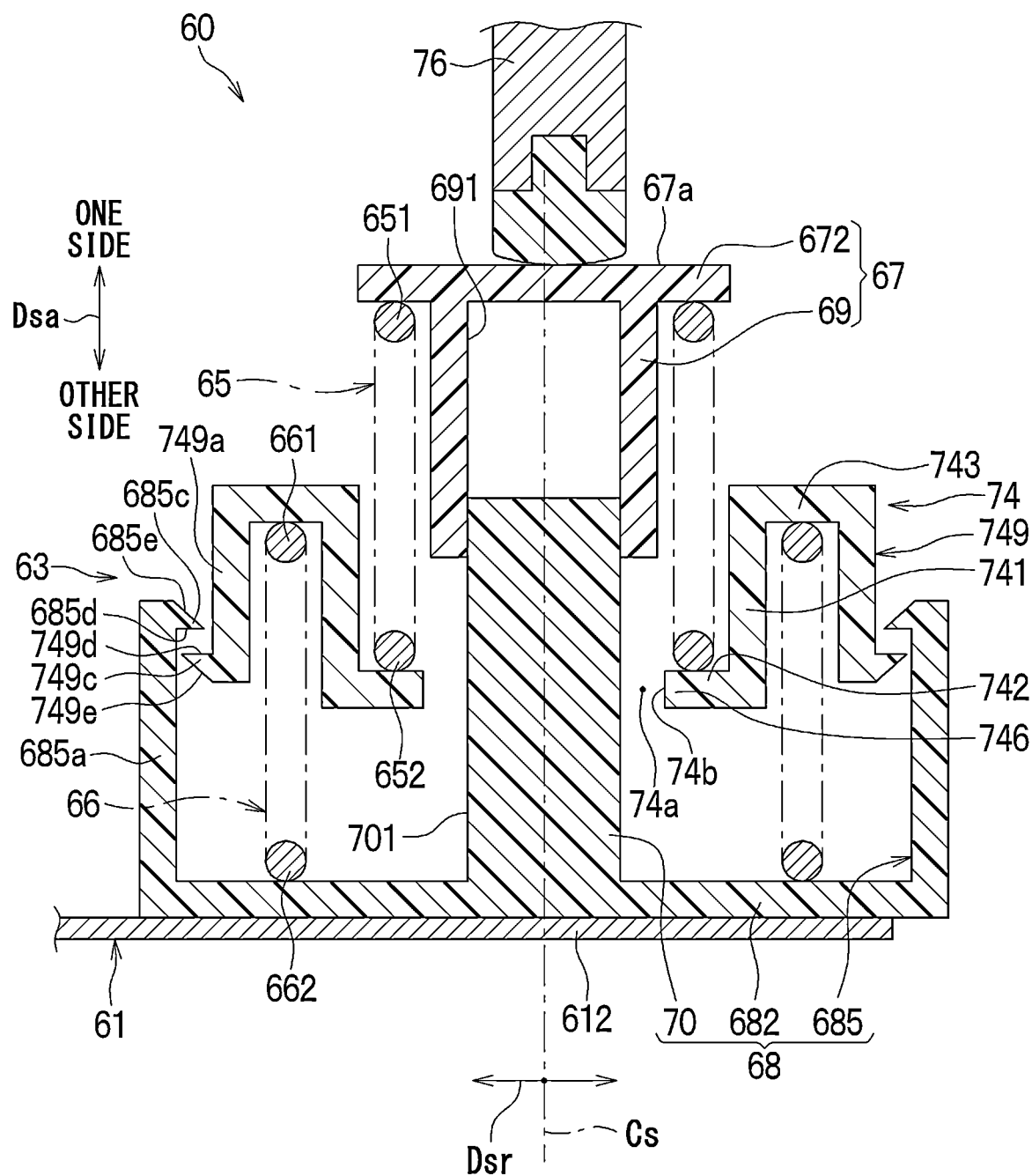
FIG. 17 is a schematic cross-sectional view showing the resilient unit in the non-depressed state of the pedal according to an eighth embodiment, corresponding to FIG. 11.

As shown in FIG. 17, in the present embodiment, the intermediate holder 74 has an intermediate disengagement stopper 749 in place of the intermediate disengagement stoppers 747 of the first embodiment. Furthermore, although the one-side holder 67 does not have the one-side disengagement stopper 673 (see FIG. 5), the other-side holder 68 has the other-side disengagement stoppers 685. The intermediate holder 74 of the present embodiment does not have the holder through-holes 74c (see FIG. 5).

In the present embodiment, the intermediate holder 74 serves as the first holder of the present disclosure, and the other-side holder 68 serves as the second holder of the present disclosure. Furthermore, the resilient device of the present disclosure, which is clamped between and is compressed and deformed by the first holder and the second holder of the present disclosure, includes the second coil spring 66 that is one resilient member.

The intermediate disengagement stopper 749 of the present embodiment has the same configuration as that of the one-side disengagement stopper 673 (see FIG. 5) of the first embodiment except that the intermediate disengagement stopper 749 is included in the intermediate holder 74.

Therefore, in the present embodiment, the intermediate disengagement stopper 749 serves as the primary disengagement stopper of the present disclosure. Furthermore, the intermediate disengagement stopper 749 of the present embodiment has: a one-side surface support portion 749a, which is similar to the one-side surface support portion 673a of the first embodiment; and a one-side surface forming portion 749c, which is similar to the one-side surface forming portion 673c of the first embodiment. The one-side surface forming portion 749c has: a one-side surface 749d, which is similar to the one-side surface 673d of the first embodiment; and a sloped surface 749e, which is similar to the sloped surface 673e of the first embodiment.

However, since the one-side surface support portion 749a forms part of the intermediate holder 74, the one-side surface support portion 749a is joined to the outer contact portion 743 of the intermediate holder 74. The one-side surface support portion 749a extends from an outer periphery of the outer contact portion 743 toward the other side in the unit axial direction Dsa and is positioned on the outer side of the second coil spring 66 in the unit radial direction Dsr.

For example, the intermediate holder 74 of the present embodiment is made of resin, and the spring intervening portion 741, the inner contact portion 742, the outer contact portion 743, the hole forming portion 746 and the intermediate disengagement stopper 749 are formed integrally in one-piece as a single component.

Each of the other-side disengagement stoppers 685 of the present embodiment has the same configuration as that of the intermediate disengagement stopper 747 (see FIG. 5) of the first embodiment except that the other-side disengagement stopper 685 is included in the other-side holder 68. That is, each of the other-side disengagement stoppers 685 of the present embodiment serves as the secondary disengagement stopper of the present disclosure and has the other-side surface support portion 685a and the other-side surface forming portion 685c like the other-side disengagement stopper 685 (see FIG. 11) of the second embodiment. For example, the other-side holder 68 of the present embodiment is made of resin, and the inner guide portion 70, the other-side contact portion 682 and the other-side disengagement stoppers 685 are formed integrally in one-piece as a single component.

In the present embodiment, the intermediate disengagement stopper 749 of the intermediate holder 74 and the other-side disengagement stoppers 685 of the other-side holder 68 form the snap-fit structure which is similar to that of the first embodiment. In the present embodiment, one or both of the one-side surface support portion 749a of the intermediate holder 74 and the other-side surface support portions 685a of the other-side holder 68 can be resiliently deformed and flexed in the unit radial direction Dsr. This allows the intermediate holder 74 and the other-side holder 68 to be combined to form the snap-fit structure, or to disassemble that snap-fit structure.

Furthermore, even in the present embodiment, as in the first embodiment, when the release-time stopper 781 (see FIG. 4) is damaged for some reason, the pedal 40 no longer limits and thus releases the movement of the intermediate holder 74 toward the one side in the unit axial direction Dsa.

In this case, the intermediate holder 74 is relatively moved relative to the other-side holder 68 toward the one side in the unit axial direction Dsa until the other-side surfaces 685d of the other-side disengagement stoppers 685 abut against the one-side surface 749d of the intermediate disengagement stopper 749. Then, when the other-side surfaces 685d abut against the one-side surface 749d in the unit axial direction Dsa, the relative positional relationship between the intermediate holder 74 and the other-side holder 68 is fixed.

That is, when the other-side disengagement stoppers 685 of the present embodiment abut against the intermediate disengagement stopper 749 in the unit axial direction Dsa, the movement of the intermediate holder 74 relative to the other-side holder 68 toward the one side in the unit axial direction Dsa beyond the predetermined limit is limited. This predetermined limit is a relative position of the intermediate holder 74 with respect to the other-side holder 68 when the other-side surfaces 685d abut against the one-side surface 749d in the unit axial direction Dsa.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Ninth Embodiment

Next, the ninth embodiment will be described. In the present embodiment, points, which are different from the eighth embodiment described above, will be mainly described.

Figure 18:
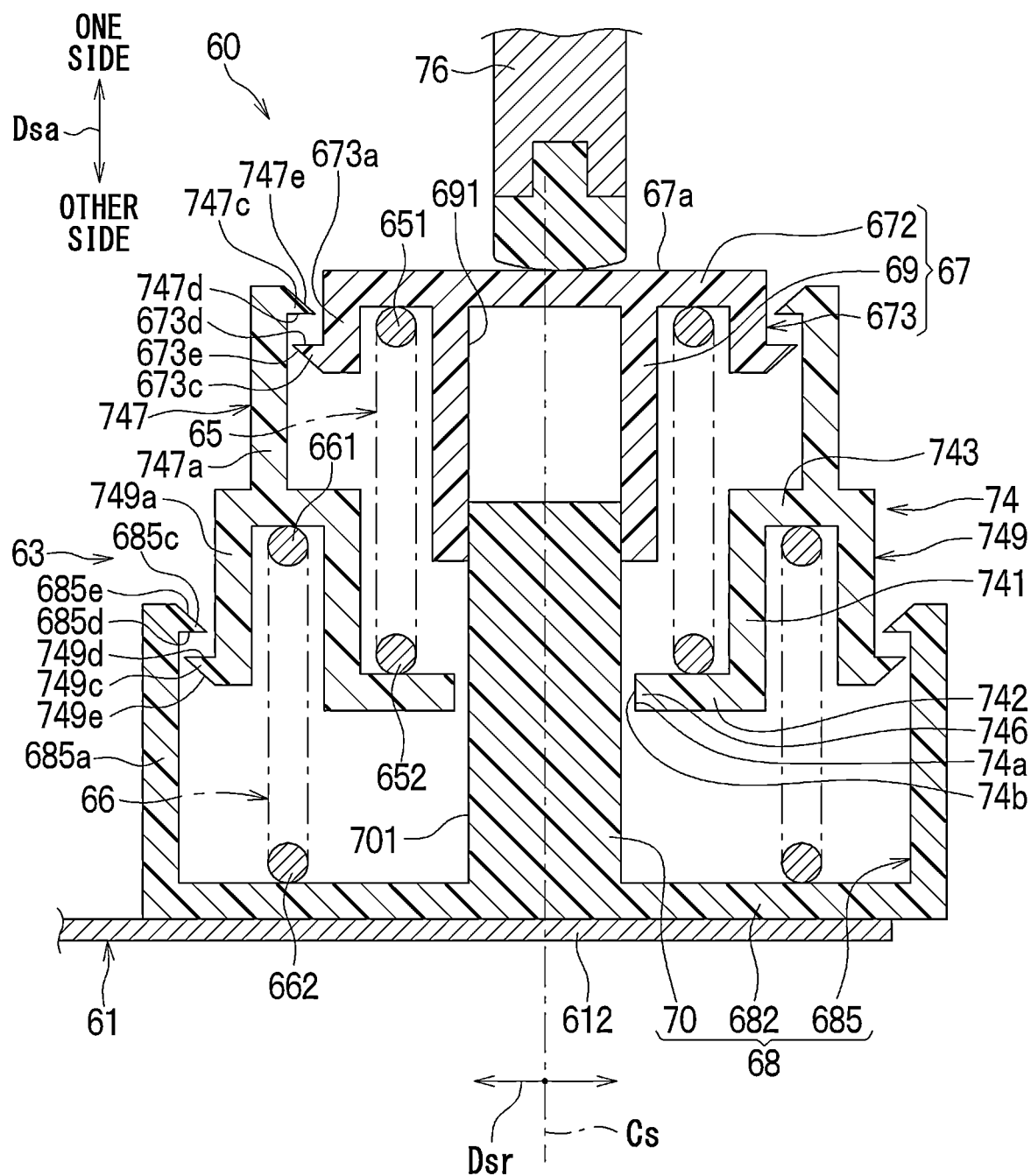
FIG. 18 is a schematic cross-sectional view showing the resilient unit in the non-depressed state of the pedal according to a ninth embodiment, corresponding to FIG. 11.

As shown in FIG. 18, in the present embodiment, in addition to the configuration discussed in the eighth embodiment, the one-side holder 67 has the one-side disengagement stopper 673 which is similar to that of the first embodiment. Furthermore, the intermediate holder 74 has the intermediate disengagement stoppers 747, which are similar to those of the first embodiment, in addition to the intermediate disengagement stopper 749, which is similar to that of the eighth embodiment. In the description of the present embodiment, the intermediate disengagement stoppers 747, which are similar to those of the first embodiment, will be referred to as primary intermediate disengagement stoppers 747, and the intermediate disengagement stopper 749, which is similar to that of the eighth embodiment, will be referred to as a secondary intermediate disengagement stopper 749.

Therefore, in the present embodiment, the two snap-fit structures are provided. Specifically, the one-side disengagement stopper 673 of the one-side holder 67 and the primary intermediate disengagement stoppers 747 of the intermediate holder 74 form the snap-fit structure. Also, the secondary intermediate disengagement stopper 749 of the intermediate holder 74 and the other-side disengagement stoppers 685 of the other-side holder 68 form the snap-fit structure.

Furthermore, with respect to the relationship between the one-side holder 67 and the intermediate holder 74, the one-side holder 67 serves as the first holder of the present disclosure, and the intermediate holder 74 serves as the second holder of the present disclosure. Furthermore, the resilient device of the present disclosure, which is clamped between and is compressed and deformed by the first holder and the second holder, includes the first coil spring 65 that is one resilient member. Furthermore, the one-side disengagement stopper 673 serves as the primary disengagement stopper of the present disclosure, and the primary intermediate disengagement stoppers 747 serve as the secondary disengagement stoppers of the present disclosure.

Furthermore, with respect to the relationship between the intermediate holder 74 and the other-side holder 68, the intermediate holder 74 serves as the first holder of the present disclosure, and the other-side holder 68 serves as the second holder of the present disclosure. Furthermore, the resilient device of the present disclosure, which is clamped between and is compressed and deformed by the first holder and the second holder, includes the second coil spring 66 that is one resilient member. Furthermore, the secondary intermediate disengagement stopper 749 serves as the primary disengagement stopper of the present disclosure, and the other-side disengagement stoppers 685 serve as the secondary disengagement stoppers of the present disclosure.

The rest of the present embodiment, which is other than the above-described points, is the same as that of the eighth embodiment. Furthermore, in the present embodiment, the advantages, which are achieved by the common configuration that is common to the eighth embodiment described above, can be obtained in the same manner as in the eighth embodiment.

Tenth Embodiment

Next, the tenth embodiment will be described. In the present embodiment, points, which are different from the first embodiment, will be mainly described.

Figure 19:
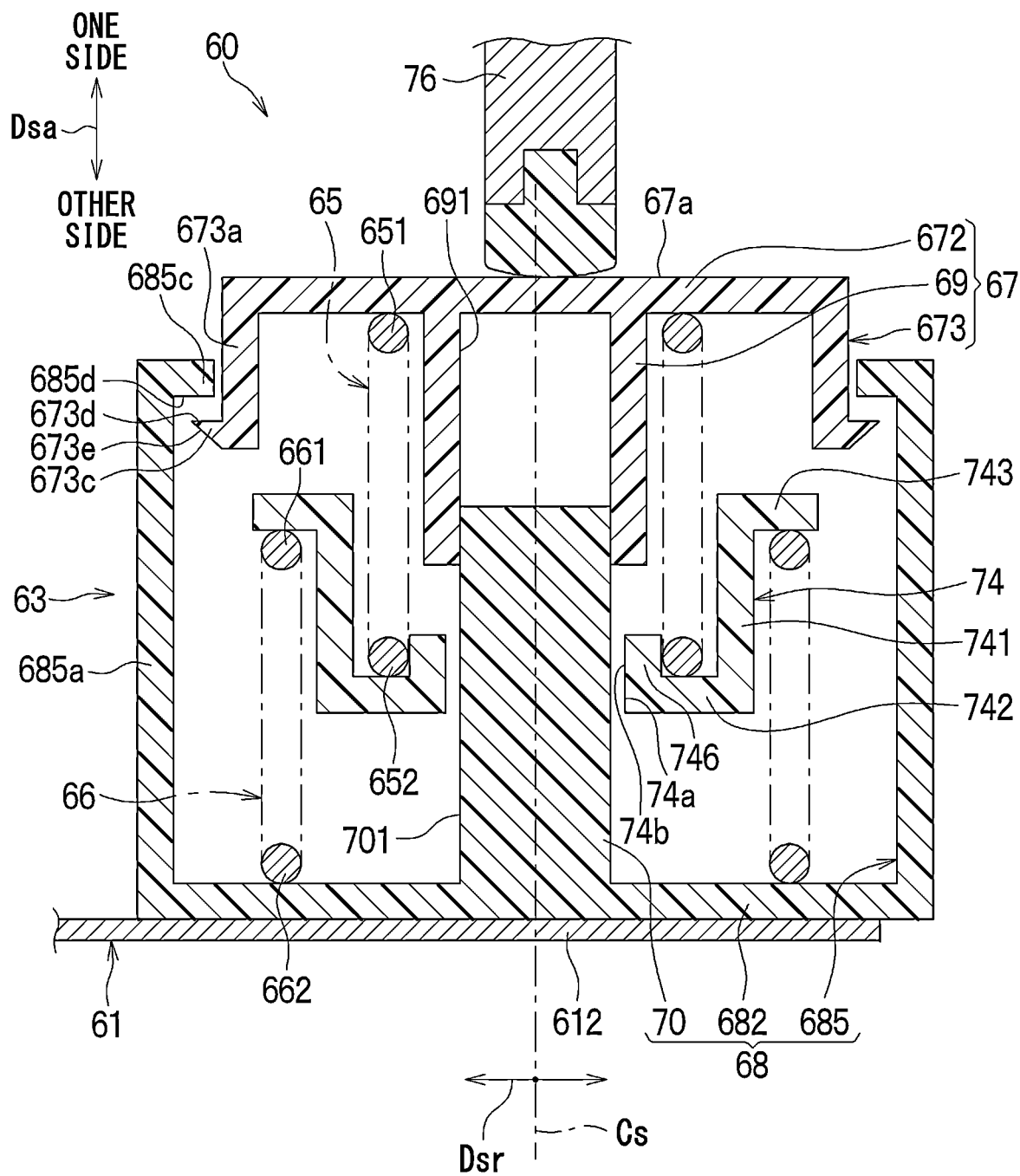
FIG. 19 is a cross-sectional view schematically showing the resilient unit in the non-depressed state of the pedal according to a tenth embodiment, corresponding to FIG. 11.

As shown in FIG. 19, in the present embodiment, the intermediate holder 74 does not have the intermediate disengagement stoppers 747 (see FIG. 5). Instead, the other-side holder 68 includes the other-side disengagement stoppers 685 which serve as the secondary disengagement stoppers of the present disclosure. Even in the present embodiment, as in the first embodiment, the one-side disengagement stopper 673 of the one-side holder 67 serves as the primary disengagement stopper of the present disclosure.

In the present embodiment, the one-side holder 67 serves as the first holder of the present disclosure, and the other-side holder 68 serves as the second holder of the present disclosure. The resilient device of the present disclosure, which is clamped between and is compressed and deformed by the first holder and the second holder, includes the first coil spring 65 and the second coil spring 66 that are the plurality of resilient members. The intermediate holder 74 is provided as another component of the present disclosure that is different from the first holder and the second holder.

Each of the other-side disengagement stoppers 685 of the present embodiment has the other-side surface support portion 685a and the other-side surface forming portion 685c like the other-side disengagement stopper 685 (see FIG. 17) of the eighth embodiment. However, the other-side surface forming portion 685*c* of the present embodiment does not have the sloped surface which corresponds to the sloped surface 685*e* (see FIG. 17) of the eighth embodiment. That is, the surface of the other-side surface forming portion 685*c*, which is opposite to the other-side surface 685*d*, is not formed as a sloped surface tilted relative to the unit central axis Cs but is, for example, a planar surface perpendicular to the unit central axis Cs.

For example, the other-side holder 68 of the present embodiment is made of resin or metal, and the inner guide portion 70, the other-side contact portion 682 and the other-side disengagement stoppers 685 are formed integrally in one-piece as a single component.

In the present embodiment, the one-side disengagement stopper 673 of the one-side holder 67 and the other-side disengagement stoppers 685 of the other-side holder 68 form the snap-fit structure which is similar to that of the first embodiment. In the present embodiment, for example, the plurality of other-side disengagement stoppers 685 are arranged in a manner similar to that of the intermediate disengagement stoppers 747 (see FIG. 5) of the first embodiment, and these other-side disengagement stoppers 685 can be resiliently deformed and flexed in the unit radial direction Dsr like the intermediate disengagement stoppers 747 of the first embodiment. This allows the one-side holder 67 and the other-side holder 68 to be combined to form the snap-fit structure, or to disassemble that snap-fit structure.

Furthermore, even in the present embodiment, as in the first embodiment, when the release-time stopper 781 (see FIG. 4) is damaged for some reason, the pedal 40 no longer limits and thus releases the movement of the one-side holder 67 toward the one side in the unit axial direction Dsa.

In this case, the one-side holder 67 is relatively moved relative to the other-side holder 68 toward the one side in the unit axial direction Dsa until the other-side surfaces 685*d* of the other-side disengagement stoppers 685 abut against the one-side surface 673*d* of the one-side disengagement stopper 673. Then, when the other-side surfaces 685*d* abut against the one-side surface 673*d* in the unit axial direction Dsa, the relative positional relationship between the one-side holder 67 and the other-side holder 68 is fixed.

That is, when the other-side disengagement stoppers 685 of the present embodiment abut against the one-side disengagement stopper 673 in the unit axial direction Dsa, the relative movement of the one-side holder 67 relative to the other-side holder 68 toward the one side in the unit axial direction Dsa beyond the predetermined limit is limited. This predetermined limit is the relative position of the one-side holder 67 with respect to the other-side holder 68 when the other-side surfaces 685*d* abut against the one-side surface 673*d* in the unit axial direction Dsa.

Furthermore, in the present embodiment, when the other-side disengagement stoppers 685 are in contact with the one-side disengagement stopper 673, the first coil spring 65, the second coil spring 66 and the intermediate holder 74 are held between the one-side contact portion 672 and the other-side contact portion 682. Furthermore, each of the first coil spring 65 and the second coil spring 66 remains in the compressed and deformed state in the unit axial direction Dsa without expanding to its free length.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Eleventh Embodiment

Next, the eleventh embodiment will be described. In the present embodiment, points, which are different from the second embodiment described above, will be mainly described.

Figure 20:
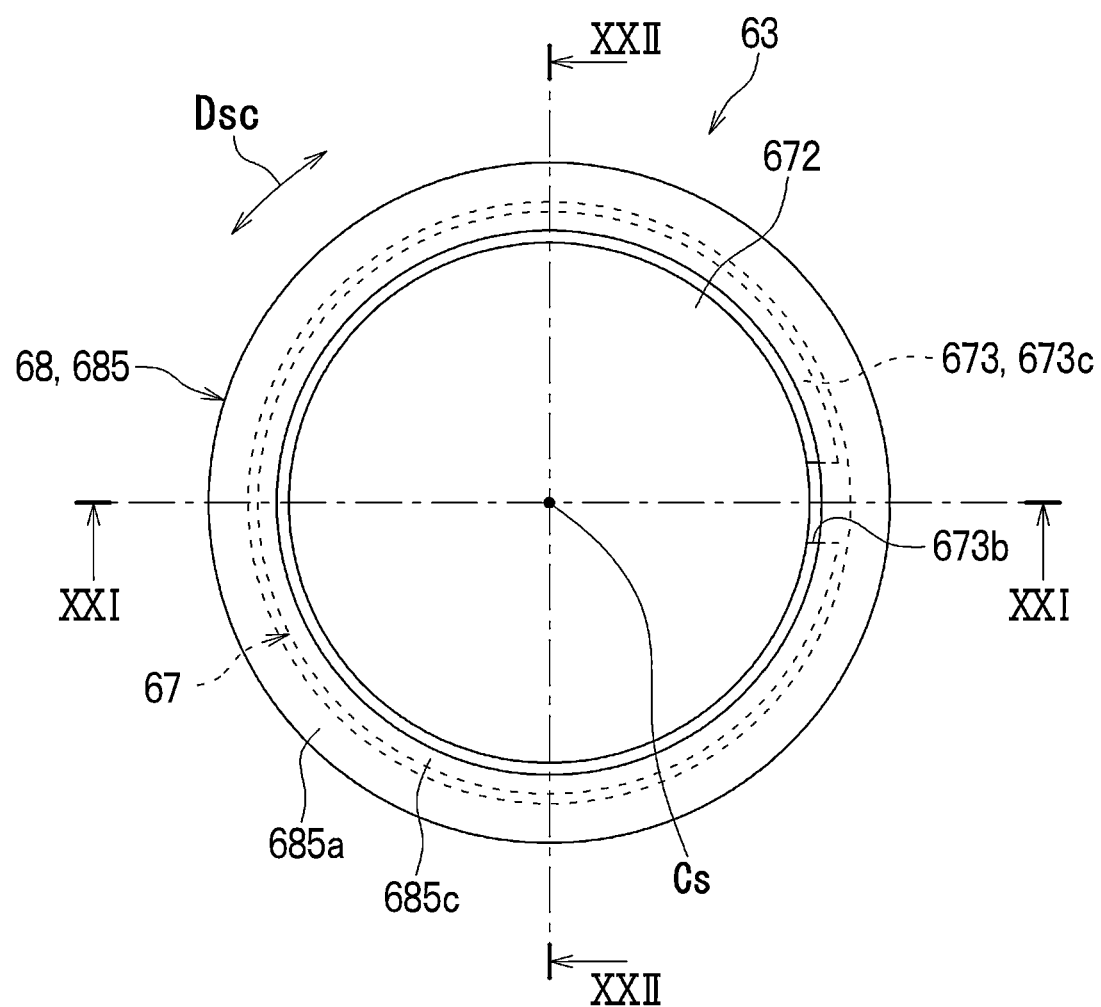
FIG. 20 is a view of the one-side holder and an other-side holder of the reaction force generation mechanism of an eleventh embodiment taken in a direction directed from one side to the other side in a unit axial direction, corresponding to FIG. 7.
Figure 21:
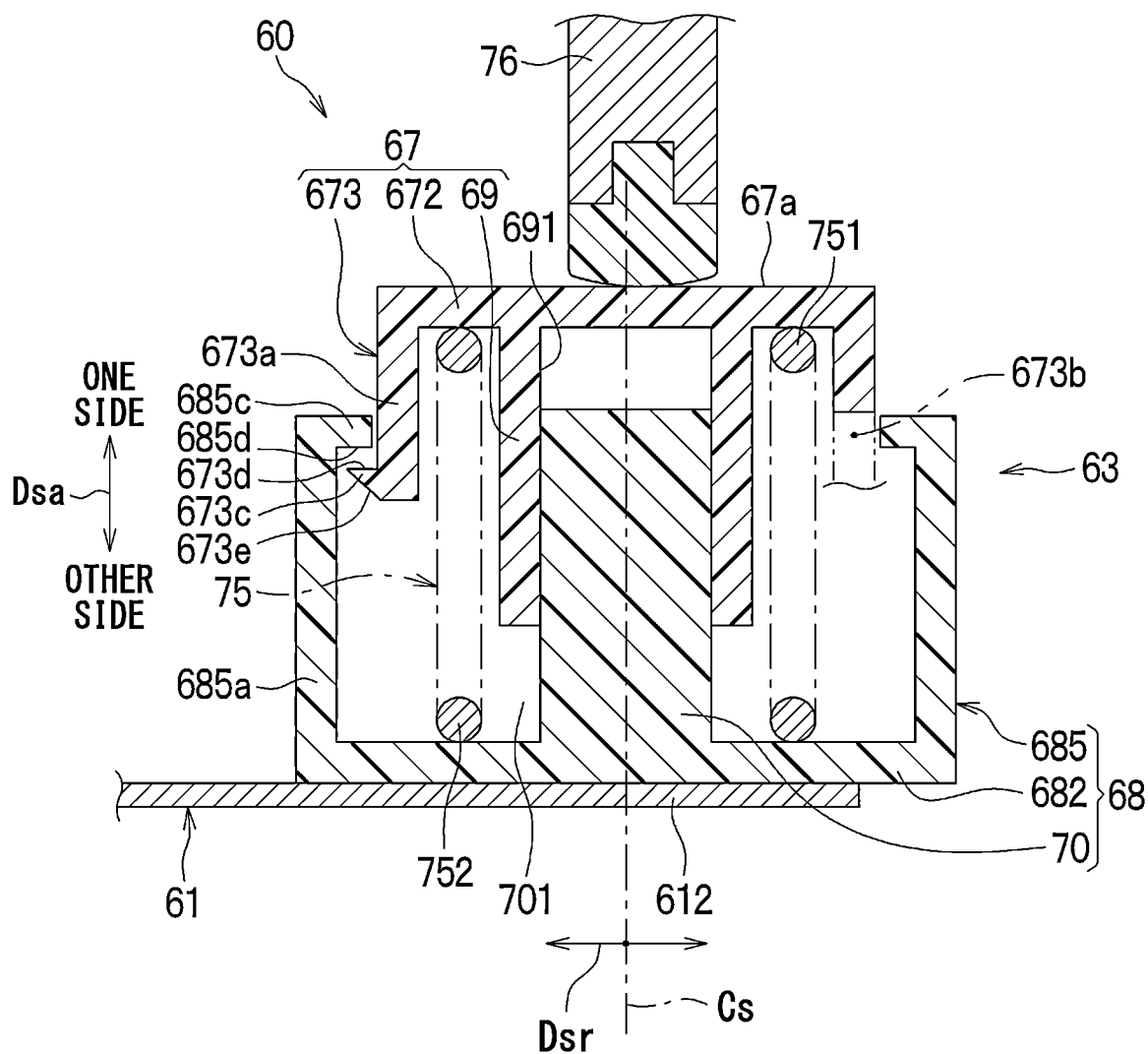
FIG. 21 is a cross-sectional view schematically showing the resilient unit in the non-depressed state of the pedal according to the eleventh embodiment, schematically indicating a cross-section of the resilient unit along a plane taken along line XXI-XXI in FIG. 20 and corresponding to FIG. 11.
Figure 22:
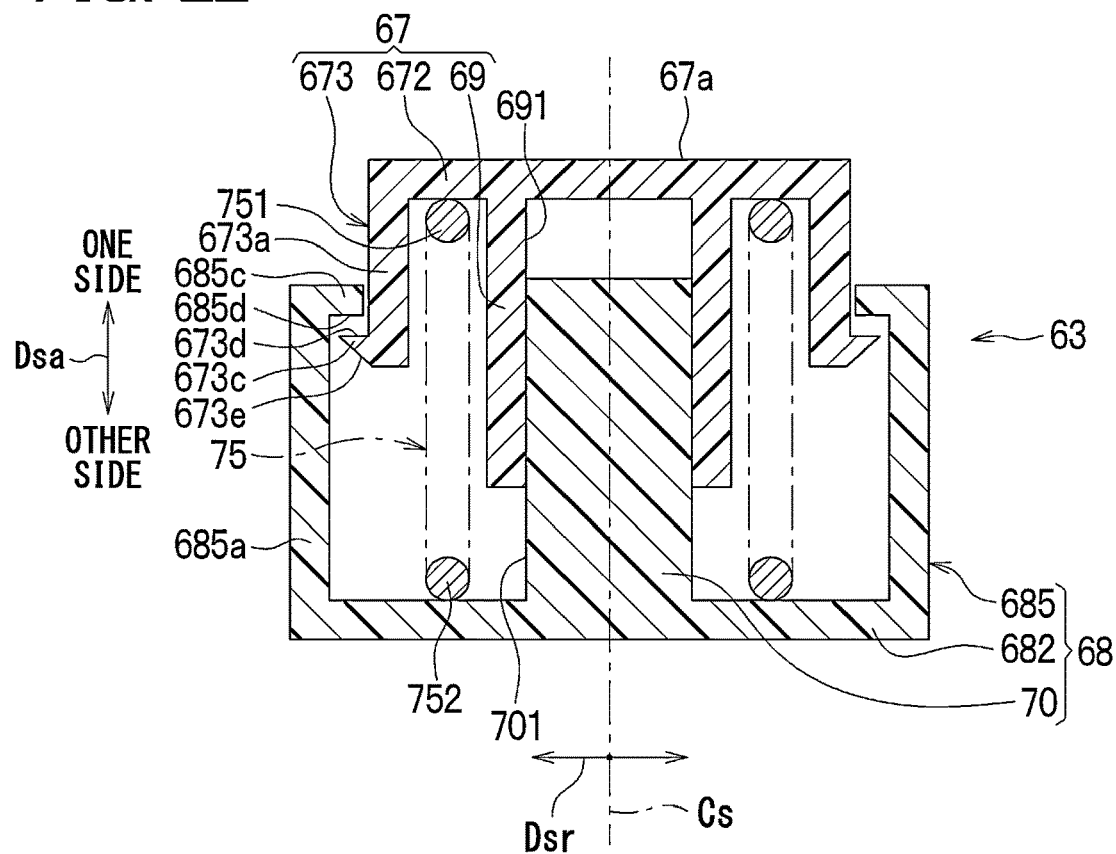
FIG. 22 is a cross-sectional view schematically showing a cross-section taken along line XXII-XXII in FIG. 20 according to the eleventh embodiment, indicating the resilient unit in the non-depressed state of the pedal.
Figure 23:
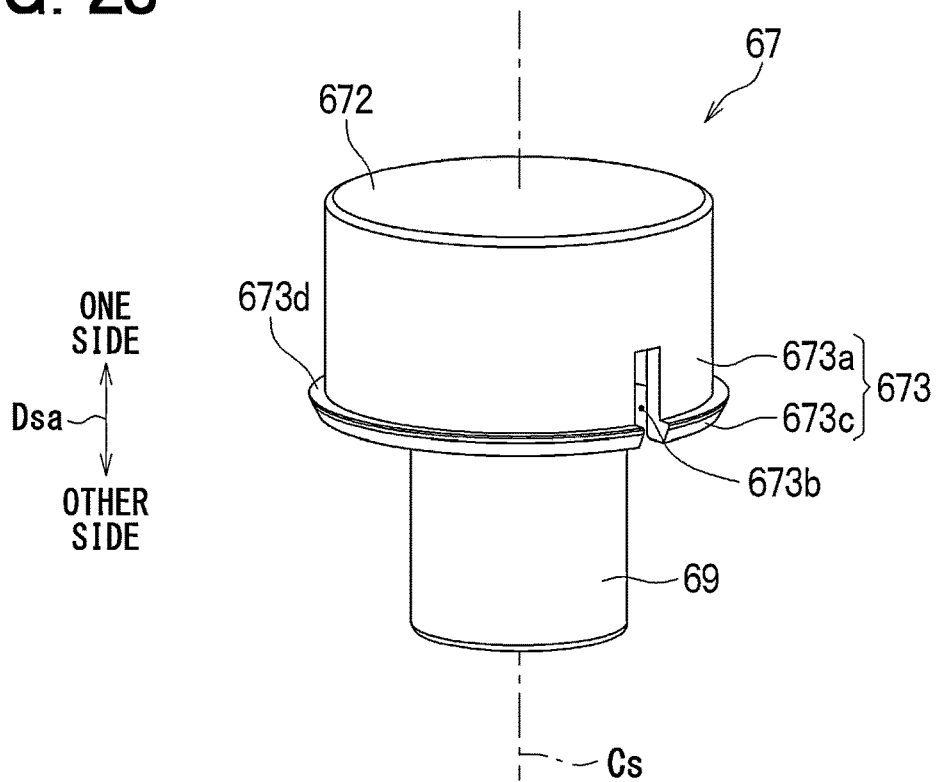
FIG. 23 is a perspective view of the one-side holder of the reaction force generation mechanism of the pedal device according to the eleventh embodiment, corresponding to FIG. 6.

As shown in FIGS. 20 to 22, in the present embodiment, only one other-side disengagement stopper 685 is provided instead of the plurality of other-side disengagement stoppers 685. The other-side surface support portion 685*a* of this other-side disengagement stopper 685 is positioned on the outer side of the one-side surface forming portion 673*c* in the unit radial direction Dsr. The other-side surface support portion 685*a* is shaped generally in a tubular form such that the other-side surface support portion 685*a* extends from the other-side contact portion 682 toward the one side in the unit axial direction Dsa and circumferentially surrounds the one-side surface forming portion 673*c*.

Furthermore, in the present embodiment, the other-side surface forming portion 685*c* circumferentially surrounds the unit central axis Cs. However, the other-side surface forming portion 685*c* of the present embodiment does not have the sloped surface which corresponds to the sloped surface 685*e* (see FIG. 11) of the second embodiment. That is, the surface of the other-side surface forming portion 685*c*, which is opposite to the other-side surface 685*d*, is not formed as a sloped surface tilted relative to the unit central axis Cs but is, for example, a planar surface perpendicular to the unit central axis Cs.

Like the second embodiment, the one-side surface support portion 673*a* of the present embodiment is shaped generally in the tubular form such that the one-side surface support portion 673*a* extends from the one-side contact portion 672 toward the other side in the unit axial direction Dsa and circumferentially surrounds the coil spring 75. However, unlike the second embodiment, as shown in FIGS. 20 to 23, the one-side surface support portion 673*a* of the present embodiment has a cutout groove 673*b* which is shaped in a form of a slit and is formed at a portion of a circumference of the one-side surface support portion 673*a* in the unit circumferential direction Dsc. This cutout groove 673*b* extends to the one-side surface forming portion 673*c*.

Since the cutout groove 673*b* is formed at the one-side disengagement stopper 673, the one-side surface support portion 673*a* can be resiliently deformed to displace the one-side surface forming portion 673*c* both inward and outward in the unit radial direction Dsr.

In FIG. 22, the indication of the plate spring 61 and the coupling rod 76 is omitted, and the indication of the plate spring 61 and the coupling rod 76 is omitted in the corresponding cross-sectional view which is discussed later and corresponds to FIG. 22.

In the present embodiment, the cutout groove 673*b* is formed at the one-side surface support portion 673*a* and the one-side surface forming portion 673*c*. Since the cutout groove 673*b* is provided, the one-side surface support portion 673*a* of the one-side holder 67 of the present embodiment can be resiliently deformed to flex in the unit radial direction Dsr. This allows the one-side holder 67 and the other-side holder 68 to be combined to form the snap-fit structure formed by the one-side disengagement stopper 673 and the other-side disengagement stopper 685, or to disassemble that snap-fit structure.

The rest of the present embodiment, which is other than the above-described points, is the same as that of the second embodiment. Furthermore, according to the present embodiment, the advantages, which are achieved by the common configuration that is common to the second embodiment described above, can be obtained in the same manner as in the second embodiment.

Twelfth Embodiment

Next, the twelfth embodiment will be described. In the present embodiment, points, which are different from the eleventh embodiment described above, will be mainly described.

Figure 24:
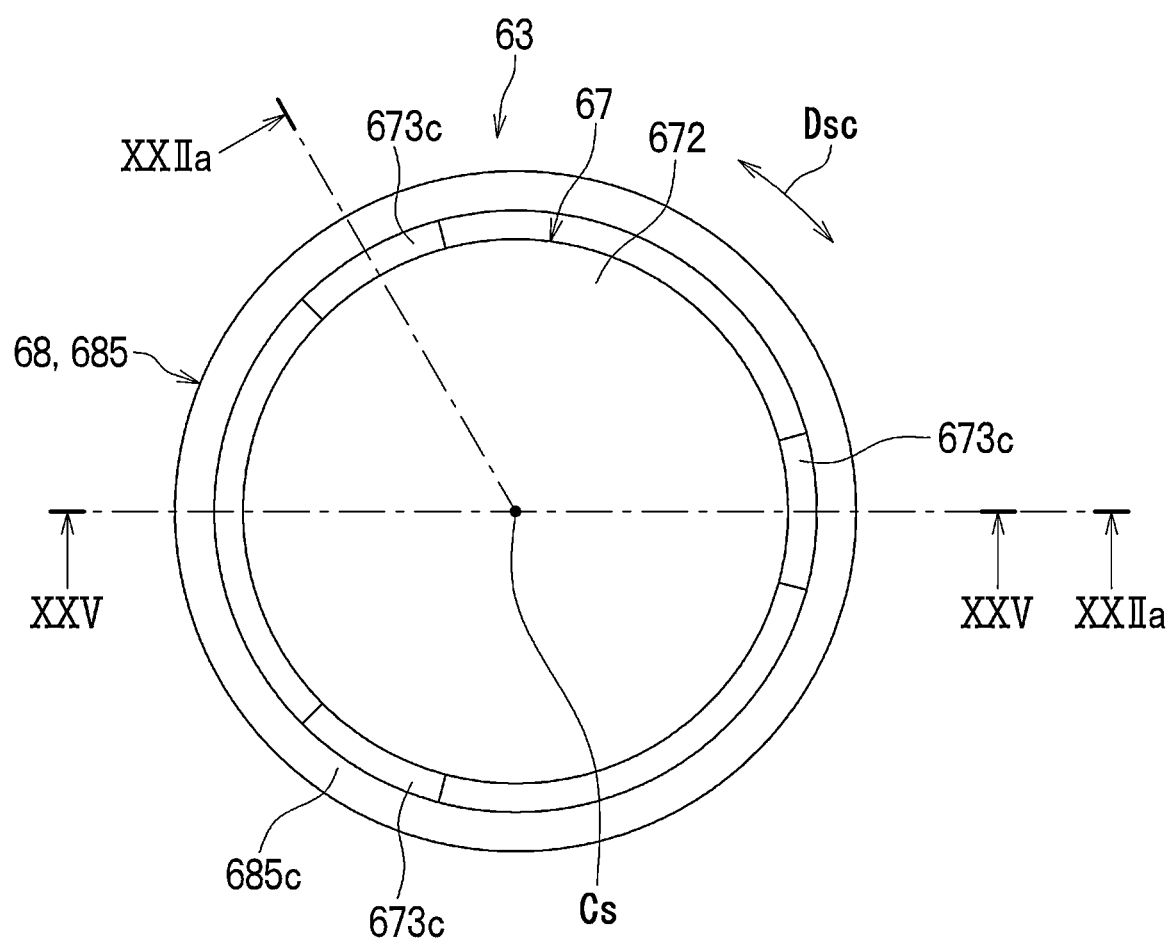
FIG. 24 is a view showing the one-side holder and the other-side holder of the reaction force generation mechanism according to a twelfth embodiment, corresponding to FIG. 20.
Figure 25:
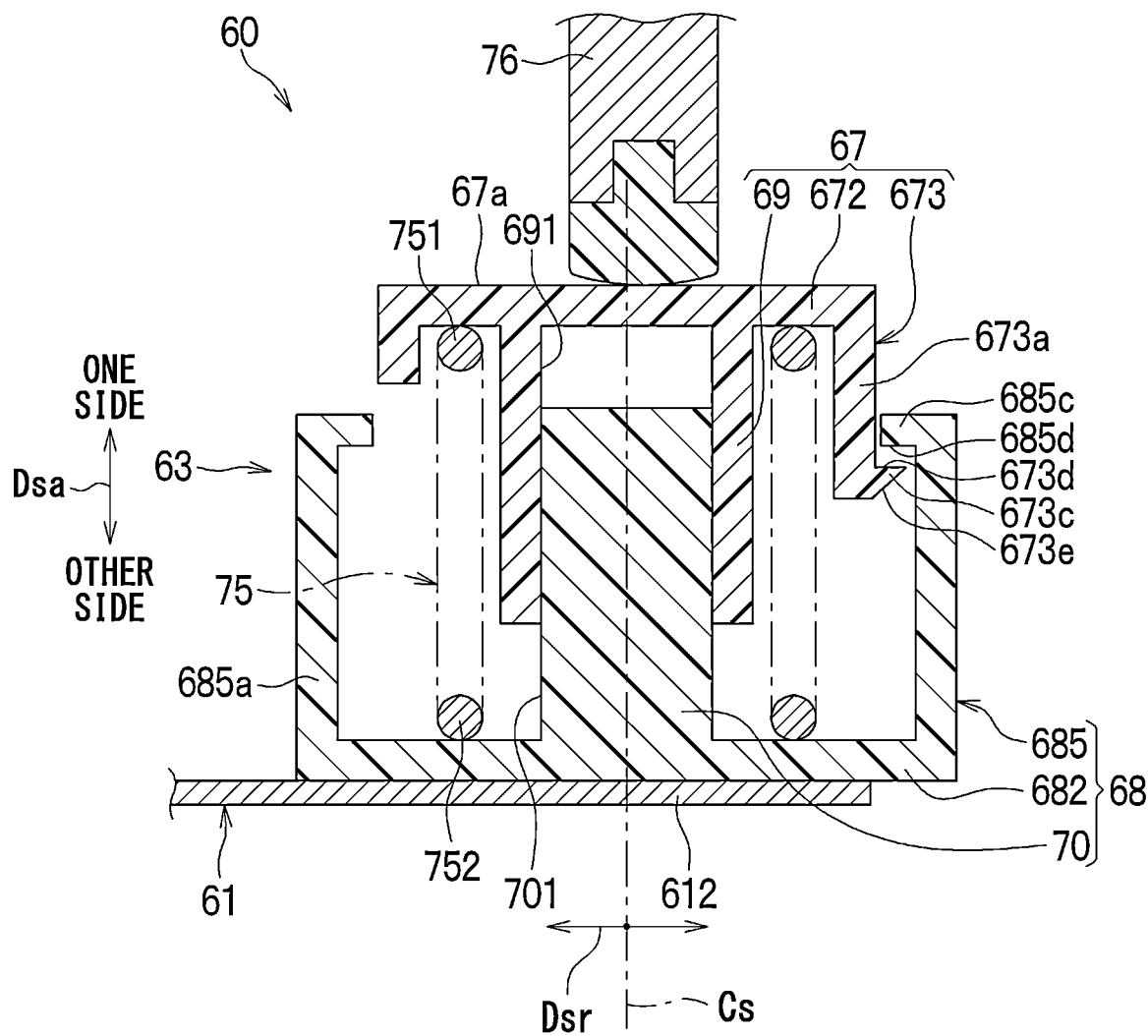
FIG. 25 is a cross-sectional view schematically showing the resilient unit in the non-depressed state of the pedal according to the twelfth embodiment, schematically indicating a cross-section of the resilient unit along a plane taken along line XXV-XXV in FIG. 24 and corresponding to FIG. 11.
Figure 26:
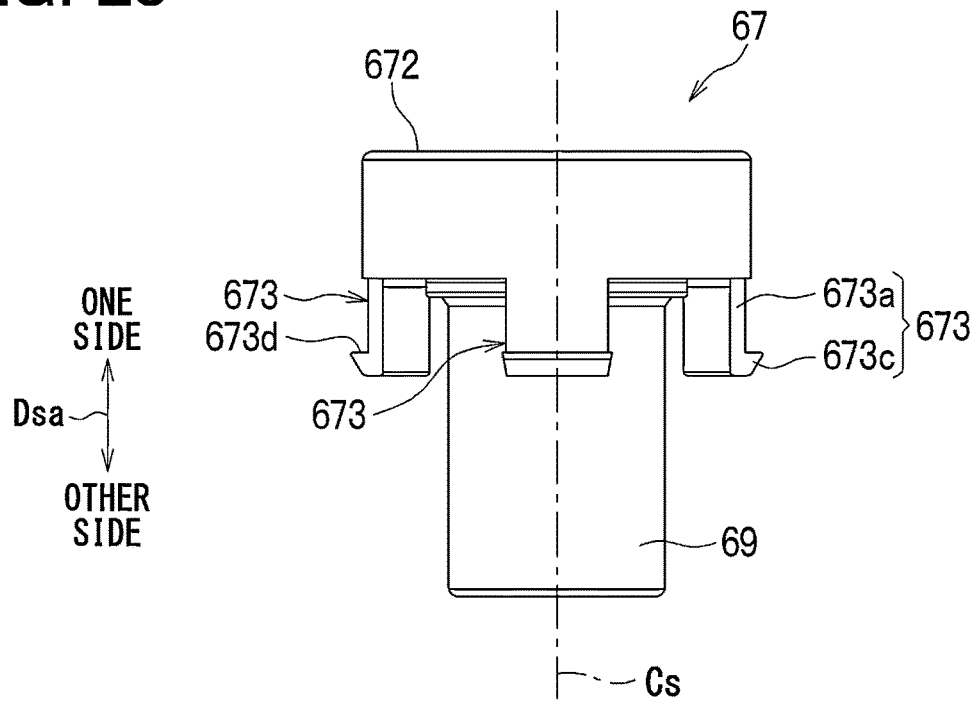
FIG. 26 is a view showing the one-side holder alone according to the twelfth embodiment.

As shown in FIGS. 24 to 26, a shape of each of a plurality of one-side disengagement stoppers 673 of the one-side holder 67 is different from that of the eleventh embodiment. A cross-section of the resilient unit 63 shown in the cross-section taken along line XXIIa-XXIIa in FIG. 24 is the same as the cross-section shown in FIG. 22.

In the present embodiment, the plurality (specifically three) of one-side disengagement stoppers 673 are provided. The plurality of one-side disengagement stoppers 673 are arranged at equal intervals in the unit circumferential direction Dsc.

Therefore, the one-side surface support portion 673a of each of the one-side disengagement stoppers 673 can be resiliently deformed to flex in the unit radial direction Dsr, as in the eleventh embodiment. This allows the one-side holder 67 and the other-side holder 68 to be combined to form the snap-fit structure formed by the one-side disengagement stoppers 673 and the other-side disengagement stopper 685, or to disassemble that snap-fit structure.

Furthermore, since the plurality of one-side disengagement stoppers 673 are provided such that each of the one-side disengagement stoppers 673 is resiliently deformable, the same number of snap-fit structures as the one-side disengagement stoppers 673, i.e., a plurality of snap-fit structures, is provided.

The rest of the present embodiment, which is other than the above-described points, is the same as that of the eleventh embodiment. Furthermore, in the present embodiment, the advantages, which are achieved by the common configuration that is common to the eleventh embodiment described above, can be obtained in the same manner as in the eleventh embodiment.

Thirteenth Embodiment

Next, the thirteenth embodiment will be described. In the present embodiment, points, which are different from the seventh embodiment described above, will be mainly described.

Figure 27:
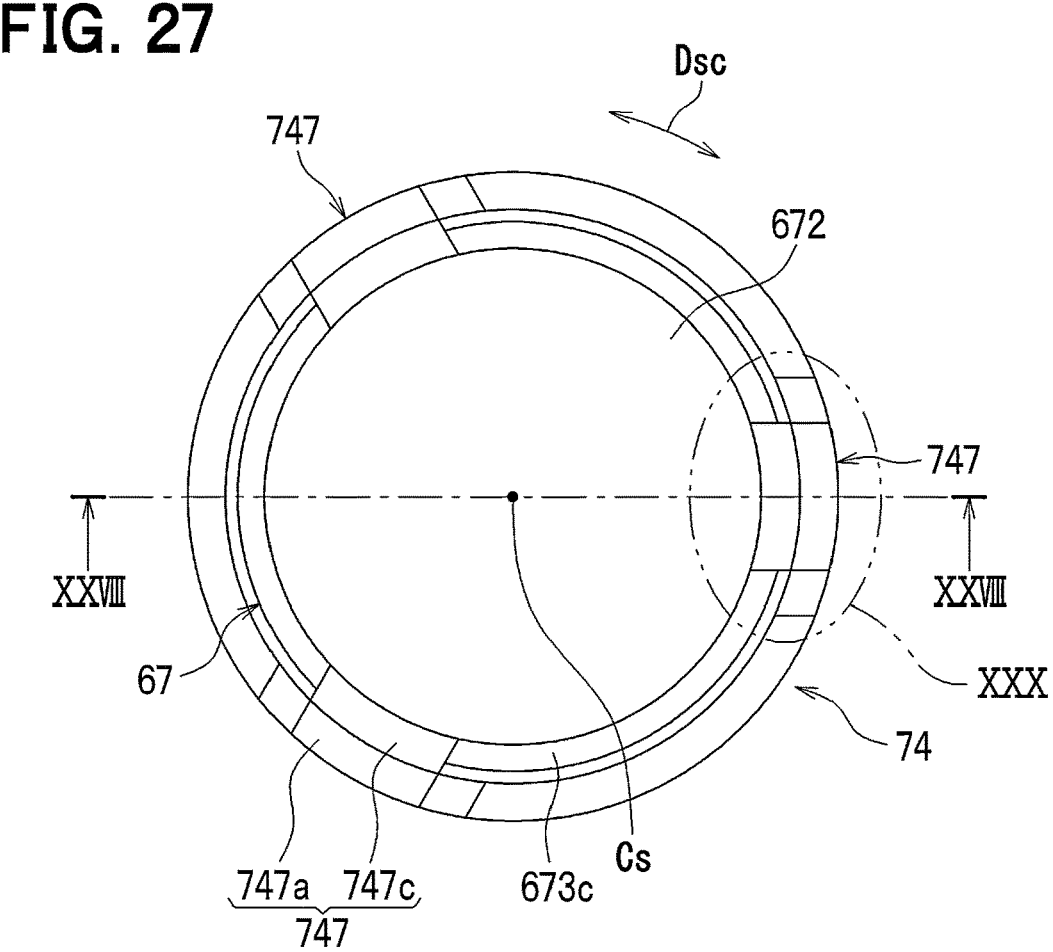
FIG. 27 is a view showing the one-side holder and the intermediate holder of the reaction force generation mechanism according to a thirteenth embodiment, corresponding to FIG. 7.
Figure 28:
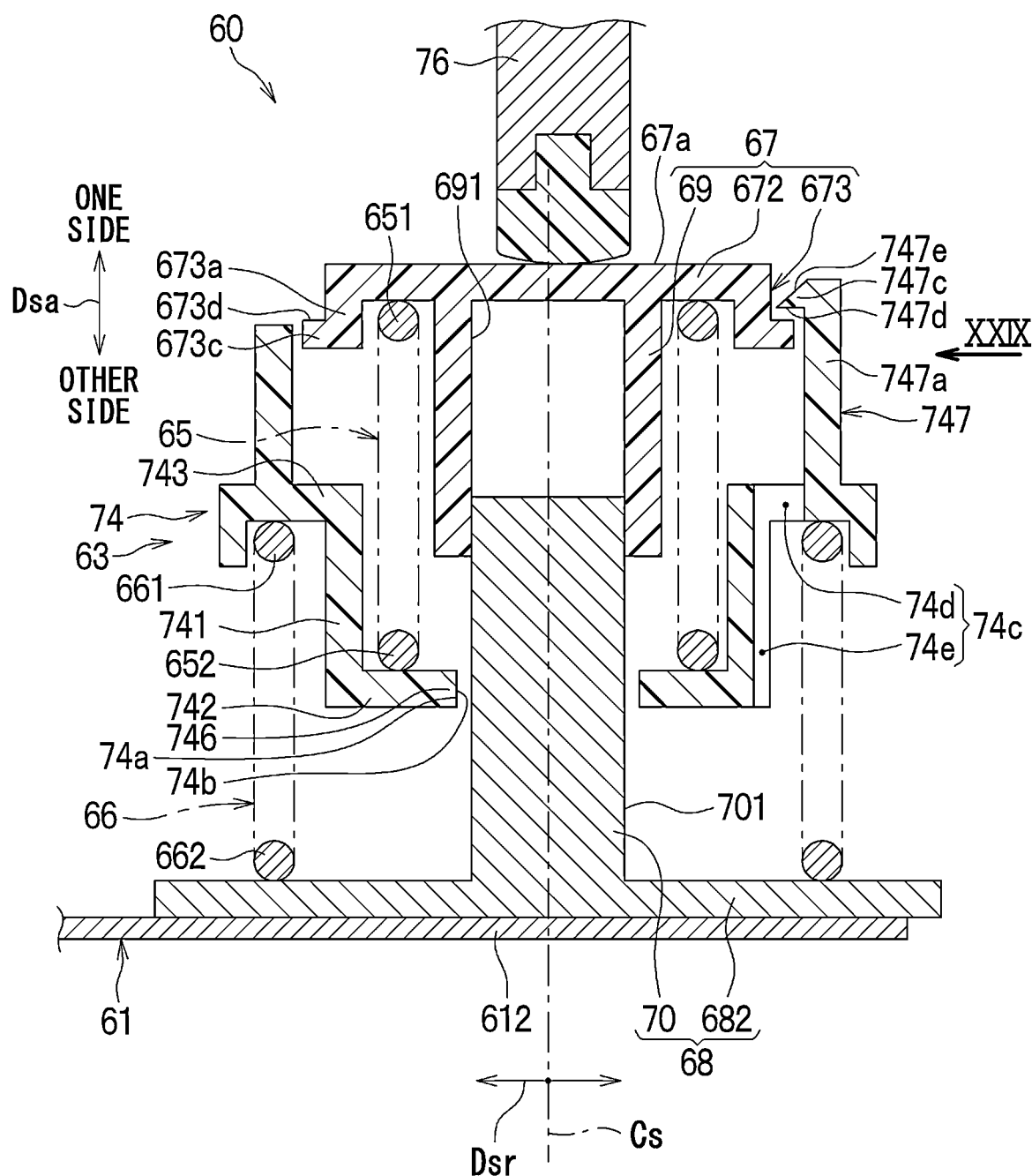
FIG. 28 is a cross-sectional view schematically showing the resilient unit in the non-depressed state of the pedal according to the thirteenth embodiment, schematically indicating a cross-section of the resilient unit along a plane taken along line XXVIII-XXVIII in FIG. 27 and corresponding to FIG. 11.
Figure 29:
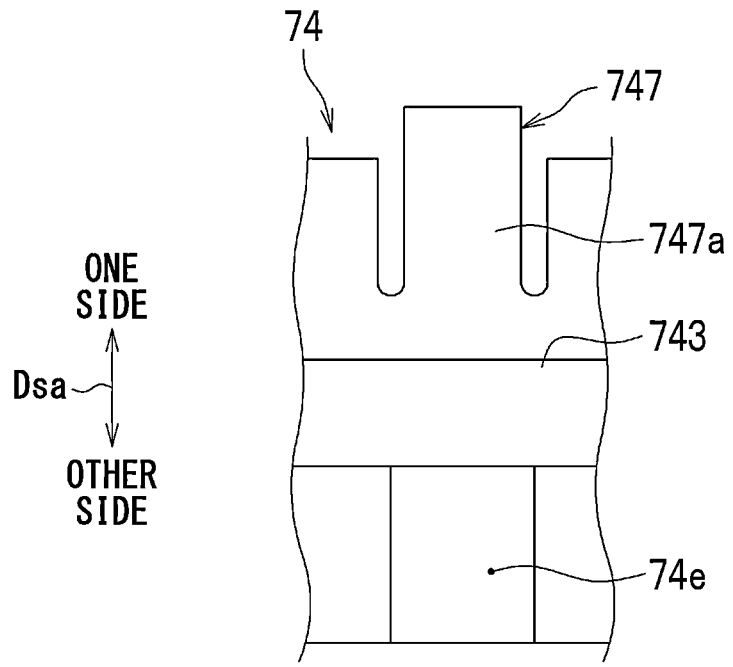
FIG. 29 is a view taken in a direction of arrow XXIX in FIG. 28, showing a side view of the intermediate disengagement stopper of the intermediate holder.

As shown in FIGS. 27 to 29, in the present embodiment, as in the seventh embodiment, the intermediate holder 74 has a plurality (specifically, three) of intermediate disengagement stoppers 747 each of which includes the other-side surface support portion 747a and the other-side surface forming portion 747c. The plurality of intermediate disengagement stoppers 747 are arranged at equal intervals in the unit circumferential direction Dsc. Each of the other-side surface support portions 747a of the intermediate disengagement stoppers 747 can be resiliently deformed to displace a corresponding one of the plurality of other-side surface forming portions 747c both inward and outward in the unit radial direction Dsr.

Unlike the seventh embodiment, the intermediate holder 74 of the present embodiment has the plurality of holder through-holes 74c each of which extends through the intermediate holder 74 in the unit axial direction Dsa. Each of the plurality of holder through-holes 74c is provided for each corresponding one of the plurality of other-side surface forming portions 747c.

Each holder through-hole 74c is positioned on the other side relative to the corresponding other-side surface support portion 747a in the unit axial direction Dsa and is positioned on the inner side of the corresponding other-side surface support portion 747a in the unit radial direction Dsr. For example, in the present embodiment, each holder through-hole 74c extends to reach both of the spring intervening portion 741 and the outer contact portion 743. That is, each holder through-hole 74c has: the axial hole part 74d, which extends through the outer contact portion 743 in the unit axial direction Dsa; and the axial extension part 74e, which is formed along the outer peripheral surface of the spring intervening portion 741 facing the outer side in the unit radial direction Dsr. The axial extension part 74e is in the form of groove that extends from the axial hole part 74d in the unit axial direction Dsa.

Figure 30:
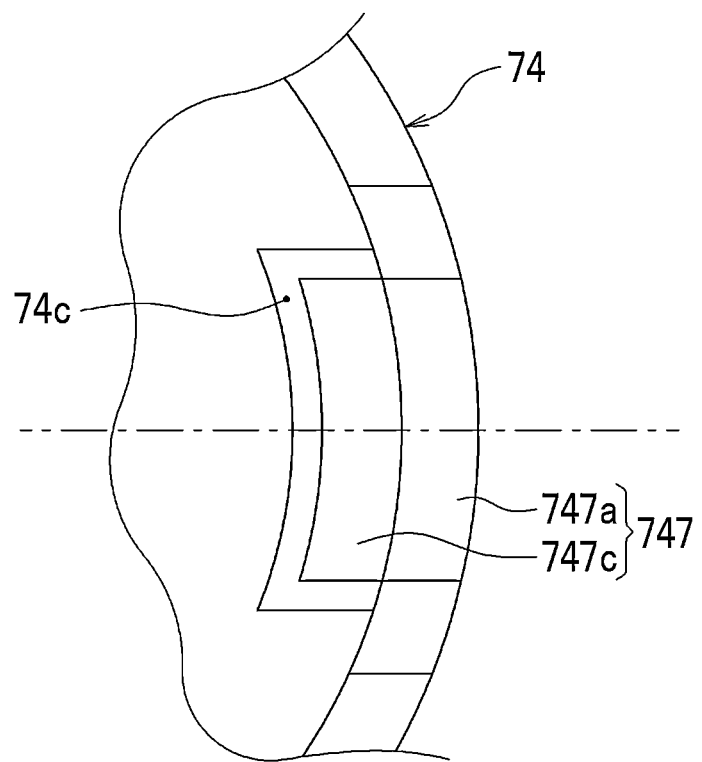
FIG. 30 is an enlarged view of a portion XXX of FIG. 27, showing the intermediate holder alone.

As shown in FIGS. 28 and 30, at each of the three locations, at each of which the corresponding intermediate disengagement stopper 747 and the corresponding holder through-hole 74c are formed, the corresponding holder through-hole 74c is arranged such that the holder through-hole 74c is placed on the other side of the corresponding other-side surface forming portion 747c in the unit axial direction Dsa and overlaps with the entire corresponding other-side surface forming portion 747c in the unit axial direction Dsa. In other words, as shown in FIG. 30, in the axial view in the unit axial direction Dsa, the entire other-side surface forming portion 747c is located within the range occupied by the corresponding holder through-hole 74c.

Furthermore, the one-side surface forming portion 673c does not have the sloped surface 673e (see FIG. 16) of the seventh embodiment. That is, the surface of the one-side surface forming portion 673c, which is opposite to the one-side surface 673d, is not formed as a sloped surface tilted relative to the unit central axis Cs but is, for example, a planar surface perpendicular to the unit central axis Cs.

As described above, according to the present embodiment, as in the first embodiment, since the holder through-hole 74c is formed in the intermediate holder 74, it is possible to prevent the undercuts in the mold at the time of forming the intermediate holder 74 made of the resin.

The rest of the present embodiment, which is other than the above-described points, is the same as that of the seventh embodiment. Furthermore, in the present embodiment, the advantages, which are achieved by the common configuration that is common to the seventh embodiment described above, can be obtained in the same manner as in the seventh embodiment.

Even in the present embodiment, as in the seventh embodiment, the one-side holder 67 serves as the first holder of the present disclosure, and the intermediate holder 74 serves as the second holder of the present disclosure. Furthermore, the resilient device of the present disclosure, which is clamped between and is compressed and deformed by the first holder and the second holder, includes the first coil spring 65 that is one resilient member. Furthermore, the one-side disengagement stopper 673 serves as the primary disengagement stopper of the present disclosure, and the intermediate disengagement stoppers 747 serve as the secondary disengagement stoppers of the present disclosure.

Fourteenth Embodiment

Next, the fourteenth embodiment will be described. In the present embodiment, points, which are different from the tenth embodiment described above, will be mainly described.

Figure 31:
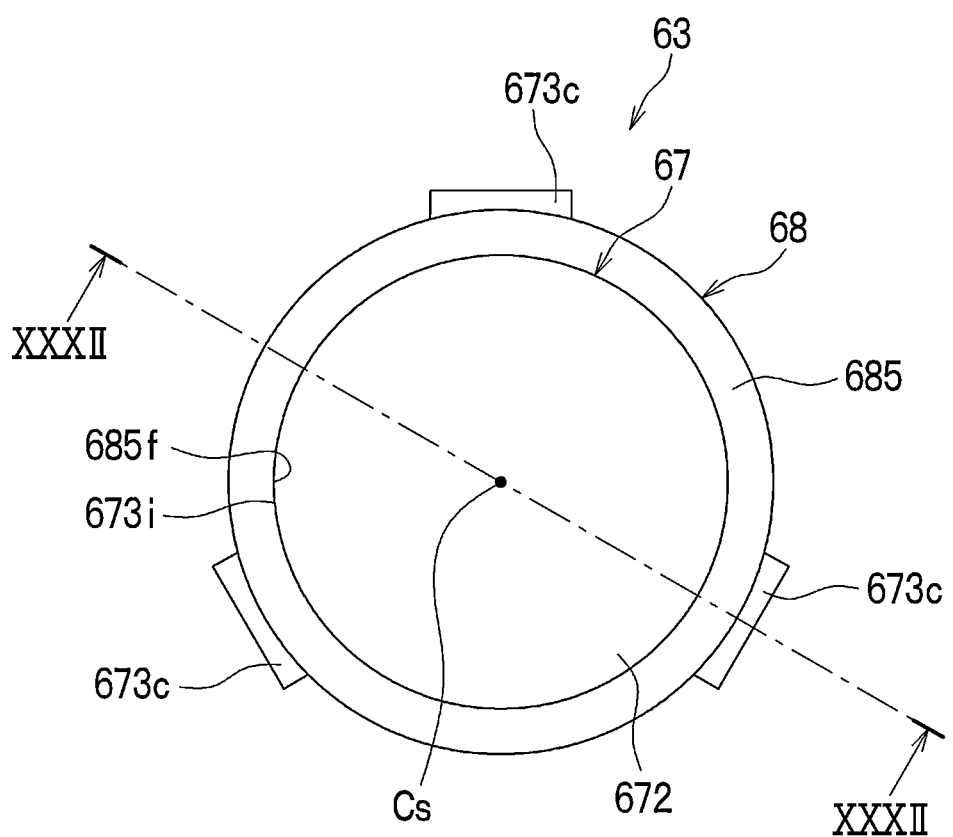
FIG. 31 is a view showing the one-side holder and the other-side holder of the reaction force generation mechanism according to a fourteenth embodiment, corresponding to FIG. 20.
Figure 32:
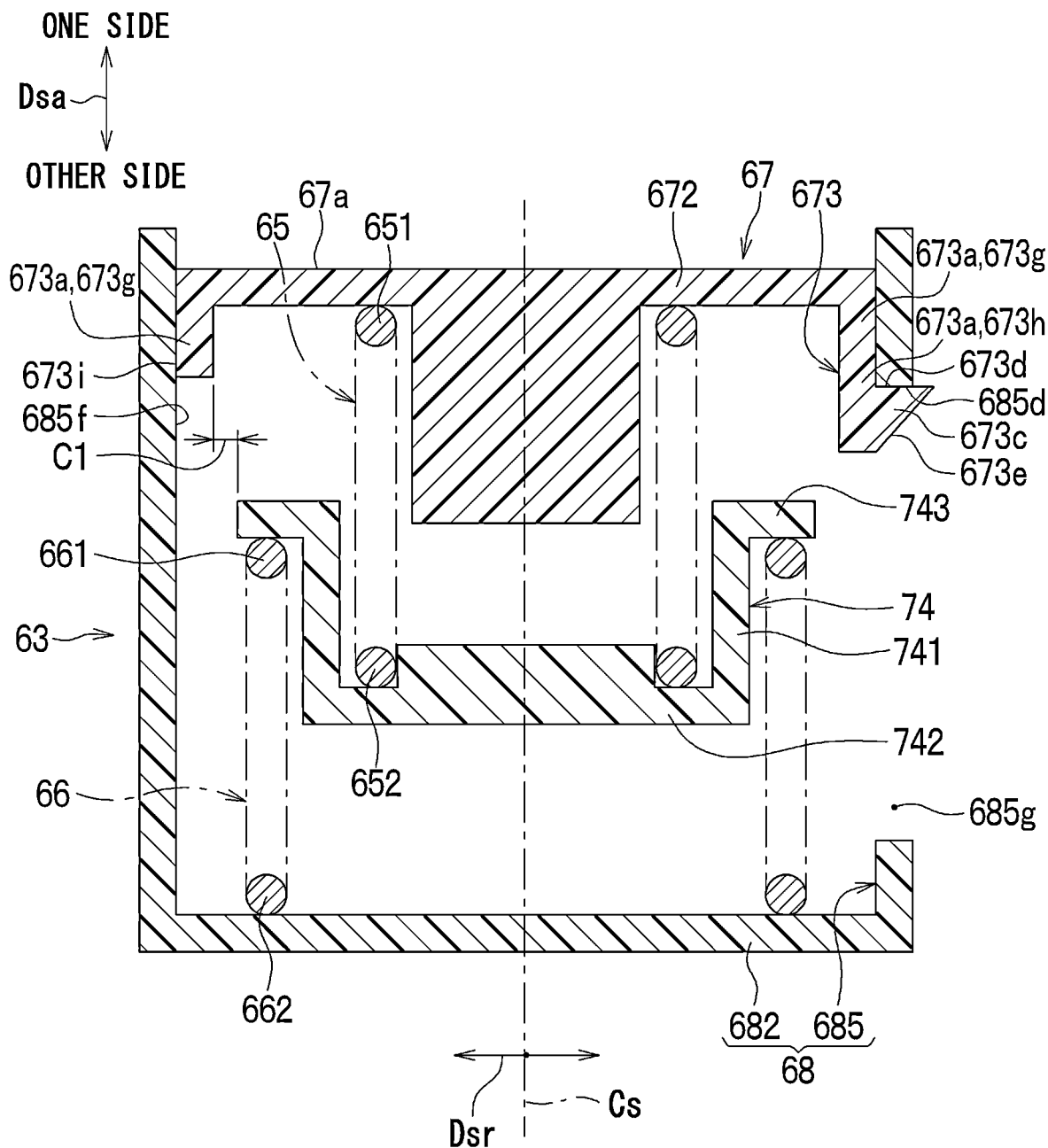
FIG. 32 is a cross-sectional view schematically showing the resilient unit in the non-depressed state of the pedal according to the fourteenth embodiment, schematically indicating a cross-section of the resilient unit along a plane taken along line XXI-XXI in FIG. 31 and corresponding to FIG. 11.
Figure 33:
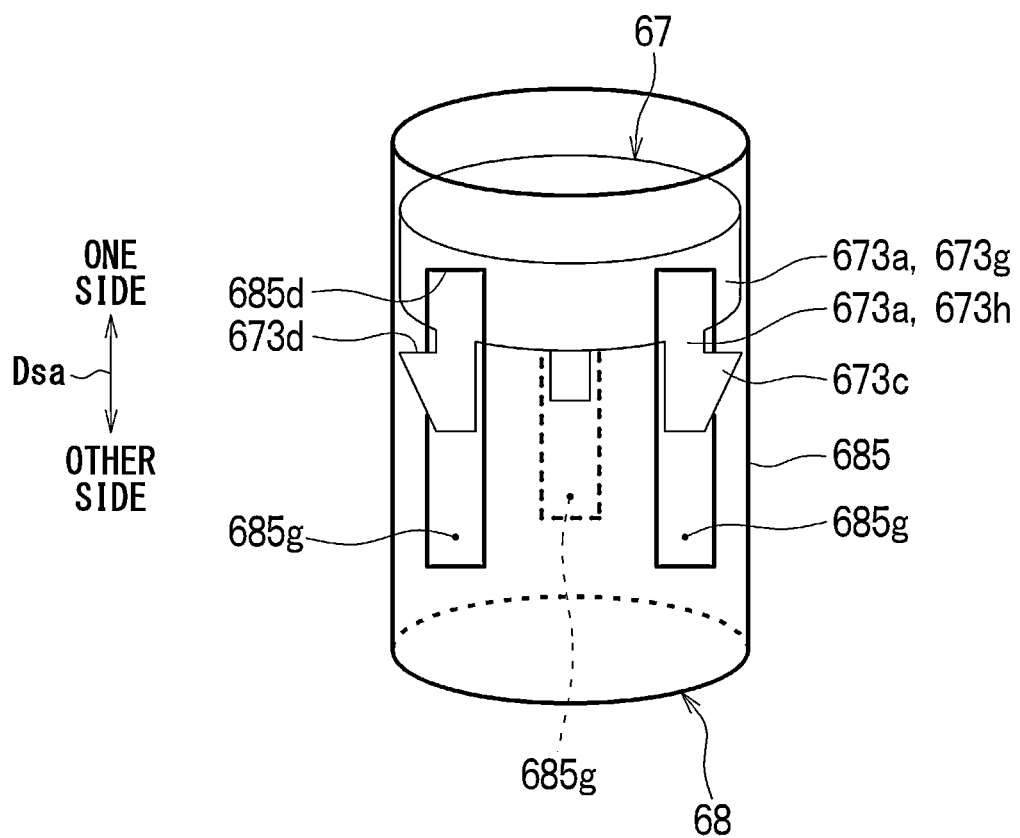
FIG. 33 is a perspective view schematically showing a combined state of the one-side holder and the other-side holder according to the fourteenth embodiment.

As shown in FIGS. 31 to 33, in the present embodiment, the shape of the one-side disengagement stopper 673 of the one-side holder 67 and the shape of the other-side disengagement stopper 685 of the other-side holder 68 are different from those of the tenth embodiment, respectively. In FIG. 32, the plate spring 61 and the coupling rod 76 (FIG. 19) are omitted.

Specifically, the one-side surface support portion 673a of the one-side disengagement stopper 673 includes a tubular base portion 673g and a plurality of extended portions 673h. The one-side surface support portion 673a is positioned on the outer side of the intermediate holder 74 in the unit radial direction Dsr, with a radial spacing C1 interposed between the intermediate holder 74 and the one-side surface support portion 673a. Therefore, the one-side surface support portion 673a is positioned on the outer side of the first coil spring 65, the second coil spring 66 and the intermediate holder 74 in the unit radial direction Dsr.

The tubular base portion 673g of the one-side surface support portion 673a is shaped in a cylindrical tubular form being coaxial with the unit central axis Cs and extends from an outer periphery of the one-side contact portion 672 toward the other side in the unit axial direction Dsa.

The number of the extended portions 673h of the one-side surface support portion 673a is, for example, three, and these extended portions 673h project from an end of the tubular base portion 673g, which faces the other side in the unit axial direction Dsa, toward the other side in the unit axial direction Dsa. These extended portions 673h are arranged at equal intervals in the unit circumferential direction Dsc.

Furthermore, the tubular base portion 673g has an outer peripheral surface 673i which extends continuously from the tubular base portion 673g to the extended portions 673h in the unit axial direction Dsa.

Each of the one-side surface forming portions 673c of the present embodiment projects outward in the unit radial direction Dsr from the end portion of the extended portion 673h, which faces the other side in the unit axial direction Dsa, of the one-side surface support portion 673a. Therefore, the number of the one-side surface forming portions 673c of the present embodiment is equal to the number of the extended portions 673h. Each of the extended portions 673h can be resiliently deformed to displace the corresponding one-side surface forming portion 673c both inward and outward in the unit radial direction Dsr.

Furthermore, the one-side surface forming portion 673c of the present embodiment has the one-side surface 673d and the sloped surface 673e, as in the tenth embodiment.

The other-side disengagement stopper 685 of the present embodiment does not have the portions equivalent to the other-side surface support portions 685a and the other-side surface forming portions 685c of the tenth embodiment. The other-side disengagement stopper 685 of the present embodiment is shaped in a cylindrical tubular form being coaxial with the unit central axis Cs and extends from an outer periphery of the other-side contact portion 682 toward the one side in the unit axial direction Dsa. The other-side disengagement stopper 685 is arranged to circumferentially surround the one-side surface support portion 673a. For example, the one-side holder 67, the intermediate holder 74, the first coil spring 65 and the second coil spring 66 are received in the inside of the other-side disengagement stopper 685 shaped in the cylindrical tubular form.

The other-side disengagement stopper 685 has an inner peripheral surface 685f that extends in the unit axial direction Dsa. This inner peripheral surface 685f is opposed to and slidably contacts the outer peripheral surface 673i of the one-side surface support portion 673a in the unit radial direction Dsr.

Therefore, the one-side surface support portion 673a and the other-side disengagement stopper 685 enable relative movement between the one-side holder 67 and the other-side holder 68 in the unit axial direction Dsa and limit relative movement between the one-side holder 67 and the other-side holder 68 in the unit radial direction Dsr by slidably contacting the outer peripheral surface 673i and the inner peripheral surface 685f with each other. That is, in the present embodiment, the other-side disengagement stopper 685 plays the same role as the outer guide portion 69 of the tenth embodiment, and the one-side surface support portion 673a plays the same role as the inner guide portion 70 of the tenth embodiment. Because of this reason, in the present embodiment, the outer guide portion 69 and the inner guide portion 70 (see FIG. 19) are not provided.

The other-side disengagement stopper 685 has a plurality of wall holes 685g which extend through the other-side disengagement stopper 685 in the unit radial direction Dsr. The number of the wall holes 685g is the same as the number of the one-side surface forming portions 673c, and each of the wall holes 685g is positioned at a location that corresponds to the corresponding one-side surface forming portions 673c. Therefore, the wall holes 685g are arranged at equal intervals in the unit circumferential direction Dsc, just like the one-side surface forming portions 673c.

Each of the one-side surface forming portions 673c is fitted into the corresponding wall hole 685g of the other-side disengagement stopper 685 from the inner side of the corresponding wall hole 685g in the unit radial direction Dsr. Furthermore, the other-side surface 685d, which faces the other side in the unit axial direction Dsa and is opposed to the corresponding one-side surface 673d, is formed at an end of each wall hole 685g, which is closer to the one side in the unit axial direction Dsa, of the other-side disengagement stopper 685.

Because of the above-described configuration of the one-side disengagement stopper 673 and the other-side disengagement stopper 685, even in the present embodiment, the one-side disengagement stopper 673 and the other-side disengagement stopper 685 form the snap-fit structure as in the tenth embodiment.

As described above, according to the present embodiment, the one-side disengagement stopper 673 and the other-side disengagement stopper 685 form the snap-fit structure. Additionally, the relative movement between the one-side holder 67 and the other-side holder 68 in the unit axial direction Dsa is enabled, while limiting the relative movement between the one-side holder 67 and the other-side holder 68 in the unit radial direction Dsr. In summary, the one-side disengagement stopper 673 and the other-side disengagement stopper 685 also function as a guide portion that guides the one-side holder 67 in the unit axial direction Dsa relative to the other-side holder 68. Therefore, there is no need to provide a part or parts corresponding to this guide portion separately from the one-side disengagement stopper 673 and the other-side disengagement stopper 685.

The rest of the present embodiment, which is other than the above-described points, is the same as that of the tenth embodiment. Furthermore, in the present embodiment, the advantages, which are achieved by the common configuration that is common to the tenth embodiment described above, can be obtained in the same manner as in the tenth embodiment.

Fifteenth Embodiment

Next, the fifteenth embodiment will be described. In the present embodiment, points, which are different from the seventh embodiment described above, will be mainly described.

Figure 34:
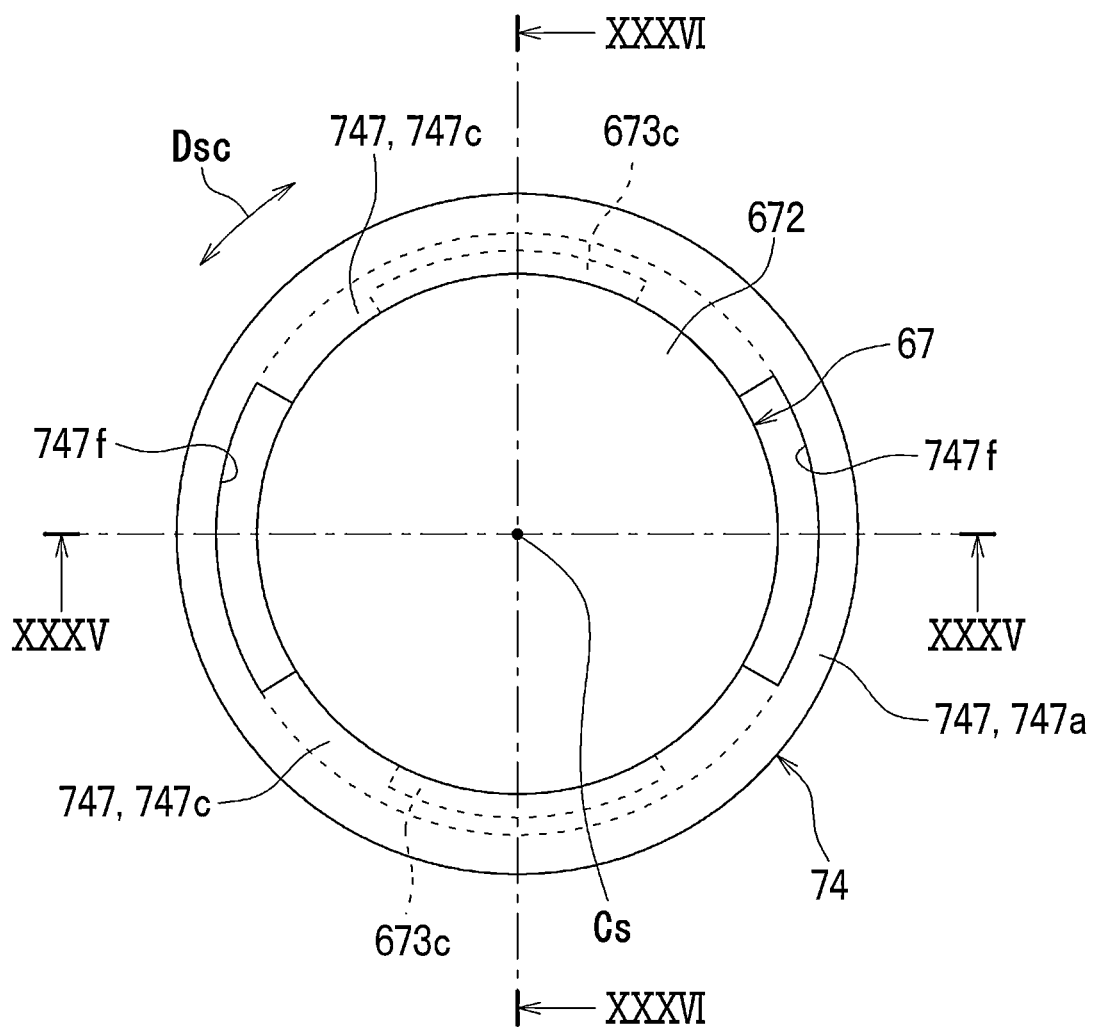
FIG. 34 is a view showing the one-side holder and the intermediate holder of the reaction force generation mechanism according to a fifteenth embodiment, corresponding to FIG. 7.
Figure 35:
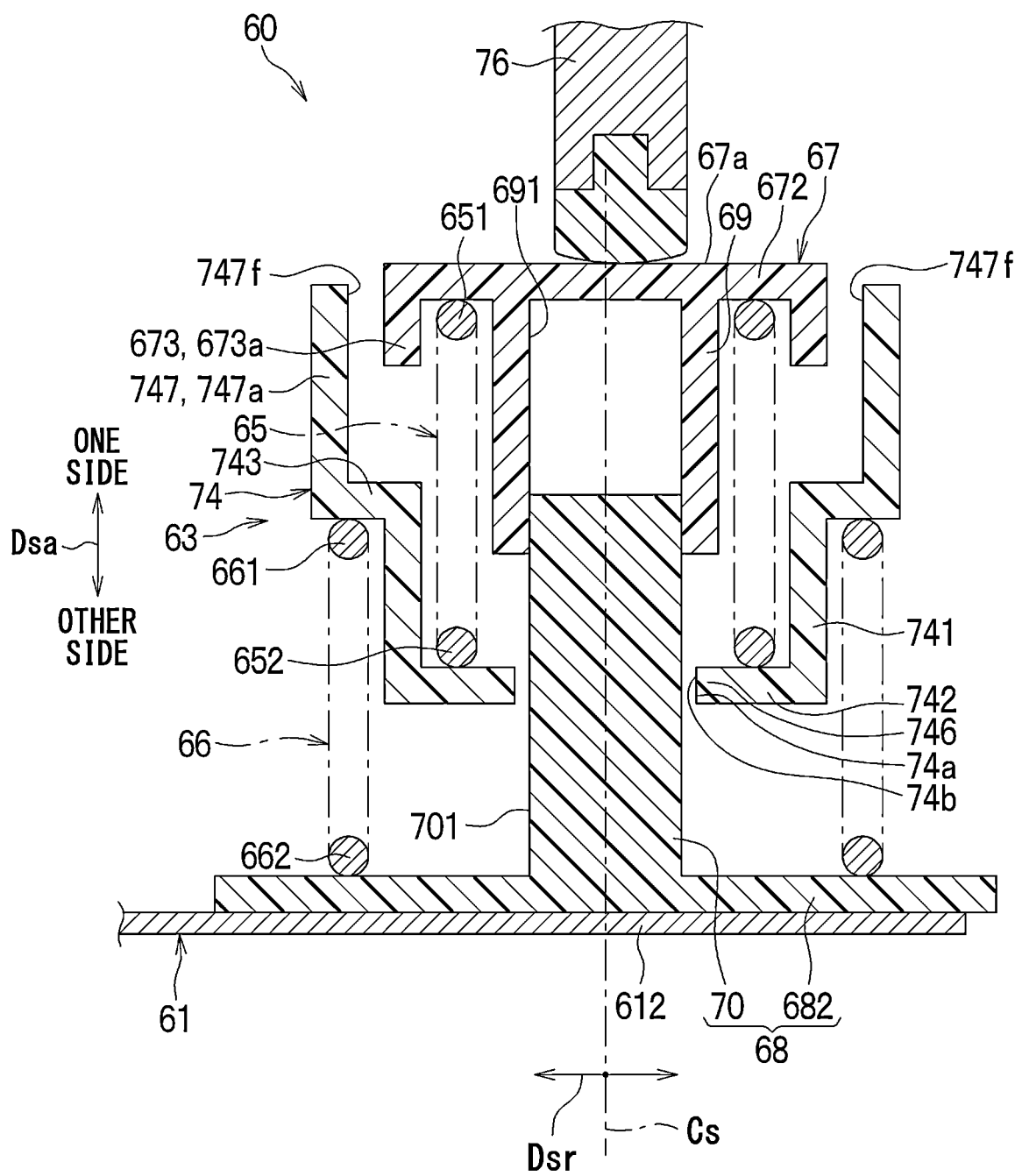
FIG. 35 is a cross-sectional view schematically showing the resilient unit in the non-depressed state of the pedal according to the fifteenth embodiment, schematically indicating a cross-section of the resilient unit along a plane taken along line XXXV-XXXV in FIG. 34 and corresponding to FIG. 11.
Figure 36:
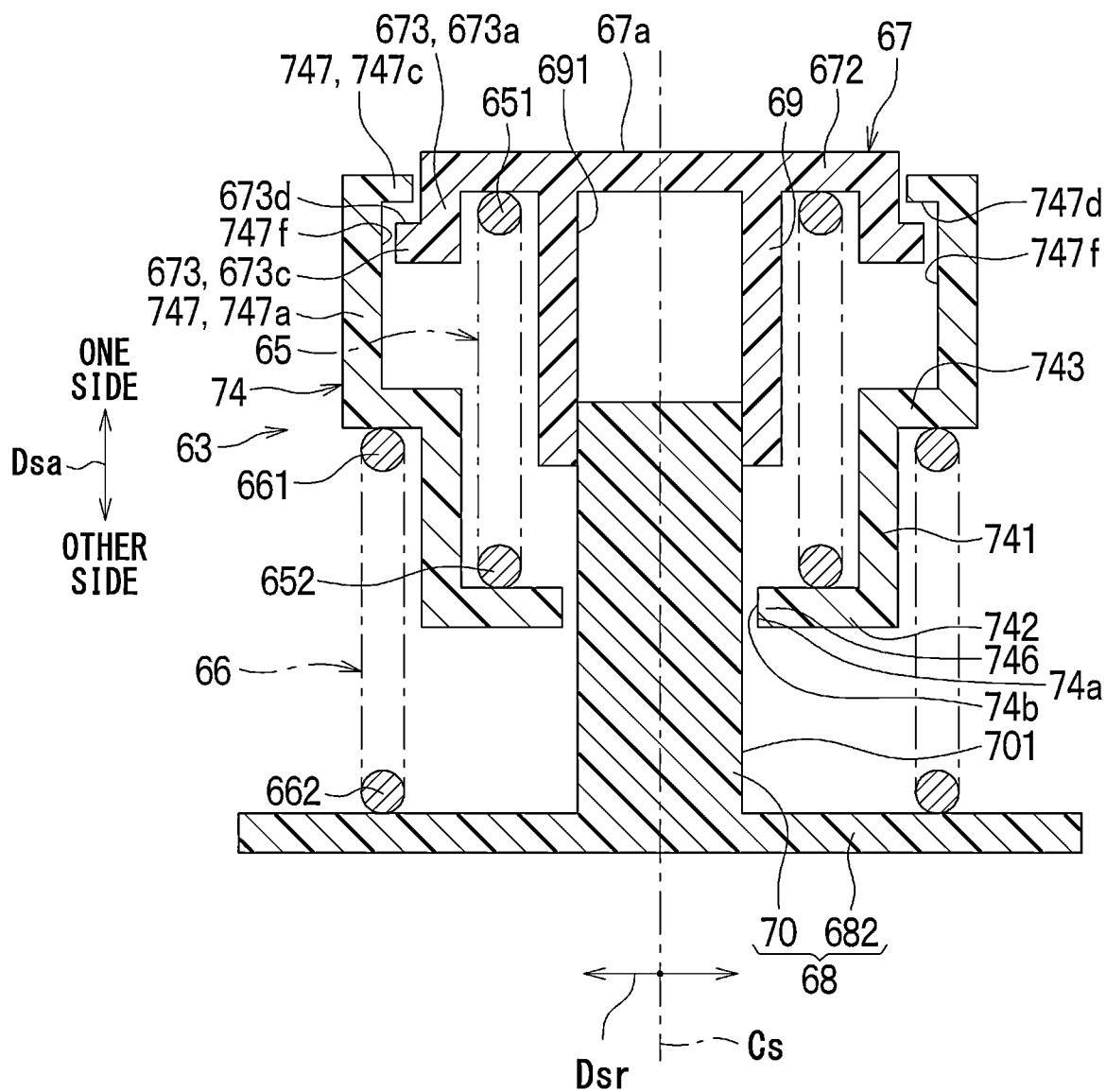
FIG. 36 is a cross-sectional view schematically showing a cross-section taken along line XXXVI-XXXVI in FIG. 34, indicating the resilient unit in the non-depressed state of the pedal according to the fifteenth embodiment.

As shown in FIGS. 34 to 36, although the one-side disengagement stopper 673 and the intermediate disengagement stoppers 747 of the present embodiment limit the relative movement between the one-side disengagement stopper 673 and the intermediate disengagement stoppers 747 in the unit axial direction Dsa, the one-side disengagement stopper 673 and the intermediate disengagement stoppers 747 do not form the snap-fit structure. The present embodiment differs from the seventh embodiment with respect to this point.

In the present embodiment, the one-side holder 67 serves as the first holder of the present disclosure, and the intermediate holder 74 serves as the second holder of the present disclosure. Furthermore, the resilient device of the present disclosure, which is clamped between and is compressed and deformed by the first holder and the second holder, includes the first coil spring 65 that is one resilient member. Furthermore, the one-side disengagement stopper 673 serves as the primary disengagement stopper of the present disclosure, and the intermediate disengagement stoppers 747 serve as the secondary disengagement stoppers of the present disclosure.

In the present embodiment, the one-side surface support portion 673a of the one-side disengagement stopper 673 is shaped in a cylindrical tubular form being coaxial with the unit central axis Cs and extends from an outer periphery of the one-side contact portion 672 toward the other side in the unit axial direction Dsa. The one-side surface support portion 673a surrounds the one end portion 651 of the first coil spring 65.

The one-side surface forming portion 673c of the one-side disengagement stopper 673 is not formed to extend all around the one-side surface support portion 673a. Instead, a plurality of one-side surface forming portions 673c are arranged in the unit circumferential direction Dsc. For example, the plurality of one-side surface forming portions 673c are arranged at equal intervals in the unit circumferential direction Dsc. In the present embodiment, the number of the one-side surface forming portions 673c is two, and these two one-side surface forming portions 673c are arranged at 180-degree intervals in the unit circumferential direction Dsc.

As in the seventh embodiment, each of the one-side surface forming portions 673c projects outward in the unit radial direction Dsr from the end portion of the corresponding one-side surface support portion 673a, which faces the other side in the unit axial direction Dsa. As in the seventh embodiment, the one-side surface 673d, which faces the one side in the unit axial direction Dsa, is formed at each of the one-side surface forming portions 673c. However, the surface of the one-side surface forming portion 673c, which is opposite to the one-side surface 673d, is not formed as a sloped surface tilted relative to the unit central axis Cs but is, for example, a planar surface perpendicular to the unit central axis Cs.

The other-side surface support portion 747a of the intermediate disengagement stopper 747 is shaped in a cylindrical tubular form being coaxial with the unit central axis Cs and extends from an outer periphery of the outer contact portion 743 toward the one side in the unit axial direction Dsa. The other-side surface support portion 747a is positioned on the outer side of the one-side surface forming portions 673c of the one-side disengagement stopper 673 in the unit radial direction Dsr. In both of the non-depressed state and the most depressed state of the pedal 40, the one-side surface forming portions 673c are received on the inner side of the other-side surface support portion 747a in the unit radial direction Dsr.

The other-side surface forming portion 747c of the intermediate disengagement stopper 747 is not formed to extend all around the other-side surface support portion 747a. Instead, a plurality of other-side surface forming portions 747c are arranged in the unit circumferential direction Dsc. For example, the plurality of other-side surface forming portions 747c are arranged at equal intervals in the unit circumferential direction Dsc. In the present embodiment, the number of the other-side surface forming portions 747c is two, and these two other-side surface forming portions 747c are arranged at 180-degree intervals in the unit circumferential direction Dsc.

As in the seventh embodiment, each of the other-side surface forming portions 747c projects inward in the unit radial direction Dsr from the end portion of the other-side surface support portion 747a, which faces the one side in the unit axial direction Dsa. As in the seventh embodiment, the other-side surface 747d, which faces the other side in the unit axial direction Dsa, is formed at each of the other-side surface forming portions 747c. However, the surface of the other-side surface forming portion 747c, which is opposite to the other-side surface 747d, is not formed as a sloped surface tilted relative to the unit central axis Cs but is, for example, a planar surface perpendicular to the unit central axis Cs.

As in the seventh embodiment, each of the other-side surface forming portions 747c is positioned on the one side relative to the corresponding one-side surface forming portion 673c in the unit axial direction Dsa. Furthermore, each one-side surface forming portion 673c and the corresponding other-side surface forming portion 747c are arranged such that the one-side surface 673d and the other-side surface 747d overlap with each other in a view in the unit axial direction Dsa.

As described above, since the plurality of other-side surface forming portions 747c are arranged at the intervals in the unit circumferential direction Dsc, as shown in FIG. 34, interposed portions, each of which is located between the other-side surface forming portions 747c, is shaped in a form of a groove. In other words, the intermediate disengagement stopper 747 has a plurality of other-side surface intervening grooves 747f each of which is formed in the unit circumferential direction Dsc between corresponding two of the other-side surface forming portions 747c. The number of the other-side surface intervening grooves 747f is the same as the number of the other-side surface forming portions 747c.

Furthermore, the one-side holder 67 can rotate relative to the intermediate holder 74 about the unit central axis Cs although there is frictional resistance between the one-side holder 67 and the first coil spring 65. For example, when the one-side holder 67 rotates relative to the intermediate holder 74 about the unit central axis Cs from the state shown in FIG. 34, there is no obstacle on the radial inner side of the other-side surface support portion 747a that would prevent the rotation of the one-side holder 67.

When the one-side holder 67 is rotated relative to the intermediate holder 74 by a predetermined angle about the unit central axis Cs from the state shown in FIG. 34, the plurality of one-side surface forming portions 673c overlap with the plurality of other-side surface intervening grooves 747f, respectively, in the view taken in the unit axial direction Dsa. In that case, in the view taken in the unit axial direction Dsa, each of the plurality of one-side surface forming portions 673c is positioned within a range occupied by the corresponding one of the plurality of other-side surface intervening grooves 747f without protruding from that range.

Therefore, it can be said that each of the one-side holder 67 and the intermediate holder 74 of the present embodiment has a corresponding shape that enables a predetermined relative rotation and a predetermined relative movement, both described next.

The predetermined relative rotation refers to the relative rotation between the one-side holder 67 and the intermediate holder 74 in the unit circumferential direction Dsc through the predetermined angle described above from a reference state (e.g., a state shown in FIG. 34) where the one-side surface 673d and the other-side surface 747d are opposed to each other. In the present embodiment, this predetermined angle is 90 degrees, and the relative rotation may be either clockwise or counterclockwise in the unit circumferential direction Dsc. The state in which the one-side holder 67 and the intermediate holder 74 have relatively rotated through the predetermined angle in the unit circumferential direction Dsc from the reference state is referred to as a predetermined angle rotation state.

Furthermore, the predetermined relative movement refers to the relative movement between the one-side holder 67 and the intermediate holder 74 in the unit axial direction Dsa in the predetermined angle rotation state described above, such that the one-side surface forming portion 673c moves from the other side to the one side in the unit axial direction Dsa relative to the other-side surface forming portion 747c.

Figure 37:
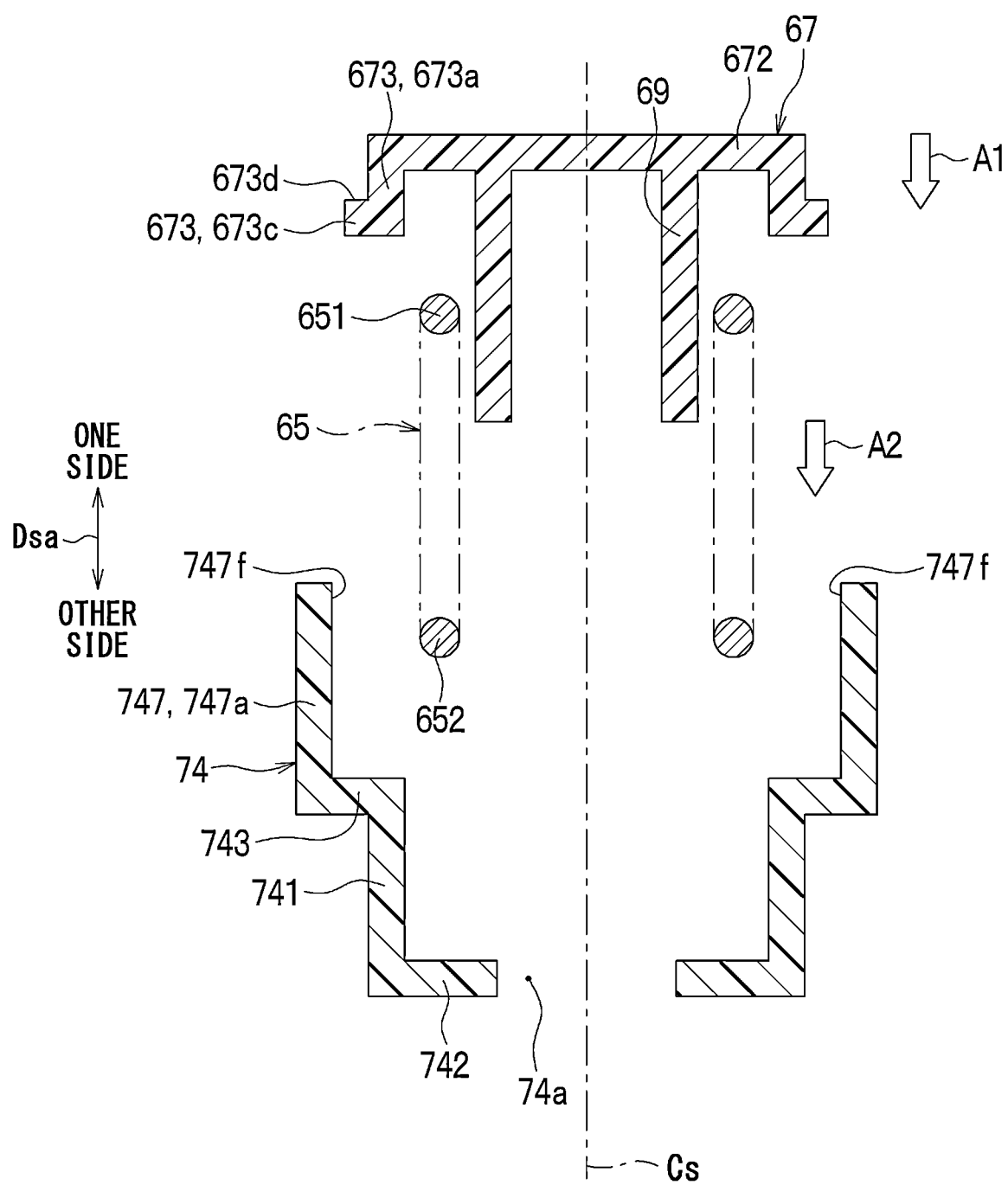
FIG. 37 is a schematic cross-sectional view for explaining a manufacturing process for completing an assembly of the one-side holder, the intermediate holder and a first coil spring according to the fifteenth embodiment.

Since the shapes of the one-side holder 67 and the intermediate holder 74 are as described above, in the present embodiment, as shown in FIG. 37, the one-side holder 67 and the intermediate holder 74 can be coupled to each other to complete an assembly of the one-side holder 67, the intermediate holder 74 and the first coil spring 65.

A method of coupling the one-side holder 67 and the intermediate holder 74 will be described. First, as shown in FIG. 37, the one-side holder 67, the intermediate holder 74, and the first coil spring 65 are each prepared individually. Then, in a state where the first coil spring 65 is clamped between the one-side contact portion 672 and the inner contact portion 742, the one-side holder 67 and the first coil spring 65 are brought closer to the intermediate holder 74 from the one side in the unit axial direction Dsa, as indicated by arrows A1, A2.

At this time, a rotational position of the one-side holder 67 in the unit circumferential direction Dsc is such that each one-side surface forming portion 673c entirely overlaps with the corresponding other-side surface intervening groove 747f in the unit axial direction Dsa. Furthermore, the one-side holder 67 is relatively moved in the unit axial direction Dsa relative to the intermediate holder 74 until each one-side surface forming portion 673c moves from the one side to the other side in the unit axial direction Dsa relative to the corresponding other-side surface forming portion 747c through the corresponding other-side surface intervening groove 747f.

Subsequently, the one-side holder 67 is relatively rotated by the predetermined angle described above in the unit circumferential direction Dsc relative to the intermediate holder 74. As a result, the one-side holder 67 and the intermediate holder 74 reach the reference state shown in FIG. 34. The method of coupling the one-side holder 67 and the intermediate holder 74 is as described above.

In the present embodiment, since the one-side holder 67 and the intermediate holder 74 can be coupled each other by the above-described method instead of the snap-fit structure, it is not necessary to form the one-side disengagement stopper 673 and the intermediate disengagement stopper 747 from the material that can be resiliently deformed.

The rest of the present embodiment, which is other than the above-described points, is the same as that of the seventh embodiment. Furthermore, in the present embodiment, the advantages, which are achieved by the common configuration that is common to the seventh embodiment described above, can be obtained in the same manner as in the seventh embodiment.

Sixteenth Embodiment

Next, the sixteenth embodiment will be described. In the present embodiment, points, which are different from the fourth embodiment described above, will be mainly described.

Figure 38:
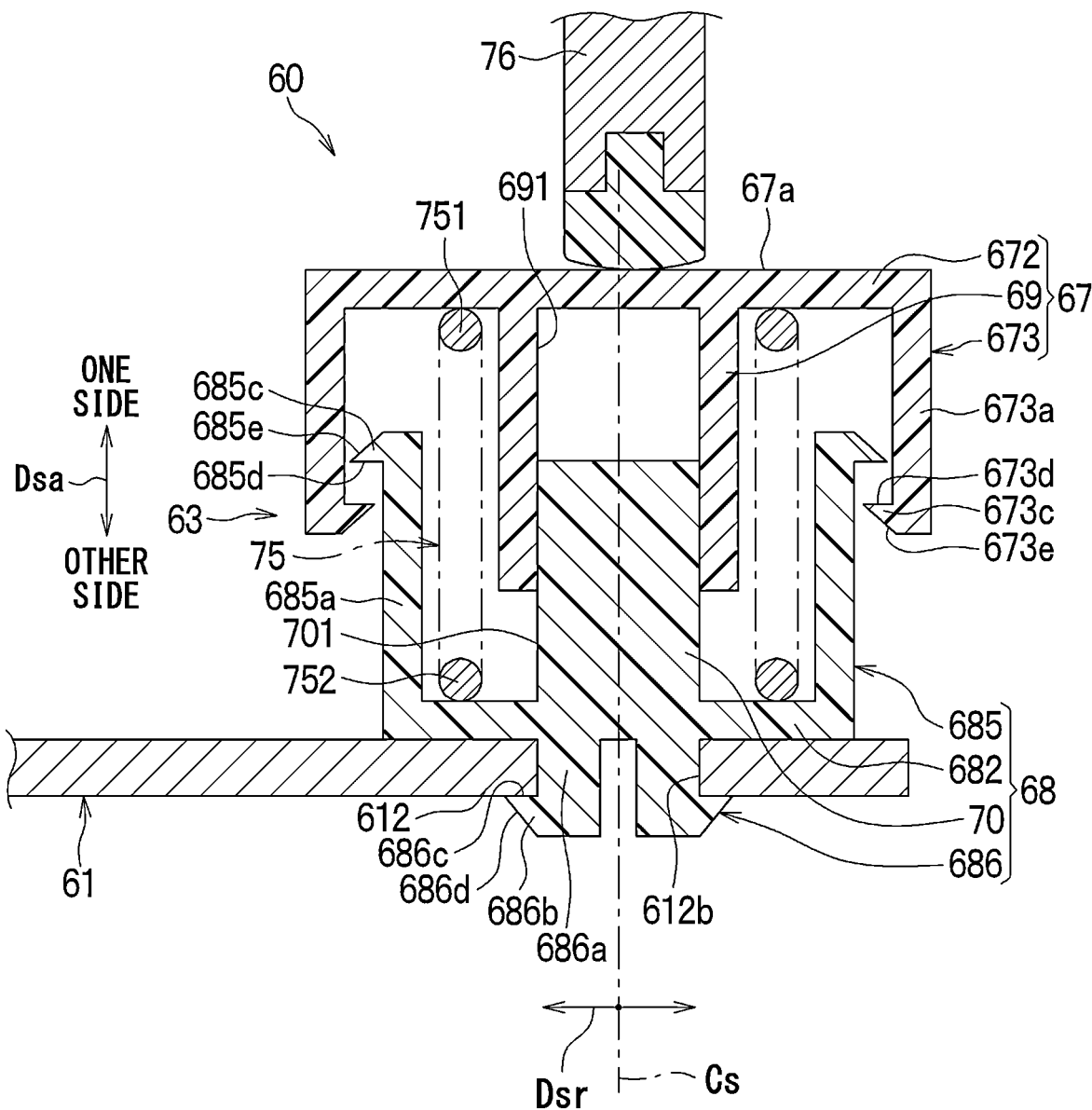
FIG. 38 is a cross-sectional view schematically showing the resilient unit in the non-depressed state of the pedal according to a sixteenth embodiment, corresponding to FIG. 11.

As shown in FIG. 38, the other-side holder 68 of the present embodiment is coupled to the other end portion 612 of the plate spring 61 by snap fit, rather than by the screw fastening.

Therefore, the other-side holder 68 of the present embodiment includes a snap-fit portion 686 in addition to the inner guide portion 70, the other-side contact portion 682 and the other-side disengagement stopper 685. The other-side holder 68 is made of, for example, resin, and the inner guide portion 70, the other-side contact portion 682, the other-side disengagement stoppers 685 and the snap-fit portion 686 are formed integrally in one-piece as a single component.

Specifically, the snap-fit portion 686 has a pair of snap-fit extensions 686a and a pair of snap-fit claws 686b. For example, the pair of snap-fit extensions 686a are symmetrically arranged around the unit central axis Cs, and the pair of snap-fit claws 686b are also symmetrically arranged around the unit central axis Cs. One of the pair of snap-fit claws 686b is coupled to one of the snap-fit extensions 686a, and the other one of the pair of snap-fit claws 686b is coupled to the other one of the snap-fit extensions 686a.

Specifically, the snap-fit extensions 686a project from the other-side contact portion 682 or the inner guide portion 70 toward the other side in the unit axial direction Dsa and extend in the unit axial direction Dsa. The snap-fit extensions 686a are inserted through a through-hole 612b formed at the other end portion 612 of the plate spring 61. The snap-fit extensions 686a can be flexed through resilient deformation of the snap-fit extensions 686a.

Each of the snap-fit claws 686b protrudes outward in the unit radial direction Dsr from the corresponding snap-fit extension 686a at a position on the other side in the unit axial direction Dsa relative to the other end portion 612 of the plate spring 61. Furthermore, each snap-fit claw 686b extends outward in the unit radial direction Dsr from the corresponding snap-fit extension 686a to a position beyond the through-hole 612b.

Furthermore, each snap-fit claw 686*b* has: a claw one-side surface 686*c*, which faces the one side in the unit axial direction Dsa; and a claw sloped surface 686*d*, which faces the other side in the unit axial direction Dsa. The claw one-side surface 686*c* is a surface facing the one side in the unit axial direction Dsa and is opposed to and contacts the other end portion 612 of the plate spring 61 around the through-hole 612*b*. Furthermore, the claw sloped surface 686*d* is a sloped surface tilted relative to the unit central axis Cs such that the claw sloped surface 686*d* progressively approaches the one side in the unit axial direction Dsa as the claw sloped surface 686*d* extends outward in the unit radial direction Dsr.

The rest of the present embodiment, which is other than the above-described point, is the same as that of the fourth embodiment. Furthermore, in the present embodiment, the advantages, which are achieved by the common configuration that is common to the fourth embodiment described above, can be obtained in the same manner as in the fourth embodiment.

Other Embodiments (1) In each of the embodiments described above, the pedal device 1 is used as the brake pedal device. However, this is only one example. For example, the pedal device 1 may be used as an accelerator pedal device that is operated to adjust an output of a drive power source of the vehicle 80. Furthermore, the pedal device 1 may be any of various devices which are operated by the foot of the driver 81.

(2) In each of the embodiments described above, as shown in FIGS. 2 and 3, the support body, which slidably supports the pedal 40 around the pedal central axis CL, is a casing which includes the housing 10 and the base plate 20 and receives the reaction force generation mechanism 60. However, this is just one example. The support body is not necessarily formed as the casing and may not receive the reaction force generation mechanism 60.

(3) In the first embodiment described above, as shown in FIG. 5, the resilient members 65, 66 of the reaction force generation mechanism 60 include the first coil spring 65 and the second coil spring 66. However, this is only one example. Furthermore, each of the resilient members 65, 66 may possibly be a resilient body (device), such as rubber or an air spring instead of the coil spring.

(4) In the fifteenth embodiment described above, the one-side holder 67 shown in FIG. 35 is made of, for example, the resin. However, the material of the one-side holder 67 is not limited to any particular material and may be made of metal.

When the one-side holder 67 is made of the metal, it is possible to increase the durability against the contact pressure of the coupling rod 76, which urges the depressible surface 67*a* of the one-side holder 67, in comparison to the case where the one-side holder 67 is made of the resin. Furthermore, the one-side holder 67 is less likely to be deformed, and thereby it is possible to avoid that the outer guide portion 69 and the inner guide portion 70 rub against each other in response to the deformation of the one-side holder 67.

Furthermore, in the fifteenth embodiment, the intermediate holder 74 shown in FIG. 35 is made of, for example, the resin. However, the material of the intermediate holder 74 is not limited to this material. For example, the intermediate holder 74 may be made of metal without any issues.

(5) In the first embodiment described above, the spring seat member 684 shown in FIG. 5 is made of the resin, and the inner guide portion 70 is made of the metal. However, the material of the spring seat member 684 and the material of the inner guide portion 70 are not limited to these materials. For example, the spring seat member 684 may be made of metal, and the inner guide portion 70 may be made of resin. Alternatively, both of the spring seat member 684 and the inner guide portion 70 may be made of the resin or the metal.

(6) In the first embodiment described above, as shown in FIGS. 3 and 5, the other-side holder 68 is fixed to the other end portion 612 of the plate spring 61 by the screwing with the fastening member 62. However, this is only one example. For example, the other-side holder 68 may be directly fixed to the base plate 20 by, for example, the screwing with the fastening member 62 without providing the plate spring 61.

(7) In the first embodiment described above, as shown in FIG. 5, the inner guide portion 70 is formed as the separate component that is formed separately from the spring seat member 684 which includes the other-side contact portion 682 and the spring guide portion 683. However, this is only one example. For example, the inner guide portion 70, the other-side contact portion 682 and the spring guide portion 683 may be formed integrally in one-piece as a one-piece component by, for example, insert molding.

(8) In the first embodiment described above, the urging portion 762 of the coupling rod 76 shown in FIG. 5 is made of, for example, the resin. However, the material of the urging portion 762 is not limited to any material and may be made of metal.

When the urging portion 762 is made of the metal, it is possible to increase the durability against the contact pressure of the urging portion 762 of the coupling rod 76, which urges the depressible surface 67*a* of the one-side holder 67, in comparison to the case where the urging portion 762 is made of the resin.

(9) In the first embodiment described above, with reference to FIG. 5, in the cross-section that is perpendicular to the unit axial direction Dsa, the inner peripheral surface 691 of the outer guide portion 69 and the outer peripheral surface 701 of the inner guide portion 70 respectively have the circular shape that is centered on the unit central axis Cs. However, this is only one example. In the cross-section that is perpendicular to the unit axial direction Dsa, each of the inner peripheral surface 691 and the outer peripheral surface 701 may have an ellipse shape or a polygonal shape.

(10) In each of the embodiments described above, as shown in FIG. 2, the pedal device 1 is the organ-type pedal device. However, this is only one example. For example, the pedal device 1 may be a suspended-type pedal device.

(11) In the first embodiment, as shown in FIG. 5, in the non-depressed state of the pedal 40, the other-side surface 747*d* of each intermediate disengagement stopper 747 does not contact and is spaced from the one-side surface 673*d* of the one-side disengagement stopper 673 in the unit axial direction Dsa. For example, in the non-depressed state of the pedal 40 shown in FIG. 5, the other-side surface 747*d* of each intermediate disengagement stopper 747 may contact the one-side surface 673*d* of the one-side disengagement stopper 673.

(12) In the first and thirteenth embodiments, as shown in FIGS. 5 and 28, each holder through-hole 74*c* of the intermediate holder 74 is formed to reach both the spring intervening portion 741 and the outer contact portion 743. However, this is one example. For example, in a case where the spring intervening portion 741 does not overlap at all with the entire other-side surface forming portion 747*c* in the view taken in the unit axial direction Dsa, the holder through-hole 74c may be formed only in the outer contact portion 743 without extending to the spring intervening portion 741.

(13) In the second embodiment, as shown in FIG. 11, the outer guide portion 69 is included in the one-side holder 67, and the inner guide portion 70 is included in the other-side holder 68. However, this is one example. Conversely, for example, the outer guide portion 69 may be included in the other-side holder 68, and the inner guide portion 70 may be included in the one-side holder 67 without any issues.

(14) The present disclosure is not limited to the above-described embodiments and may be implemented in various variations. Further, the above embodiments are not unrelated to each other and can be appropriately combined unless the combination is clearly impossible.

Needless to say, in each of the embodiments described above, the elements of the embodiment are not necessarily essential except when it is clearly indicated that they are essential and when they are clearly considered to be essential in principle. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. In each of the above embodiments, when the material, the shape, the positional relationship or the like of the constituent elements of the embodiment is mentioned, the present disclosure should not be limited the material, the shape, the positional relationship or the like unless it is clearly stated that it is essential and/or it is required in principle.

CHARACTERISTICS OF PRESENT DISCLOSURE

First Aspect

According to a first aspect, there is provided a pedal device for a vehicle, including:
- a support body that is configured to be installed to a vehicle body of the vehicle;
- a pedal that is configured to swing relative to the support body and is configured to be depressed by a human driver of the vehicle from an operating side of the pedal which is predetermined; and
- a reaction force generation mechanism that is supported by the support body and is placed on a counter-operating side of the pedal that is opposite to the operating side of the pedal, wherein the reaction force generation mechanism is configured to generate a reaction force against a depression force that is applied from the human driver to the pedal, wherein:
- the reaction force generation mechanism includes:
  - a resilient device that includes at least one resilient member which is resiliently deformable in one direction;
  - a first holder that contacts the resilient device from one side, which is a side where the pedal is placed, in the one direction, wherein the first holder has a primary disengagement stopper; and
  - a second holder that contacts the resilient device from another side, which is a side opposite to the one side, in the one direction, wherein the second holder has a secondary disengagement stopper;
- the pedal is configured to limit movement of the first holder toward the one side in the one direction to maintain a compressed and deformed state of the resilient device in the one direction when the pedal is in a non-depressed state where the pedal is not depressed by the human driver; and
- when the pedal no longer limits and thus releases the movement of the first holder toward the one side in the one direction, the secondary disengagement stopper abuts against the primary disengagement stopper in the one direction to limit the movement of the first holder relative to the second holder beyond a predetermined limit toward the one side in the one direction.

Second Aspect

According to a second aspect, there is provided the pedal device according to the first aspect, wherein the resilient device is kept in the compressed and deformed state in the one direction even when the secondary disengagement stopper is in contact with the primary disengagement stopper.

Third Aspect

According to a third aspect, there is provided the pedal device according to the first aspect or the second aspect, wherein the at least one resilient member is at least one coil spring.

Fourth Aspect

According to a fourth aspect, there is provided the pedal device according to the first aspect or the second aspect, wherein:
- the reaction force generation mechanism includes a first coil spring and a second coil spring which are coupled in series in a transmission path of the depression force and are resiliently deformable in the one direction; and
- the at least one resilient member is at least one of the first coil spring and the second coil spring.

Fifth Aspect

According to a fifth aspect, there is provided the pedal device according to the fourth aspect, wherein:
- the reaction force generation mechanism includes an intermediate holder that is placed between the first coil spring and the second coil spring in the transmission path of the depression force; and
- the intermediate holder is provided as one of: the first holder; the second holder; and another component that is different from the first holder and the second holder.

Sixth Aspect

According to a sixth aspect, there is provided the pedal device according to any one of the first to fifth aspects, wherein each of the first holder and the second holder is made of resin or metal.

Seventh Aspect

According to a seventh aspect, there is provided the pedal device according to any one of the first to sixth aspects, wherein:
- the reaction force generation mechanism includes a plurality of holders, wherein the plurality of holders are coupled in series through the at least one resilient member in a transmission path of the depression force and are relatively movable with respect to each other in the one direction;

the plurality of holders include the first holder and the second holder;

a one-side holder among the plurality of holders is positioned closest to the one side in the one direction among the plurality of holders, and an other-side holder among the plurality of holders is positioned closest to the another side in the one direction among the plurality of holders, and one of the one-side holder and the other-side holder includes an outer guide portion that is shaped in a tubular form extending in the one direction; and another one of the one-side holder and the other-side holder includes an inner guide portion that is fitted into the outer guide portion such that the inner guide portion and the outer guide portion are relatively movable with respect to each other in the one direction.

Eighth Aspect

According to an eighth aspect, there is provided the pedal device according to the seventh aspect, wherein:

the at least one resilient member is at least one coil spring; and the outer guide portion is placed on a radially inner side of the at least one coil spring.

Ninth Aspect

According to a ninth aspect, there is provided the pedal device according to the seventh aspect, wherein:

the at least one resilient member is at least one coil spring; and the inner guide portion is placed on a radially outer side of the at least one coil spring.

Tenth Aspect

According to a tenth aspect, there is provided the pedal device according to any one of the first to sixth aspects, wherein:

the reaction force generation mechanism includes a plurality of holders, wherein the plurality of holders are coupled in series through the at least one resilient member in a transmission path of the depression force and are relatively movable with respect to each other in the one direction;

the plurality of holders include the first holder and the second holder;

the reaction force generation mechanism includes a plate spring that has one end portion and another end portion;

the one end portion of the plate spring is fixed to the support body; and an other-side holder among the plurality of holders is positioned closest to the another side in the one direction among the plurality of holders and is coupled to the another end portion of the plate spring such that the other-side holder is not movable relative to the another end portion of the plate spring.

Eleventh Aspect

According to an eleventh aspect, there is provided the pedal device according to any one of the first to tenth aspects, wherein:

the primary disengagement stopper and the secondary disengagement stopper form a snap-fit structure; and when the pedal no longer limits and thus releases the movement of the first holder toward the one side in the one direction, the secondary disengagement stopper limits, through the snap-fit structure, the movement of the first holder relative to the second holder beyond the predetermined limit toward the one side in the one direction.

Twelfth Aspect

According to a twelfth aspect, there is provided the pedal device according to any one of the first to tenth aspects, wherein:

the primary disengagement stopper has a one-side surface forming portion, wherein the one-side surface forming portion has a one-side surface which faces the one side in the one direction;

the secondary disengagement stopper has an other-side surface forming portion which has an other-side surface, wherein the other-side surface is placed on the one side relative to and overlaps with the one-side surface in the one direction, and thereby the other-side surface opposes the one-side surface;

when the secondary disengagement stopper abuts against the primary disengagement stopper in the one direction, the other-side surface abuts against the one-side surface;

each of the first holder and the second holder has a corresponding shape that enables a predetermined relative rotation and a predetermined relative movement between the first holder and the second holder;

the predetermined relative rotation is defined as a relative rotation between the first holder and the second holder through a predetermined angle in a circumferential direction around a central axis of the resilient device extending in the one direction from a reference state where the one-side surface and the other-side surface are opposed to each other; and the predetermined relative movement is defined as a relative movement between the first holder and the second holder in the one direction executed such that the one-side surface forming portion moves relative to the other-side surface forming portion from the another side toward the one side in the one direction in a state where the first holder and the second holder have relatively rotated through the predetermined angle in the circumferential direction from the reference state.

Thirteenth Aspect

According to a thirteenth aspect, there is provided the pedal device according to any one of the first to twelfth aspects, wherein the pedal is a brake pedal.

Fourteenth Aspect

According to a fourteenth aspect, there is provided the pedal device according to any one of the first to third aspects, wherein:

the reaction force generation mechanism includes:

an other-side coil spring that contacts the second holder from the another side in the one direction and is resiliently deformable in the one direction; and an other-side holder that contacts the other-side coil spring from the another side in the one direction, wherein the other-side holder has a projection;

in the non-depressed state of the pedal, the pedal limits the movement of the first holder toward the one side in the one direction to maintain the compressed and deformed state of the resilient device in the one direction and also a compressed and deformed state of the other-side coil spring in the one direction;

the second holder has an insertion hole that extends through the second holder in the one direction;

the projection extends in the one direction and is inserted through an inside of the other-side coil spring on a radially inner side of the other-side coil spring;

in the non-depressed state of the pedal, the projection is inserted through the insertion hole; and even when the pedal no longer limits and thus releases the movement of the first holder toward the one side in the one direction to expand the other-side coil spring to a free length of the other-side coil spring, the projection is inserted through the insertion hole.

Fifteenth Aspect

According to a fifteenth aspect, there is provided the pedal device according to the first aspect or the second aspect, wherein:

the at least one resilient member is a first coil spring; and
the reaction force generation mechanism includes:
a second coil spring that contacts the second holder from the another side in the one direction and is resiliently deformable in the one direction; and
an other-side holder that contacts the second coil spring from the another side in the one direction;

in the non-depressed state of the pedal, the pedal limits the movement of the first holder toward the one side in the one direction to maintain the compressed and deformed state of the first coil spring in the one direction and also a compressed and deformed state of the second coil spring in the one direction;

an outer diameter of the first coil spring is smaller than an inner diameter of the second coil spring;

a portion of the first coil spring is placed on an inner side of the second coil spring in a radial direction of the first coil spring and overlaps with the second coil spring in the radial direction;

the second holder has:
a spring intervening portion that is shaped in a tubular form extending in the one direction and is placed between the first coil spring and the second coil spring in the radial direction;
an inner contact portion that extends inward from the spring intervening portion in the radial direction and contacts the first coil spring from the another side in the one direction; and
an outer contact portion that extends outward from the spring intervening portion in the radial direction and contacts the second coil spring from the one side in the one direction;

the primary disengagement stopper has a one-side surface forming portion, wherein the one-side surface forming portion has a one-side surface facing the one side in the one direction and is placed on an outer side of the first coil spring in the radial direction;

the secondary disengagement stopper has:
an other-side surface support portion that is placed on an outer side of the one-side surface forming portion in the radial direction and extends from the outer contact portion toward the one side in the one direction; and
an other-side surface forming portion which has an other-side surface, wherein the other-side surface is placed on the one side relative to and overlaps with the one-side surface in the one direction, and thereby the other-side surface opposes the one-side surface, and the other-side surface forming portion projects inward from the other-side surface support portion in the radial direction; and when the secondary disengagement stopper abuts against the primary disengagement stopper in the one direction, the other-side surface abuts against the one-side surface.

What is claimed is:

1. A pedal device for a vehicle, comprising:
a support body that is configured to be installed to a vehicle body of the vehicle;
a pedal that is configured to swing relative to the support body and is configured to be depressed by a human driver of the vehicle from an operating side of the pedal which is predetermined; and
a reaction force generation mechanism that is supported by the support body and is placed on a counter-operating side of the pedal that is opposite to the operating side of the pedal, wherein the reaction force generation mechanism is configured to generate a reaction force against a depression force that is applied from the human driver to the pedal, wherein:
the reaction force generation mechanism includes:
a resilient device that includes at least one resilient member which is resiliently deformable in one direction;
a first holder that contacts the resilient device from one side, which is a side where the pedal is placed, in the one direction, wherein the first holder has a primary disengagement stopper; and
a second holder that contacts the resilient device from another side, which is a side opposite to the one side, in the one direction, wherein the second holder has a secondary disengagement stopper;
the pedal is configured to limit movement of the first holder toward the one side in the one direction to maintain a compressed and deformed state of the resilient device in the one direction when the pedal is in a non-depressed state where the pedal is not depressed by the human driver; and
when the pedal no longer limits and thus releases the movement of the first holder toward the one side in the one direction, the secondary disengagement stopper abuts against the primary disengagement stopper in the one direction to limit the movement of the first holder relative to the second holder beyond a predetermined limit toward the one side in the one direction.

2. The pedal device according to claim 1, wherein the resilient device is kept in the compressed and deformed state in the one direction even when the secondary disengagement stopper is in contact with the primary disengagement stopper.

3. The pedal device according to claim 1, wherein the at least one resilient member is at least one coil spring.

4. The pedal device according to claim 1, wherein:
the reaction force generation mechanism includes a first coil spring and a second coil spring which are coupled in series in a transmission path of the depression force and are resiliently deformable in the one direction; and the at least one resilient member is at least one of the first coil spring and the second coil spring.

5. The pedal device according to claim 4, wherein:
the reaction force generation mechanism includes an intermediate holder that is placed between the first coil spring and the second coil spring in the transmission path of the depression force; and
the intermediate holder is provided as one of: the first holder; the second holder; and another component that is different from the first holder and the second holder.

6. The pedal device according to claim 1, wherein each of the first holder and the second holder is made of resin or metal.

7. The pedal device according to claim 1, wherein:
the reaction force generation mechanism includes a plurality of holders, wherein the plurality of holders are coupled in series through the at least one resilient member in a transmission path of the depression force and are relatively movable with respect to each other in the one direction;
the plurality of holders include the first holder and the second holder;
a one-side holder among the plurality of holders is positioned closest to the one side in the one direction among the plurality of holders, and an other-side holder among the plurality of holders is positioned closest to the another side in the one direction among the plurality of holders, and one of the one-side holder and the other-side holder includes an outer guide portion that is shaped in a tubular form extending in the one direction; and
another one of the one-side holder and the other-side holder includes an inner guide portion that is fitted into the outer guide portion such that the inner guide portion and the outer guide portion are relatively movable with respect to each other in the one direction.

8. The pedal device according to claim 7, wherein:
the at least one resilient member is at least one coil spring; and
the outer guide portion is placed on a radially inner side of the at least one coil spring.

9. The pedal device according to claim 7, wherein:
the at least one resilient member is at least one coil spring; and
the inner guide portion is placed on a radially outer side of the at least one coil spring.

10. The pedal device according to claim 1, wherein:
the reaction force generation mechanism includes a plurality of holders, wherein the plurality of holders are coupled in series through the at least one resilient member in a transmission path of the depression force and are relatively movable with respect to each other in the one direction;
the plurality of holders include the first holder and the second holder;
the reaction force generation mechanism includes a plate spring that has one end portion and another end portion;
the one end portion of the plate spring is fixed to the support body; and
an other-side holder among the plurality of holders is positioned closest to the another side in the one direction among the plurality of holders and is coupled to the another end portion of the plate spring such that the other-side holder is not movable relative to the another end portion of the plate spring.

11. The pedal device according to claim 1, wherein:
the primary disengagement stopper and the secondary disengagement stopper form a snap-fit structure; and
when the pedal no longer limits and thus releases the movement of the first holder toward the one side in the one direction, the secondary disengagement stopper limits, through the snap-fit structure, the movement of the first holder relative to the second holder beyond the predetermined limit toward the one side in the one direction.

12. The pedal device according to claim 1, wherein:
the primary disengagement stopper has a one-side surface forming portion, wherein the one-side surface forming portion has a one-side surface which faces the one side in the one direction;
the secondary disengagement stopper has an other-side surface forming portion which has an other-side surface, wherein the other-side surface is placed on the one side relative to and overlaps with the one-side surface in the one direction, and thereby the other-side surface opposes the one-side surface;
when the secondary disengagement stopper abuts against the primary disengagement stopper in the one direction, the other-side surface abuts against the one-side surface;
each of the first holder and the second holder has a corresponding shape that enables a predetermined relative rotation and a predetermined relative movement between the first holder and the second holder;
the predetermined relative rotation is defined as a relative rotation between the first holder and the second holder through a predetermined angle in a circumferential direction around a central axis of the resilient device extending in the one direction from a reference state where the one-side surface and the other-side surface are opposed to each other; and
the predetermined relative movement is defined as a relative movement between the first holder and the second holder in the one direction executed such that the one-side surface forming portion moves relative to the other-side surface forming portion from the another side toward the one side in the one direction in a state where the first holder and the second holder have relatively rotated through the predetermined angle in the circumferential direction from the reference state.

13. The pedal device according to claim 1, wherein the pedal is a brake pedal.

14. The pedal device according to claim 1, wherein:
the reaction force generation mechanism includes:
an other-side coil spring that contacts the second holder from the another side in the one direction and is resiliently deformable in the one direction; and
an other-side holder that contacts the other-side coil spring from the another side in the one direction, wherein the other-side holder has a projection;
in the non-depressed state of the pedal, the pedal limits the movement of the first holder toward the one side in the one direction to maintain the compressed and deformed state of the resilient device in the one direction and also a compressed and deformed state of the other-side coil spring in the one direction;
the second holder has an insertion hole that extends through the second holder in the one direction;
the projection extends in the one direction and is inserted through an inside of the other-side coil spring on a radially inner side of the other-side coil spring;
in the non-depressed state of the pedal, the projection is inserted through the insertion hole; and even when the pedal no longer limits and thus releases the movement of the first holder toward the one side in the one direction to expand the other-side coil spring to a free length of the other-side coil spring, the projection is inserted through the insertion hole.

15. The pedal device according to claim 1, wherein:
the at least one resilient member is a first coil spring; and
the reaction force generation mechanism includes:
 a second coil spring that contacts the second holder from the another side in the one direction and is resiliently deformable in the one direction; and
 an other-side holder that contacts the second coil spring from the another side in the one direction;
in the non-depressed state of the pedal, the pedal limits the movement of the first holder toward the one side in the one direction to maintain the compressed and deformed state of the first coil spring in the one direction and also a compressed and deformed state of the second coil spring in the one direction;
an outer diameter of the first coil spring is smaller than an inner diameter of the second coil spring;
a portion of the first coil spring is placed on an inner side of the second coil spring in a radial direction of the first coil spring and overlaps with the second coil spring in the radial direction;
the second holder has:
 a spring intervening portion that is shaped in a tubular form extending in the one direction and is placed between the first coil spring and the second coil spring in the radial direction;
 an inner contact portion that extends inward from the spring intervening portion in the radial direction and contacts the first coil spring from the another side in the one direction; and
 an outer contact portion that extends outward from the spring intervening portion in the radial direction and contacts the second coil spring from the one side in the one direction;
the primary disengagement stopper has a one-side surface forming portion, wherein the one-side surface forming portion has a one-side surface facing the one side in the one direction and is placed on an outer side of the first coil spring in the radial direction;
the secondary disengagement stopper has:
 an other-side surface support portion that is placed on an outer side of the one-side surface forming portion in the radial direction and extends from the outer contact portion toward the one side in the one direction; and
 an other-side surface forming portion which has an other-side surface, wherein the other-side surface is placed on the one side relative to and overlaps with the one-side surface in the one direction, and thereby the other-side surface opposes the one-side surface, and the other-side surface forming portion projects inward from the other-side surface support portion in the radial direction; and
 when the secondary disengagement stopper abuts against the primary disengagement stopper in the one direction, the other-side surface abuts against the one-side surface.

\* \* \* \* \*